United States Patent
Landry et al.

(10) Patent No.: US 9,949,608 B2
(45) Date of Patent: Apr. 24, 2018

(54) NAVIGATIONAL CONTROL SYSTEM FOR A ROBOTIC DEVICE

(71) Applicant: iRobot Corporation, Bedford, MA (US)

(72) Inventors: Gregg W Landry, Gloucester, MA (US); David A. Cohen, Brookline, MA (US); Daniel N. Ozick, Newton, MA (US); Mark J. Chiappetta, Chelmsford, MA (US); Joseph L. Jones, Acton, MA (US)

(73) Assignee: iRobot Corporation, Bedford, MA (US)

( * ) Notice: Subject to any disclaimer, the term of this patent is extended or adjusted under 35 U.S.C. 154(b) by 558 days.

(21) Appl. No.: 14/291,682

(22) Filed: May 30, 2014

(65) Prior Publication Data

US 2014/0289991 A1    Oct. 2, 2014

Related U.S. Application Data

(63) Continuation of application No. 13/781,314, filed on Feb. 28, 2013, now Pat. No. 8,781,626, which is a
(Continued)

(51) Int. Cl.
*A47L 11/33* (2006.01)
*A47L 11/40* (2006.01)
(Continued)

(52) U.S. Cl.
CPC ........ *A47L 11/4011* (2013.01); *G05D 1/0272* (2013.01); *G05D 3/12* (2013.01);
(Continued)

(58) Field of Classification Search
CPC .... A47L 2201/00–2201/06; G05D 2201/0203; G05D 2201/0208; G05D 2201/0215; B25J 9/0003
See application file for complete search history.

(56) References Cited

U.S. PATENT DOCUMENTS 1,755,054 A    4/1930  Darst
1,780,221 A   11/1930  Buchmann
(Continued)

FOREIGN PATENT DOCUMENTS

DE    2128842 C3    12/1980
DE    3317376 C2    12/1987
(Continued)

OTHER PUBLICATIONS

Andersen et al., "Landmark based navigation strategies," SPIE Conference on Mobile Robots XIII, SPIE vol. 3525, pp. 170-181, Jan. 8, 1999.
(Continued)

*Primary Examiner* — Spencer D Patton
(74) *Attorney, Agent, or Firm* — Fish & Richardson P.C.

(57) ABSTRACT

An autonomous cleaning apparatus includes a chassis, a drive system disposed on the chassis and operable to enable movement of the cleaning apparatus, and a controller in communication with the drive system. The controller includes a processor operable to control the drive system to steer movement of the cleaning apparatus. The autonomous cleaning apparatus includes a cleaning head system disposed on the chassis and a sensor system in communication with the controller. The sensor system includes a debris sensor for generating a debris signal, a bump sensor for generating a bump signal, and an obstacle following sensor disposed on a side of the autonomous cleaning apparatus for generating an obstacle signal. The processor executes a prioritized arbitration scheme to identify and implement one or more dominant behavioral modes based upon at least one signal received from the sensor system.

21 Claims, 18 Drawing Sheets

Related U.S. Application Data continuation of application No. 12/610,792, filed on Nov. 2, 2009, now Pat. No. 8,428,778, which is a continuation of application No. 12/512,114, filed on Jul. 30, 2009, now Pat. No. 8,386,081, which is a continuation-in-part of application No. 11/682,642, filed on Mar. 6, 2007, now Pat. No. 9,128,486, which is a continuation of application No. 11/341,111, filed on Jan. 27, 2006, now Pat. No. 7,188,000, which is a continuation of application No. 10/661,835, filed on Sep. 12, 2003, now Pat. No. 7,024,278, said application No. 12/512,114 is a continuation-in-part of application No. 12/255,393, filed on Oct. 21, 2008, now Pat. No. 8,378,613, which is a continuation of application No. 11/860,272, filed on Sep. 24, 2007, now Pat. No. 7,459,871, which is a continuation of application No. 11/533,294, filed on Sep. 19, 2006, now Pat. No. 7,288,912, which is a continuation of application No. 11/109,832, filed on Apr. 19, 2005, now abandoned, and a continuation of application No. 10/766,303, filed on Jan. 28, 2004, now abandoned.

(60) Provisional application No. 60/410,480, filed on Sep. 13, 2002.

(51) Int. Cl.
  *G05D 1/02* (2006.01)
  *G05D 3/12* (2006.01)

(52) U.S. Cl.
  CPC ........ *A47L 2201/06* (2013.01); *G05D 1/0227* (2013.01); *G05D 1/0242* (2013.01); *G05D 2201/0215* (2013.01)

(56) References Cited

U.S. PATENT DOCUMENTS

| | | |
|---|---|---|
| 1,970,302 A | 8/1934 | Gerhardt |
| 2,136,324 A | 11/1938 | John |
| 2,302,111 A | 11/1942 | Dow et al. |
| 2,353,621 A | 7/1944 | Sav et al. |
| 2,770,825 A | 11/1956 | Pullen |
| 2,930,055 A | 3/1960 | Fallen et al. |
| 3,119,369 A | 1/1964 | Harland et al. |
| 3,166,138 A | 1/1965 | Dunn |
| 3,333,564 A | 8/1967 | Waters |
| 3,375,375 A | 3/1968 | Robert et al. |
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,649,981 A | 3/1972 | Woodworth |
| 3,674,316 A | 7/1972 | De Bray |
| 3,678,882 A | 7/1972 | Kinsella |
| 3,690,559 A | 9/1972 | Rudloff |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| RE28,268 E | 12/1974 | Autrand |
| 3,851,349 A | 12/1974 | Lowder |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De bray |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,305,234 A | 12/1981 | Pichelman |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,709,773 A | 12/1987 | Clement et al. |
| 4,710,020 A | 12/1987 | Maddox et al. |
| 4,712,740 A | 12/1987 | Duncan et al. |
| 4,716,621 A | 1/1988 | Zoni |
| 4,728,801 A | 3/1988 | O'Connor |
| 4,733,343 A | 3/1988 | Yoneda et al. |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George et al. |
| D298,766 S | 11/1988 | Tann et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |

(56) References Cited

U.S. PATENT DOCUMENTS

| | | |
|---|---|---|
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,909,972 A | 3/1990 | Britz |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,967,862 A | 11/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,098,262 A | 3/1992 | Wecker et al. |
| 5,105,502 A | 4/1992 | Takashima |
| 5,105,550 A | 4/1992 | Shenoha |
| 5,109,566 A | 5/1992 | Kobayashi et al. |
| 5,111,401 A | 5/1992 | Everett, Jr. et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,154,617 A | 10/1992 | Suman et al. |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,187,662 A | 2/1993 | Kamimura et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,222,786 A | 6/1993 | Sovis et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,331,713 A | 7/1994 | Tipton |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,352,901 A | 10/1994 | Poorman |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,534,762 A | 7/1996 | Kim |
| 5,535,476 A | 7/1996 | Kresse et al. |

(56) References Cited

U.S. PATENT DOCUMENTS

| | | |
|---|---|---|
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,119 A | 9/1996 | Wörwag |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |
| 5,717,484 A | 2/1998 | Hamaguchi et al. |
| 5,720,077 A | 2/1998 | Nakamura et al. |
| 5,722,109 A | 3/1998 | Delmas et al. |
| 5,732,401 A | 3/1998 | Conway |
| 5,735,017 A | 4/1998 | Barnes et al. |
| 5,735,959 A | 4/1998 | Kubo et al. |
| 5,742,975 A | 4/1998 | Knowlton et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |
| 5,767,960 A | 6/1998 | Orman |
| 5,770,936 A | 6/1998 | Hirai et al. |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,784,755 A | 7/1998 | Karr et al. |
| 5,786,602 A | 7/1998 | Pryor et al. |
| 5,787,545 A | 8/1998 | Colens |
| 5,793,900 A | 8/1998 | Nourbakhsh et al. |
| 5,794,297 A | 8/1998 | Muta |
| 5,802,665 A | 9/1998 | Knowlton et al. |
| 5,812,267 A | 9/1998 | Everett et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,836,045 A | 11/1998 | Anthony et al. |
| 5,839,156 A | 11/1998 | Park et al. |
| 5,839,532 A | 11/1998 | Yoshiji et al. |
| 5,841,259 A | 11/1998 | Kim et al. |
| 5,867,800 A | 2/1999 | Leif |
| 5,867,861 A | 2/1999 | Kasen et al. |
| 5,869,910 A | 2/1999 | Colens |
| 5,894,621 A | 4/1999 | Kubo |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,935,333 A | 8/1999 | Davis |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,943,933 A | 8/1999 | Evans et al. |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,995,884 A | 11/1999 | Allen et al. |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,012,618 A | 1/2000 | Matsuo et al. |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,327 A | 3/2000 | Oka et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,050,648 A | 4/2000 | Keleny |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,070,290 A | 6/2000 | Schwarze et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |

(56) References Cited

U.S. PATENT DOCUMENTS

| | | |
|---|---|---|
| 6,094,775 A | 8/2000 | Behmer |
| 6,099,091 A | 8/2000 | Campbell |
| 6,101,670 A | 8/2000 | Song |
| 6,101,671 A | 8/2000 | Wright et al. |
| 6,108,031 A | 8/2000 | King et al. |
| 6,108,067 A | 8/2000 | Okamoto |
| 6,108,269 A | 8/2000 | Kabel |
| 6,108,597 A | 8/2000 | Kirchner et al. |
| 6,108,859 A | 8/2000 | Burgoon |
| 6,112,143 A | 8/2000 | Allen et al. |
| 6,112,996 A | 9/2000 | Matsuo |
| 6,119,057 A | 9/2000 | Kawagoe |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,041 A | 11/2000 | Chen et al. |
| 6,146,278 A | 11/2000 | Kobayashi |
| 6,154,279 A | 11/2000 | Thayer |
| 6,154,694 A | 11/2000 | Aoki et al. |
| 6,160,479 A | 12/2000 | Ahlen et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,192,549 B1 | 2/2001 | Kasen et al. |
| 6,202,243 B1 | 3/2001 | Beaufoy et al. |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,279,196 B2 | 8/2001 | Kasen et al. |
| 6,282,526 B1 | 8/2001 | Ganesh |
| 6,283,034 B1 | 9/2001 | Miles |
| 6,285,778 B1 | 9/2001 | Nakajima et al. |
| 6,285,930 B1 | 9/2001 | Dickson et al. |
| 6,286,181 B1 | 9/2001 | Kasper et al. |
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,397,429 B1 | 6/2002 | Legatt et al. |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,418,586 B2 | 7/2002 | Fulghum |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,442,789 B1 | 9/2002 | Legatt et al. |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,482,252 B1 | 11/2002 | Conrad et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,519,808 B2 | 2/2003 | Legatt et al. |
| 6,525,509 B1 | 2/2003 | Petersson et al. |
| D471,243 S | 3/2003 | Cioffi et al. |
| 6,530,102 B1 | 3/2003 | Pierce et al. |
| 6,530,117 B2 | 3/2003 | Peterson |
| 6,532,404 B2 | 3/2003 | Colens |
| 6,535,793 B2 | 3/2003 | Allard |
| 6,540,424 B1 | 4/2003 | Hall et al. |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| 6,597,076 B2 | 7/2003 | Scheible et al. |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,609,269 B2 | 8/2003 | Kasper |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,434 B1 | 9/2003 | Davis et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,633,150 B1 | 10/2003 | Wallach et al. |
| 6,637,546 B1 | 10/2003 | Wang |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |

(56) References Cited

U.S. PATENT DOCUMENTS

| | | |
|---|---|---|
| 6,658,693 B1 | 12/2003 | Reed |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,671,925 B2 | 1/2004 | Field et al. |
| 6,677,938 B1 | 1/2004 | Maynard |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,705,332 B2 | 3/2004 | Field et al. |
| 6,711,280 B2 | 3/2004 | Stafsudd et al. |
| 6,732,826 B2 | 5/2004 | Song et al. |
| 6,735,811 B2 | 5/2004 | Field et al. |
| 6,735,812 B2 | 5/2004 | Hekman et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,810,350 B2 | 10/2004 | Blakley |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,848,146 B2 | 2/2005 | Wright et al. |
| 6,854,148 B1 | 2/2005 | Rief et al. |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,040,869 B2 | 5/2006 | Beenker |
| 7,041,029 B2 | 5/2006 | Fulghum et al. |
| 7,051,399 B2 | 5/2006 | Field et al. |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,059,012 B2 | 6/2006 | Song et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Hulden |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan |
| 7,320,149 B1 | 1/2008 | Huffman et al. |
| 7,321,807 B2 | 1/2008 | Laski |
| 7,324,870 B2 | 1/2008 | Lee |
| 7,328,196 B2 | 2/2008 | Peters |
| 7,332,890 B2 | 2/2008 | Cohen et al. |
| 7,346,428 B1 | 3/2008 | Huffman et al. |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,156 B2 | 6/2008 | Ziegler et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 | 10/2008 | Svendsen et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,539,557 B2 | 5/2009 | Yamauchi |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,611,583 B2 | 11/2009 | Buckley et al. |
| 7,617,557 B2 | 11/2009 | Reindle |
| 7,620,476 B2 | 11/2009 | Morse et al. |
| 7,636,928 B2 | 12/2009 | Uno |
| 7,636,982 B2 | 12/2009 | Jones et al. |
| 7,647,144 B2 | 1/2010 | Haegermarck |

(56) References Cited

U.S. PATENT DOCUMENTS

| | | |
|---|---|---|
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,761,954 B2 | 7/2010 | Ziegler et al. |
| 7,765,635 B2 | 8/2010 | Park |
| 7,784,147 B2 | 8/2010 | Burkholder et al. |
| 7,801,645 B2 | 9/2010 | Taylor et al. |
| 7,805,220 B2 | 9/2010 | Taylor et al. |
| 7,809,944 B2 | 10/2010 | Kawamoto |
| 7,832,048 B2 | 11/2010 | Harwig et al. |
| 7,849,555 B2 | 12/2010 | Hahm et al. |
| 7,853,645 B2 | 12/2010 | Brown et al. |
| 7,860,680 B2 | 12/2010 | Arms et al. |
| 7,920,941 B2 | 4/2011 | Park et al. |
| 7,937,800 B2 | 5/2011 | Yan |
| 7,957,836 B2 | 6/2011 | Myeong et al. |
| 8,087,117 B2 | 1/2012 | Kapoor et al. |
| 8,253,368 B2 | 8/2012 | Landry et al. |
| 8,386,081 B2 | 2/2013 | Landry et al. |
| 8,428,778 B2 | 4/2013 | Landry et al. |
| 8,456,125 B2 | 6/2013 | Landry et al. |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De Fazio et al. |
| 2002/0011367 A1 | 1/2002 | Kolesnik |
| 2002/0011813 A1 | 1/2002 | Koselka et al. |
| 2002/0016649 A1 | 2/2002 | Jones |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0015232 A1 | 1/2003 | Nguyen |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0159232 A1 | 8/2003 | Hekman et al. |
| 2003/0168081 A1 | 9/2003 | Lee et al. |
| 2003/0175138 A1 | 9/2003 | Beenker |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0201361 A1 | 10/2004 | Koh et al. |
| 2004/0204792 A1 | 10/2004 | Taylor et al. |
| 2004/0204804 A1 | 10/2004 | Lee et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0015920 A1 | 1/2005 | Kim et al. |
| 2005/0021181 A1 | 1/2005 | Kim et al. |
| 2005/0028316 A1 | 2/2005 | Thomas et al. |
| 2005/0053912 A1 | 3/2005 | Roth et al. |
| 2005/0055796 A1 | 3/2005 | Wright et al. |
| 2005/0067994 A1 | 3/2005 | Jones et al. |
| 2005/0081782 A1 | 4/2005 | Buckley et al. |
| 2005/0085947 A1 | 4/2005 | Aldred et al. |
| 2005/0091782 A1 | 5/2005 | Gordon et al. |
| 2005/0091786 A1 | 5/2005 | Wright et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |

(56) References Cited

U.S. PATENT DOCUMENTS

| | | |
|---|---|---|
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0162119 A1 | 7/2005 | Landry et al. |
| 2005/0163119 A1 | 7/2005 | Ito et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | De Guzman |
| 2006/0000050 A1 | 1/2006 | Cipolla et al. |
| 2006/0009879 A1 | 1/2006 | Lynch et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0107894 A1 | 5/2006 | Buckley et al. |
| 2006/0119839 A1 | 6/2006 | Bertin et al. |
| 2006/0143295 A1 | 6/2006 | Costa-Requena et al. |
| 2006/0146776 A1 | 7/2006 | Kim |
| 2006/0150361 A1 | 7/2006 | Aldred et al. |
| 2006/0184293 A1 | 8/2006 | Konandreas et al. |
| 2006/0185690 A1 | 8/2006 | Song et al. |
| 2006/0190133 A1 | 8/2006 | Konandreas et al. |
| 2006/0190134 A1 | 8/2006 | Ziegler et al. |
| 2006/0190146 A1 | 8/2006 | Morse et al. |
| 2006/0196003 A1 | 9/2006 | Song et al. |
| 2006/0200281 A1 | 9/2006 | Ziegler et al. |
| 2006/0220900 A1 | 10/2006 | Ceskutti et al. |
| 2006/0229774 A1 | 10/2006 | Park et al. |
| 2006/0259194 A1 | 11/2006 | Chiu |
| 2006/0259494 A1 | 11/2006 | Watson et al. |
| 2006/0278161 A1 | 12/2006 | Burkholder et al. |
| 2006/0288519 A1 | 12/2006 | Jaworski et al. |
| 2006/0293787 A1 | 12/2006 | Kanda et al. |
| 2006/0293808 A1 | 12/2006 | Qian |
| 2007/0006404 A1 | 1/2007 | Cheng et al. |
| 2007/0016328 A1 | 1/2007 | Ziegler et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0061043 A1 | 3/2007 | Seaburg |
| 2007/0114975 A1 | 5/2007 | Cohen et al. |
| 2007/0142964 A1 | 6/2007 | Abramson |
| 2007/0150096 A1 | 6/2007 | Yeh et al. |
| 2007/0156286 A1 | 7/2007 | Yamauchi |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0245511 A1 | 10/2007 | Hahm et al. |
| 2007/0250212 A1 | 10/2007 | Halloran et al. |
| 2007/0261193 A1 | 11/2007 | Gordon et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0109126 A1 | 5/2008 | Sandin et al. |
| 2008/0134458 A1 | 6/2008 | Ziegler et al. |
| 2008/0140255 A1 | 6/2008 | Ziegler et al. |
| 2008/0155768 A1 | 6/2008 | Ziegler et al. |
| 2008/0184518 A1 | 8/2008 | Taylor et al. |
| 2008/0266748 A1 | 10/2008 | Lee |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0048727 A1 | 2/2009 | Hong et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0006028 A1 | 1/2010 | Buckley et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0082193 A1 | 4/2010 | Chiappetta |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0293742 A1 | 11/2010 | Chung et al. |
| 2010/0312429 A1 | 12/2010 | Jones et al. |

FOREIGN PATENT DOCUMENTS

| | | |
|---|---|---|
| DE | 3536907 C2 | 2/1989 |
| DE | 3404202 C2 | 12/1992 |
| DE | 199311014 U1 | 10/1993 |
| DE | 4338841 A1 | 5/1995 |
| DE | 4414683 A1 | 10/1995 |
| DE | 19849978 | 2/2001 |
| DE | 102004038074 | 6/2005 |
| DE | 10357636 | 7/2005 |
| DE | 102004041021 B3 | 8/2005 |
| DE | 102005046813 A1 | 4/2007 |
| DK | 338988 A | 12/1988 |
| EP | 0265542 A1 | 5/1988 |
| EP | 0281085 A2 | 9/1988 |
| EP | 0286328 A1 | 10/1988 |
| EP | 0294101 A2 | 12/1988 |
| EP | 0352045 A2 | 1/1990 |
| EP | 0433697 A2 | 6/1991 |
| EP | 0437024 A1 | 7/1991 |
| EP | 0554978 A2 | 8/1993 |
| EP | 0615719 A1 | 9/1994 |
| EP | 0792726 A1 | 9/1997 |
| EP | 0930040 A2 | 7/1999 |
| EP | 0845237 B1 | 4/2000 |
| EP | 0861629 B1 | 9/2001 |
| EP | 1228734 | 8/2002 |
| EP | 1380245 A1 | 1/2004 |
| EP | 1380246 A2 | 1/2004 |

(56) References Cited

FOREIGN PATENT DOCUMENTS

| | | |
|---|---|---|
| EP | 1018315 B1 | 11/2004 |
| EP | 1553472 A1 | 7/2005 |
| EP | 1557730 A1 | 7/2005 |
| EP | 1642522 A2 | 4/2006 |
| EP | 1836941 A2 | 9/2007 |
| ES | 2238196 A1 | 8/2005 |
| FR | 722755 | 3/1932 |
| FR | 2601443 A1 | 1/1988 |
| FR | 2828589 A1 | 2/2003 |
| GB | 702426 | 1/1954 |
| GB | 2128842 A | 5/1984 |
| GB | 2213047 | 8/1989 |
| GB | 2225221 A | 5/1990 |
| GB | 2267360 A | 12/1993 |
| GB | 2283838 A | 5/1995 |
| GB | 2284957 A | 6/1995 |
| GB | 2300082 A | 10/1996 |
| GB | 2344747 A | 6/2000 |
| GB | 2404330 A | 2/2005 |
| GB | 2417354 A | 2/2006 |
| JP | 53021869 | 2/1978 |
| JP | 53110257 A2 | 9/1978 |
| JP | 57014726 | 1/1982 |
| JP | 57064217 | 4/1982 |
| JP | 59005315 | 1/1984 |
| JP | 59033511 U | 3/1984 |
| JP | 59094005 | 5/1984 |
| JP | 59099308 | 6/1984 |
| JP | 59112311 | 6/1984 |
| JP | 59120124 A | 7/1984 |
| JP | 59131668 U | 9/1984 |
| JP | 59164973 | 9/1984 |
| JP | 59184917 A | 10/1984 |
| JP | 2283343 A2 | 11/1984 |
| JP | 59212924 | 12/1984 |
| JP | 59226909 | 12/1984 |
| JP | 60089213 A | 5/1985 |
| JP | 60211510 A | 10/1985 |
| JP | 60259895 | 12/1985 |
| JP | 61023221 | 1/1986 |
| JP | 61097712 A | 5/1986 |
| JP | 61160366 | 7/1986 |
| JP | 62070709 | 4/1987 |
| JP | 62074018 A | 4/1987 |
| JP | 62120510 A | 6/1987 |
| JP | 62154008 | 7/1987 |
| JP | 62164431 | 7/1987 |
| JP | 62263507 A | 11/1987 |
| JP | 62263508 A | 11/1987 |
| JP | 62189057 U | 12/1987 |
| JP | 63079623 A | 4/1988 |
| JP | 63158032 | 7/1988 |
| JP | 63203483 A | 8/1988 |
| JP | 63241610 A | 10/1988 |
| JP | 1118752 | 8/1989 |
| JP | 2-6312 U | 1/1990 |
| JP | 3051023 | 3/1991 |
| JP | 3051023 A | 3/1991 |
| JP | 4019586 | 1/1992 |
| JP | 4074285 A | 3/1992 |
| JP | 4084921 A | 3/1992 |
| JP | 5023269 A | 2/1993 |
| JP | 5042076 A | 2/1993 |
| JP | 5046246 | 2/1993 |
| JP | 5091604 A | 4/1993 |
| JP | 5095879 A | 4/1993 |
| JP | 5150827 A | 6/1993 |
| JP | 5150829 A | 6/1993 |
| JP | 5054620 U | 7/1993 |
| JP | 5040519 Y2 | 10/1993 |
| JP | 05257527 A | 10/1993 |
| JP | 5257533 | 10/1993 |
| JP | 05285861 A | 11/1993 |
| JP | 5302836 A | 11/1993 |
| JP | 5312514 A | 11/1993 |
| JP | 05046239 Y2 | 12/1993 |
| JP | 5341904 A | 12/1993 |
| JP | 6003251 U | 1/1994 |
| JP | 6038912 | 2/1994 |
| JP | 6105781 A | 4/1994 |
| JP | 6137828 A | 5/1994 |
| JP | 6154143 A | 6/1994 |
| JP | 6293095 A | 10/1994 |
| JP | 06327 598 A | 11/1994 |
| JP | 06327598 | 11/1994 |
| JP | 7047046 A | 2/1995 |
| JP | 07129239 A | 5/1995 |
| JP | 7059702 B | 6/1995 |
| JP | 07222705 A2 | 8/1995 |
| JP | 7270518 A | 10/1995 |
| JP | 7281742 | 10/1995 |
| JP | 7311041 | 11/1995 |
| JP | 7313417 A | 12/1995 |
| JP | 7319542 | 12/1995 |
| JP | 8000393 A | 1/1996 |
| JP | 8016241 | 1/1996 |
| JP | 8016776 A | 1/1996 |
| JP | 8063229 | 3/1996 |
| JP | 8083125 | 3/1996 |
| JP | 8084696 A | 4/1996 |
| JP | 8089449 A | 4/1996 |
| JP | 08089451 A | 4/1996 |
| JP | 2520732 | 5/1996 |
| JP | 8123548 A | 5/1996 |
| JP | 8152916 A | 6/1996 |
| JP | 8256960 | 10/1996 |
| JP | 8263137 A | 10/1996 |
| JP | 8286741 | 11/1996 |
| JP | 8286744 | 11/1996 |
| JP | 8322774 | 12/1996 |
| JP | 8335112 A | 12/1996 |
| JP | 8339297 A | 12/1996 |
| JP | 943901 | 2/1997 |
| JP | 9044240 A | 2/1997 |
| JP | 9066855 A | 3/1997 |
| JP | 9145309 A | 6/1997 |
| JP | 09160644 A | 6/1997 |
| JP | 09179625 A | 7/1997 |
| JP | 09179685 | 7/1997 |
| JP | 09185410 | 7/1997 |
| JP | 9192069 A | 7/1997 |
| JP | 2555263 Y2 | 8/1997 |
| JP | 9204223 A | 8/1997 |
| JP | 09206258 A | 8/1997 |
| JP | 09233712 A | 9/1997 |
| JP | 09251318 | 9/1997 |
| JP | 9265319 A | 10/1997 |
| JP | 9269807 A | 10/1997 |
| JP | 9269810 A | 10/1997 |
| JP | 9319431 A1 | 12/1997 |
| JP | 9319432 A | 12/1997 |
| JP | 9319434 A | 12/1997 |
| JP | 9325812 A | 12/1997 |
| JP | 10055215 A | 2/1998 |
| JP | 10117973 A | 5/1998 |
| JP | 10118963 A | 5/1998 |
| JP | 10165738 A | 6/1998 |
| JP | 10177414 A | 6/1998 |
| JP | 10214114 | 8/1998 |
| JP | 10228316 | 8/1998 |
| JP | 10260727 | 9/1998 |
| JP | 10295595 A | 11/1998 |
| JP | 10314088 | 12/1998 |
| JP | 11015941 A | 1/1999 |
| JP | 11065655 | 3/1999 |
| JP | 11085269 | 3/1999 |
| JP | 11102219 | 4/1999 |
| JP | 11102220 A | 4/1999 |
| JP | 11162454 A | 6/1999 |
| JP | 11174145 A | 7/1999 |
| JP | 11175149 A | 7/1999 |
| JP | 11178765 A | 7/1999 |
| JP | 114008764 A | 7/1999 |
| JP | 11212642 A | 8/1999 |

(56) References Cited

FOREIGN PATENT DOCUMENTS

| | | |
|---|---|---|
| JP | 11213157 A | 8/1999 |
| JP | 11282532 A | 10/1999 |
| JP | 11282533 A | 10/1999 |
| JP | 11295412 A | 10/1999 |
| JP | 11346964 | 12/1999 |
| JP | 2000047728 | 2/2000 |
| JP | 2000056006 A | 2/2000 |
| JP | 2000056831 A | 2/2000 |
| JP | 2000060782 A | 2/2000 |
| JP | 2000066722 A | 3/2000 |
| JP | 2000075925 A | 3/2000 |
| JP | 2000102499 A | 4/2000 |
| JP | 10240343 | 5/2000 |
| JP | 2000275321 | 10/2000 |
| JP | 2000279353 A | 10/2000 |
| JP | 2000353014 A | 12/2000 |
| JP | 2001022443 A | 1/2001 |
| JP | 2001067588 | 3/2001 |
| JP | 2001087182 | 4/2001 |
| JP | 2001121455 | 5/2001 |
| JP | 2001125641 | 5/2001 |
| JP | 2001508572 A | 6/2001 |
| JP | 2001197008 A | 7/2001 |
| JP | 3197758 B2 | 8/2001 |
| JP | 3201903 B2 | 8/2001 |
| JP | 2001216482 A | 8/2001 |
| JP | 2001258807 | 9/2001 |
| JP | 2001265437 A | 9/2001 |
| JP | 2001275908 A | 10/2001 |
| JP | 2001289939 | 10/2001 |
| JP | 2001306170 A | 11/2001 |
| JP | 2002073170 A | 3/2002 |
| JP | 2002078650 A | 3/2002 |
| JP | 2002204768 A | 7/2002 |
| JP | 2002204769 A | 7/2002 |
| JP | 2002247510 A | 8/2002 |
| JP | 2002532180 A | 10/2002 |
| JP | 2002323925 | 11/2002 |
| JP | 2002333920 A | 11/2002 |
| JP | 2002355206 | 12/2002 |
| JP | 2002360471 A | 12/2002 |
| JP | 2002360482 A | 12/2002 |
| JP | 2002366227 | 12/2002 |
| JP | 2002369778 | 12/2002 |
| JP | 2003005296 A | 1/2003 |
| JP | 2003010076 A | 1/2003 |
| JP | 2003010088 A | 1/2003 |
| JP | 2003028528 A | 1/2003 |
| JP | 2003036116 A | 2/2003 |
| JP | 2003038401 A | 2/2003 |
| JP | 2003038402 A | 2/2003 |
| JP | 2003047579 | 2/2003 |
| JP | 2003061882 A | 3/2003 |
| JP | 2003084994 | 3/2003 |
| JP | 2003167628 A | 6/2003 |
| JP | 2003180586 A | 7/2003 |
| JP | 2003180587 A | 7/2003 |
| JP | 2003186539 A | 7/2003 |
| JP | 2003190064 A | 7/2003 |
| JP | 2003241836 A | 8/2003 |
| JP | 2003262520 A | 9/2003 |
| JP | 2003304992 A | 10/2003 |
| JP | 2003310509 A | 11/2003 |
| JP | 2003330543 A | 11/2003 |
| JP | 2004123040 A | 4/2004 |
| JP | 2004148021 A | 5/2004 |
| JP | 2004160102 A | 6/2004 |
| JP | 2004166968 A | 6/2004 |
| JP | 2004198330 A | 7/2004 |
| JP | 2004219185 | 8/2004 |
| JP | 2004351234 A | 12/2004 |
| JP | 2005118354 A | 5/2005 |
| JP | 2005211360 A | 8/2005 |
| JP | 2005224265 A | 8/2005 |
| JP | 2005230032 A | 9/2005 |
| JP | 2005245916 A | 9/2005 |
| JP | 2005346700 | 12/2005 |
| JP | 2005352707 A | 12/2005 |
| JP | 2006043071 A | 2/2006 |
| JP | 2006155274 A | 6/2006 |
| JP | 2006164223 A | 6/2006 |
| JP | 2006227673 A | 8/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2007034866 A | 2/2007 |
| JP | 2007213180 A | 8/2007 |
| JP | 2009015611 A | 1/2009 |
| JP | 2010198552 A | 9/2010 |
| WO | 199526512 A1 | 10/1995 |
| WO | 199530887 A1 | 11/1995 |
| WO | 199617258 A1 | 6/1996 |
| WO | 199715224 A1 | 5/1997 |
| WO | 199740734 A1 | 11/1997 |
| WO | 199741451 A1 | 11/1997 |
| WO | 199853456 A1 | 11/1998 |
| WO | 199905580 A2 | 2/1999 |
| WO | 199916078 A1 | 4/1999 |
| WO | 1999028800 | 6/1999 |
| WO | 199938056 A1 | 7/1999 |
| WO | 199938237 A1 | 7/1999 |
| WO | 199943250 A1 | 9/1999 |
| WO | 1999059042 | 11/1999 |
| WO | 200038026 A1 | 6/2000 |
| WO | 200038028 A1 | 6/2000 |
| WO | 200038029 A1 | 6/2000 |
| WO | 2000036962 | 6/2000 |
| WO | 200004430 A1 | 10/2000 |
| WO | 200078410 A1 | 12/2000 |
| WO | 200106904 A1 | 2/2001 |
| WO | 200106905 A1 | 2/2001 |
| WO | 2001080703 A1 | 11/2001 |
| WO | 200191623 A2 | 12/2001 |
| WO | 2002024292 A1 | 3/2002 |
| WO | 200239864 A1 | 5/2002 |
| WO | 200239868 A1 | 5/2002 |
| WO | 2003026474 | 5/2002 |
| WO | 2002058527 A1 | 8/2002 |
| WO | 2002062194 A1 | 8/2002 |
| WO | 2002067744 A1 | 9/2002 |
| WO | 2002067745 A1 | 9/2002 |
| WO | 2002067752 A1 | 9/2002 |
| WO | 2002069774 A1 | 9/2002 |
| WO | 2002069775 A2 | 9/2002 |
| WO | 2002071175 A1 | 9/2002 |
| WO | 2002074150 A1 | 9/2002 |
| WO | 2002075356 A1 | 9/2002 |
| WO | 2002075469 A1 | 9/2002 |
| WO | 2002075470 A1 | 9/2002 |
| WO | 2002081074 A1 | 10/2002 |
| WO | 2002101477 A2 | 12/2002 |
| WO | 2003015220 A1 | 2/2003 |
| WO | 2003024292 A2 | 3/2003 |
| WO | 2003040546 A1 | 5/2003 |
| WO | 2003040845 A1 | 5/2003 |
| WO | 2003040846 A1 | 5/2003 |
| WO | 2003062850 A2 | 7/2003 |
| WO | 2003062852 A1 | 7/2003 |
| WO | 2004004533 A1 | 1/2004 |
| WO | 2004004534 A1 | 1/2004 |
| WO | 2004006034 A2 | 1/2004 |
| WO | 2004025947 A2 | 3/2004 |
| WO | 2004058028 A2 | 7/2004 |
| WO | 2004059409 A1 | 7/2004 |
| WO | 2005006935 A1 | 1/2005 |
| WO | 2005037496 A1 | 4/2005 |
| WO | 2005055795 A1 | 6/2005 |
| WO | 2005055796 A2 | 6/2005 |
| WO | 2005076545 A1 | 8/2005 |
| WO | 2005077243 A1 | 8/2005 |
| WO | 2005077244 A1 | 8/2005 |
| WO | 2005081074 A1 | 9/2005 |
| WO | 2005082223 | 9/2005 |

(56) References Cited

FOREIGN PATENT DOCUMENTS

| WO | 2005083541 A1 | 9/2005 |
|---|---|---|
| WO | 2005098475 A1 | 10/2005 |
| WO | 2005098476 A1 | 10/2005 |
| WO | 2006046400 A1 | 5/2006 |
| WO | 2006061133 A1 | 6/2006 |
| WO | 2006068403 A1 | 6/2006 |
| WO | 2006073248 A1 | 7/2006 |
| WO | 2006089307 A2 | 8/2006 |
| WO | 2007028049 A2 | 3/2007 |
| WO | 2007036490 A2 | 4/2007 |
| WO | 2007065033 A2 | 6/2007 |
| WO | 2007137234 A2 | 11/2007 |
| WO | 2002075350 A1 | 1/2012 |

OTHER PUBLICATIONS

Ascii, Mar. 25, 2002, http://ascii.jp/elem/000/000/330/330024/, accessed Nov. 2011, 15 pages (with English translation).
Barker, "Navigation by the Stars—Ben Barker 4th Year Project," Nov. 2004, 20 pages.
Becker et al., "Reliable Navigation Using Landmarks, " IEEE International Conference on Robotics and Automation, 0-7803-1965-6, pp. 401-406, 1995.
Benayad-Cherif et al., "Mobile Robot Navigation Sensors," SPIE vol. 1831 Mobile Robots, VII, pp. 378-387, 1992.
Betke et al. "Mobile robot localization using landmarks," Proceedings of the IEEE/RSJ/GI International Conference on Intelligent Robots and Systems '94 Advanced Robotic Systems and the Real World' (IROS '94), Accessed via IEEE Xplore, 1994, 8 pages.
Bison et al., "Using a structured beacon for cooperative position estimation," *Robotics and Autonomous Systems*, 29(1):33-40, Oct. 1999.
Blaasvaer et al., "AMOR—An Autonomous Mobile Robot Navigation System," Proceedings of the IEEE International Conference on Systems, Man, and Cybernetics, pp. 2266-2271, 1994.
Borges et al., "Optimal Mobile Robot Pose Estimation Using Geometrical Maps," IEEE Transactions on Robotics and Automation, 18(1): 87-94, Feb. 2002.
Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.
Bulusu et al., "Self Configuring Localization systems: Design and Experimental Evaluation,"*ACM Transactions on Embedded Computing Systems*, 3(1):24-60, 2003.
Caccia et al., "Bottom-Following for Remotely Operated Vehicles,"5th IFAC Conference, Alaborg, Denmark, pp. 245-250, Aug. 2000.
Certified U.S. Appl. No. 60/605,066 as provided to WIPO in PCT/US2005/030422, corresponding to National Stage Entry U.S. Appl. No. 11/574,290, U.S.publication 2008/0184518, filed Aug. 27, 2004.
Certified U.S. Appl. No. 60/605,181 as provided to WIPO in PCT/US2005/030422, corresponding to National Stage Entry U.S. Appl. No. 11/574,290, U.S.publication 2008/0184518, filed Aug. 27, 2004.
Chae et al., "StarLITE: A new artificial landmark for the navigation of mobile robots," http://www.irc.atr.jp/jk-nrs2005/pdf/Starlite.pdf, 4 pages, 2005.
Chamberlin et al., "Team 1: Robot Locator Beacon System, " NASA Goddard SFC, Design Proposal, 15 pages, Feb. 2006.
Champy, "Physical management of IT assets in Data Centers using RFID technologies," RFID 2005 University, Oct. 12-14, 2005 , 19 pages.
Chiri, "Joystick Control for Tiny OS Robot," http://www.eecs.berkeley.edu/Programs/ugrad/superb/papers2002/chiri.pdf. 12 pages, Aug. 2002.

Christensen et al. "Theoretical Methods for Planning and Control in Mobile Robotics," 1997 First International Conference on Knowledge-Based Intelligent Electronic Systems, Adelaide, Australia, pp. 81-86, May 1997.
CleanMate 365, Intelligent Automatic Vacuum Cleaner, Model No. QQ-1, User Manual www.metapo.com/support/user_manual.pdf, Dec. 2005, 11 pages.
Clerentin et al., "A localization method based on two omnidirectional perception systems cooperation," *Proc of IEEE International Conference on Robotics & Automation*, San Francisco, CA vol. 2, pp. 1219-1224, Apr. 2000.
Corke, "High Performance Visual serving for robots end-point control," SPIE vol. 2056, Intelligent Robots and Computer Vision, 1993, 10 pages.
Cozman et al., "Robot Localization using a Computer Vision Sextant," IEEE International Midwest Conference on Robotics and Automation, pp. 106-111, 1995.
D'Orazio et al., "Model based Vision System for mobile robot position estimation", *SPIE*, vol. 2058 Mobile Robots VIII, pp. 38-49, 1992.
De Bakker et al., "Smart PSD—Array for sheet of light range imaging", Proc. of *SPIE*, vol. 3965, pp. 1-12, May 2000.
Denning Roboscrub image (1989), 1 page.
Desaulniers et al., "An Efficient Algorithm to find a shortest path for a car-like Robot," *IEEE Transactions on robotics and Automation*, 11(6):819-828, Dec. 1995.
Dorfmüller-Ulhaas, "Optical Tracking From User Motion to 3D Interaction," http://www.cg.tuwien.ac.at/research/publications/2002/Dorfmueller-Ulhaas-thesis, 182 pages, 2002.
Dorsch et al., "Laser Triangulation: Fundamental uncertainty in distance measurement," *Applied Optics*, 33(7):1306-1314, Mar. 1994.
Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.
Dudek et al., "Localizing a Robot with Minimum Travel" *Proceedings of the sixth annual ACM-SIAM symposium on Discrete Algorithms*, 27(2):583-604, Apr. 1998.
Dulimarta et al., "Mobile Robot Localization in Indoor Environment", *Pattern Recognition*, 30(1):99-111, 1997.
Dyson's Robot Vacuum Cleaner—the DC06, May 2004, Retrieved from the Internet: URL< http://www.gizmag.com/go/1282/>. Accessed Nov. 2011, 3 pages.
EBay, "Roomba Timer -> Timed Cleaning—Floorvac Robotic Vacuum," Retrieved from the Internet: URL Cgi.ebay.corn/ws/eBay|SAP|.dll?viewitem&category=43526&item=4375198387&rd=1, 5 pages, Apr. 2005.
Electrolux Trilobite, "Time to enjoy life," Retrieved from the Internet: URL<http://www.robocon.co.kr/trilobite/Presentation_Trilobite_Kor_030104.ppt, 26 pages, accessed Dec. 2011.
Electrolux Trilobite, Jan. 12, 2001, http://www.electroluxui.com:8080/2002%5C822%5C833102EN.pdf, accessed Jul. 2, 2012, 10 pages.
Electrolux, "Designed for the well-lived home," Retrieved from the Internet: URL<http://www.electroluxusa.com/node57.as[?currentURL=node142.asp%3F >. Accessed Mar. 2005, 2 pages.
Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.
Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.
Euroflex Intelligente Monstre, (English excerpt only), 2006, 15 pages.
Euroflex, Jan. 2006, Retrieved from the Internet: URL< http://www.euroflex.tv/novita_dett.php?id=15, accessed Nov. 2011, 1 page.
EVac Robotic Vacuum S1727 Instruction Manual, Sharper Image Corp, Copyright 2004, 16 pages.

(56) References Cited

OTHER PUBLICATIONS

Everyday Robots, "Everyday Robots: Reviews, Discussion and News for Consumers," Aug. 2004, Retrieved from the Internet: URL< www.everydayrobots.com/index.php?option=content &task=view&id=9> (Sep. 2012), 4 pages.
Evolution Robotics, "NorthStar—Low-cost Indoor Localiztion—How it Works," E Evolution Robotics , 2 pages, 2005.
Facchinetti Claudio et al., "Self-Positioning Robot Navigation Using Ceiling Images Sequences," ACCV '95, 5 pages, Dec. 1995.
Facchinetti Claudio et al., "Using and Learning Vision-Based Self-Positioning for Autonomous Robot Navigation," ICARCV '94, vol. 3, pp. 1694-1698, 1994.
Facts on Trilobite, webpage, Retrieved from the Internet: URL< http://trilobiteelectroluxse/presskit_en/model11335asp?print=yes &pressID=>. 2 pages, accessed Dec. 2003.
Fairfield et al., "Mobile Robot Localization with Sparse Landmarks," SPIE vol. 4573, pp. 148-155, 2002.
Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.
Fayman, "Exploiting Process Integration and Composition in the context of Active Vision," IEEE Transactions on Systems, Man, and Cybernetics—Part C: Application and reviews, vol. 29, No. 1, pp. 73-86, Feb. 1999.
Floorbot GE Plastics—Image, available at http://www.fuseid.com/, 1989-1990, Accessed Sep. 2012, 1 page.
Floorbotics, VR8 Floor Cleaning Robot, Product Description for Manufacturing, URL: <http://www.consensus.sem.au/ SoftwareAwards/CSAarchive/CSA2004/CSAart04/FloorBot/F>. Mar. 2004, 11 pages.
Franz et al., "Biomimetric robot navigation", Robotics and Autonomous Systems, vol. 30 pp. 133-153, 2000.
Friendly Robotics, "Friendly Robotics—Friendly Vac, Robotic Vacuum Cleaner," Retrieved from the Internet: URL< www. friendlyrobotics.com/vac.htm > 5 pages, Apr. 2005.
Friendly Robotics, Retrieved from the Internet: URL<http://www. robotsandrelax.com/PDFs/RV400Manual.pdf>. 18 pages, accessed Dec. 2011.
Fuentes et al., "Mobile Robotics 1994," University of Rochester. Computer Science Department, TR 588, 44 pages, Dec. 1994.
Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, pp. 1466-1471, Aug. 1995.
Gat, "Robust Low-Computation Sensor-driven Control for Task-Directed Navigation," Proc of IEEE International Conference on Robotics and Automation , Sacramento, CA pp. 2484-2489, Apr. 1991.
Gionis, "A hand-held optical surface scanner for environmental Modeling and Virtual Reality,". Virtual Reality World, 16 pages, 1996.
Goncalves et al., "A Visual Front-End for Simultaneous Localization and Mapping", Proceedings of the 2005 IEEE International Conference on Robotics and Automation, Barcelona, Spain, pp. 44-49, Apr. 2005.
Gregg et al., "Autonomous Lawn Care Applications," 2006 Florida Conference on Recent Advances in Robotics, Miami, Florida, May 25-26, 2006, Florida International University, 5 pages.
Grumet, "Robots Clean House," Popular Mechanics, Nov. 2003, 3 pages.
Hamamatsu "SI PIN Diode S5980, S5981 S5870—Multi-element photodiodes for surface mounting," Hamatsu Photonics, 2 pages, Apr. 2004.
Haralick et al. " Pose Estimation from Corresponding Point Data", IEEE Transactions on Systems, Man, and Cybernetics, 19(6):1426-1446, Nov. 1989.

Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.
Hitachi, http://www.hitachi.co.jp/New/cnews/ hi_030529_hi_030529.pdf , 8 pages, May 29, 2003.
Hitachi: News release: "The home cleaning robot of the autonomous movement type (experimental machine)," Retrieved from the Internet: URL< www.i4u.com./japanreleases/hitachirobot.htm>. 5 pages, Mar. 2005.
Hoag et al., "Navigation and Guidance in interstellar space," ACTA Astronautica, vol. 2, pp. 513-533 , Feb. 1975.
Home Robot—UBOT; Microbotusa.com, retrieved from the WWW at www.microrobotusa.com, accessed Dec. 2, 2008, 2 pages.
Huntsberger et al., "CAMPOUT: A Control Architecture for Tightly Coupled Coordination of Multirobot Systems for Planetary Surface Exploration," IEEE Transactions on Systems, Man, and Cybernetics—Part A: Systems and Humans, 33(5):550-559, Sep. 2003.
Iirobotics.com, "Samsung Unveils Its Multifunction Robot Vacuum," Retrieved from the Internet: URL<.www.iirobotics.com/ webpages/hotstuff.php?ubre=111>. 3 pages, Mar. 2005.
InMach "Intelligent Machines," Retrieved from the Internet: URL<www.inmach.de/inside.html>. 1 page, Nov. 2008.
Innovation First, "2004 EDU Robot Controller Reference Guide," Retrieved from the Internet: URL<http://www.ifirobotics.com>. 13 pages, Mar. 2004.
IT media, Retrieved from the Internet: URL<http://www.itmedia. co.jp/news/0111/16/robofesta_m.html>. Accessed Nov. 1, 2011, 4 pages.
It's eye, Retrieved from the Internet: URL< www.hitachi.co.jp/rd/ pdf/topics/hitac2003_10.pdf>. 2 pages, 2003.
Jarosiewicz et al., "Final Report—Lucid," University of Florida, Departmetn of Electrical and Computer Engineering, EEL 5666—Intelligent Machine Design Laboratory, 50 pages, Aug. 1999.
Jensfelt et al., "Active Global Localization for a mobile robot using multiple hypothesis tracking," IEEE Transactions on Robots and Automation, 17(5): 748-760, Oct. 2001.
Jeong et al., "An intelligent map-building system for indoor mobile robot using low cost photo sensors,"SPIE, vol. 6042, 6 pages, 2005.
Kahney, "Robot Vacs are in the House," Retrieved from the Internet: URL<www.wired.com/news/technology/o,1282,59237,00.html>. 6 pages, Jun. 2003.
Karcher "Karcher RoboCleaner RC 3000," Retrieved from the Internet: URL<www.robocleaner.de/english/screen3.html>. 4 pages. Dec. 2003.
Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002, 8 pages.
Karcher RC3000 RoboCleaner,—IMAGE, Accessed at <http:// www.karcher.de/versions/int/assets/video/2_4_robo_en.swf>. Accessed Sep. 2009, 1 page.
Karcher USA, RC3000 Robotic Cleaner, website: http://www. karcher-usa.com/showproducts.php?op=view prod¶m1=143 ¶m2=&param3=, 3 pages, accessed Mar. 2005.
Karcher, "Product Manual Download Karch", available at www. karcher.com, 16 pages, 2004.
Karlsson et al, "Core Technologies for service Robotics," IEEE/RSJ International Conference on Intelligent Robots and Systems (IROS 2004), vol. 3, pp. 2979-2984, Sep. 2004.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
King and Weiman, "HelpmateTM Autonomous Mobile Robots Navigation Systems," SPIE vol. 1388 Mobile Robots, pp. 190-198, 1990.
Kleinberg, The Localization Problem for Mobile Robots, Laboratory for Computer Science, Massachusetts Institute of Technology, 1994 IEEE, pp. 521-531, 1994.
Knights, et al., "Localization and Identification of Visual Landmarks," Journal of Computing Sciences in Colleges, 16(4):312-313, May 2001.

(56) References Cited

OTHER PUBLICATIONS

Kolodko et al., "Experimental System for Real-Time Motion Estimation," Proceedings of the 2003 IEEE/ASME International Conference on Advanced Intelligent Mechatronics (AIM 2003), pp. 981-986, 2003.
Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.
KOOLVAC Robotic Vacuum Cleaner Owner's Manual, Koolatron, 2004, 13 pages.
Krotkov et al., "Digital Sextant," Downloaded from the internet at: http://www.cs.cmu.edu/~epk/ , 1 page, 1995.
Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.
Kuhl et al., "Self Localization in Environments using Visual Angles," VRCAI '04 Proceedings of the 2004 ACM SIGGRAPH international conference on Virtual Reality continuum and its applications in industry, pp. 472-475, 2004.
Kurs et al, Wireless Power transfer via Strongly Coupled Magnetic Resonances, Downloaded from www.sciencemag.org, Aug. 2007, 5 pages.
Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Kwon et al., "Table Recognition through Range-based Candidate Generation and Vision based Candidate Evaluation," ICAR 2007, The 13th International Conference on Advanced Robotics Aug. 21-24, 2007, Jeju, Korea, pp. 918-923, 2007.
Lambrinos et al., "A mobile robot employing insect strategies for navigation," Retrieved from the Internal: URL<http://www8.cs.umu.se/kurser/TDBD17/VT04/dl/Assignment%20Papers/lambrinos-RAS-2000.pdf>. 38 pages, Feb. 1999.
Lang et al., "Visual Measurement of Orientation Using Ceiling Features", 1994 IEEE, pp. 552-555, 1994.
Lapin, "Adaptive position estimation for an automated guided vehicle," *SPIE*, vol. 1831 Mobile Robots VII, pp. 82-94, 1992.
LaValle et al., "Robot Motion Planning in a Changing, Partially Predictable Environment," 1994 IEEE International Symposium on Intelligent Control, Columbus, OH, pp. 261-266, Aug. 1994.
Lee et al., "Development of Indoor Navigation system for Humanoid Robot Using Multi-sensors Integration", ION NTM, San Diego, CA pp. 798-805, Jan. 2007.
Lee et al., "Localization of a Mobile Robot Using the Image of a Moving Object," *IEEE Transaction on Industrial Electronics*, 50(3):612-619, Jun. 2003.
Leonard et al., "Mobile Robot Localization by tracking Geometric Beacons," *IEEE Transaction on Robotics and Automation*, 7(3):376-382, Jun. 1991.
Li et al. "Robust Statistical Methods for Securing Wireless Localization in Sensor Networks," Information Processing in Sensor Networks, 2005, Fourth International Symposium on, pp. 91-98, Apr. 2005.
Li et al., "Making a Local Map of Indoor Environments by Swiveling a Camera and a Sonar," Proceedings of the 1999 IEEE/RSJ International Conference on Intelligent Robots and Systems, pp. 954-959, 1999.
Lin et al., "Mobile Robot Navigation Using Artificial Landmarks," *Journal of robotics System*, 14(2): 93-106, 1997.
Linde, Dissertation—"On Aspects of Indoor Localization," Available at: https://eldorado.tu-dortmund.de/handle/2003/22854, University of Dortmund, 138 pages, Aug. 2006.
Lumelsky et al., "An Algorithm for Maze Searching with Azimuth Input", 1994 IEEE International Conference on Robotics and Automation, San Diego, CA vol. 1, pp. 111-116, 1994.
Luo et al., "Real-time Area-Covering Operations with Obstacle Avoidance for Cleaning Robots," IEEE, pp. 2359-2364, 2002.

Ma, Thesis—"Documentation on Northstar," California Institute of Technology, 14 pages, May 2006.
Madsen et al., "Optimal landmark selection for triangulation of robot position," Journal of Robotics and Autonomous Systems, vol. 13 pp. 277-292, 1998.
Malik et al., "Virtual Prototyping for Conceptual Design of a Tracked Mobile Robot," Electrical and Computer Engineering, Canadian Conference on, IEEE, PI. pp. 2349-2352, May 2006.
Martishevcky, "The Accuracy of point light target coordinate determination by dissectoral tracking system", SPIE vol. 2591, pp. 25-30, Oct. 23, 2005.
Maschinemarkt Würzburg 105, No. 27, pp. 3, 30, Jul. 5, 1999 (with English translation).
Matsumura Camera Online Shop: Retrieved from the Internet: URL<http://www.rakuten.co.jp/matsucame/587179/711512/>. Accessed Nov. 2011, 15 pages (with English translation).
Matsutek Enterprises Co. Ltd, "Automatic Rechargeable Vacuum Cleaner," http://matsutek.manufacturer.globalsources.com/si/6008801427181/pdtl/Home-vacuum/10 . . . , Apr. 2007, 3 pages.
McGillem et al., "Infra-red Lacation System for Navigation and Autonomous Vehicles," 1988 IEEE International Conference on Robotics and Automation, vol. 2, pp. 1236-1238, Apr. 1988.
McGillem,et al. "A Beacon Navigation Method for Autonomous Vehicles," *IEEE Transactions on Vehicular Technology*, 38(3):132-139, Aug. 1989.
McLurkin "Stupid Robot Tricks: A Behavior-based Distributed Algorithm Library for Programming Swarms of Robots," Paper submitted for requirements of BSEE at MIT, May 2004, 127 pages.
McLurkin, "The Ants: A community of Microrobots," Paper submitted for requirements of BSEE at MIT, May 1995, 60 pages.
Michelson, "Autonomous navigation," McGraw-Hill—Access Science, Encyclopedia of Science and Technology Online, 2007, 4 pages.
Miro et al., "Towards Vision Based Navigation in Large Indoor Environments," Proceedings of the IEEE/RSJ International Conference on Intelligent Robots and Systems, Beijing, China, pp. 2096-2102, Oct. 2006.
MobileMag, "Samsung Unveils High-tech Robot Vacuum Cleaner," Retrieved from the Internet: URL<http://www.mobilemag.corn/content/100/102/C2261/>. 4 pages, Mar. 2005.
Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.
Moore et al., "A simple Map-bases Localization strategy using range measurements," *SPIE*, vol. 5804 pp. 612-620, 2005.
Morland,"Autonomous Lawnmower Control", Downloaded from the internet at: http://cns.bu.edu/~cjmorlan/robotics/lawnmower/report.pdf, 10 pages, Jul. 2002.
Munich et al., "ERSP: A Software Platform and Architecture for the Service Robotics Industry," Intelligent Robots and Systems, 2005. (IROS 2005), pp. 460-467, Aug. 2005.
Munich et al., "SIFT-ing Through Features with ViPR", IEEE Robotics & Automation Magazine, pp. 72-77, Sep. 2006.
Nam et al., "Real-Time Dynamic Visual Tracking Using PSD Sensors and extended Trapezoidal Motion Planning", Applied Intelligence 10, pp. 53-70, 1999.
Nitu et al., "Optomechatronic System for Position Detection of a Mobile Mini-Robot," *IEEE Ttransactions on Industrial Electronics*, 52(4):969-973, Aug. 2005.
On Robo, "Robot Reviews Samsung Robot Vacuum (VC-RP30W)," Retrieved from the Internet: URL <www.onrobo.com/reviews/AT_Home/vacuum_cleaners/on00vcrb30rosam/index.htm>. 2 pages, 2005.
OnRobo "Samsung Unveils Its Multifunction Robot Vacuum," Retrieved from the Internet: URL <www.onrobo.com/enews/0210/samsung_vacuum.shtml>. 3 pages, Mar. 2005.
Pages et al., "A camera-projector system for robot positioning by visual serving," Proceedings of the 2006 Conference on Computer Vision and Pattern Recognition Workshop (CVPRW06), 8 pages, Jun. 2006.

(56) References Cited

OTHER PUBLICATIONS

Pages et al., "Optimizing Plane-to-Plane Positioning Tasks by Image-Based Visual Servoing and Structured Light," *IEEE Transactions on Robotics*, 22(5):1000-1010, Oct. 2006.
Pages et al., "Robust decoupled visual servoing based on structured light," 2005 IEEE/RSJ, Int. Conf. on Intelligent Robots and Systems, pp. 2676-2681, 2005.
Park et al., "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun.-Jul. 1994.
Park et al., "Dynamic Visual Servo Control of Robot Manipulators using Neutral Networks," *The Korean Institute Telematics and Electronics*, 29-B(10):771-779, Oct. 1992.
Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012, 6 pages.
Paromtchik et al., "Optical Guidance System for Multiple mobile Robots," Proceedings 2001 ICRA. IEEE International Conference on Robotics and Automation, vol. 3, pp. 2935-2940, May 2001.
Penna et al., "Models for Map Building and Navigation", IEEE Transactions on Systems. Man. and Cybernetics., 23(5):1276-1301, Sep.-Oct. 1993.
Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.
Pirjanian et al., "A decision-theoretic approach to fuzzy behavior coordination", 1999 IEEE International Symposium on Computational Intelligence in Robotics and Automation, 1999. CIRA '99., Monterey, CA, pp. 101-106, Nov. 1999.
Pirjanian et al., "Distributed Control for a Modular, Reconfigurable Cliff Robot," Proceedings of the 2002 IEEE International Conference on Robotics & Automation, Washington, D.C. pp. 4083-4088, May 2002.
Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.
Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.
Pirjanian, "Challenges for Standards for consumer Robotics," IEEE Workshop on Advanced Robotics and its Social impacts, pp. 260-264, Jun. 2005.
Pirjanian, "Reliable Reaction," Proceedings of the 1996 IEEE/SICE/RSJ International Conference on Multisensor Fusion and Integration for Intelligent Systems, pp. 158-165, 1996.
Prassler et al., "A Short History of Cleaning Robots," Autonomous Robots 9, 211-226, 2000, 16 pages.
Put Your Roomba . . . On, Automatic webpages: http://www.acomputeredge.com/roomba, 5 pages, accessed Apr. 2005.
Remazeilles et al., "Image based robot navigation in 3D environments," Proc. of *SPIE*, vol. 6052, pp. 1-14, Dec. 2005.
Rives et al., "Visual servoing based on ellipse features," *SPIE*, vol. 2056 Intelligent Robots and Computer Vision pp. 356-367, 1993.
Roboking—not just a vacuum cleaner, a robot!, Jan. 21, 2004, infocom.uz/2004/01/21/robokingne-prosto-pyilesos-a-robot/, accessed Oct. 10, 2011, 5 pages.
RoboMaid Sweeps Your Floors So You Won't Have to, the Official Site, website: Retrieved from the Internet: URL<http://therobomaid.com>. 2 pages, accessed Mar. 2005.
Robot Buying Guide, "LG announces the first robotic vacuum cleaner for Korea," Retrieved from the Internet: URL<http://robotbg.com/news/2003/04/22/lg_announces_the_first_robotic_vacu>. 1 page, Apr. 2003.
Robotics World, "A Clean Sweep," 5 pages, Jan. 2001.
Ronnback, "On Methods for Assistive Mobile Robots," Retrieved from the Internet: URL<http://www.openthesis.org/documents/methods-assistive-mobile-robots-595019.html>. 218 pages, Jan. 2006.
Roth-Tabak et al., "Environment Model for mobile Robots Indoor Navigation," *SPIE*, vol. 1388 Mobile Robots, pp. 453-463, 1990.
Sahin et al., "Development of a Visual Object Localization Module for Mobile Robots," 1999 Third European Workshop on Advanced Mobile Robots, (Eurobot '99), pp. 65-72, 1999.
Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.
Sato, "Range Imaging Based on Moving Pattern Light and Spatio-Temporal Matched Filter," Proceedings International Conference on Image Processing, vol. 1., Lausanne, Switzerland, pp. 33-36, Sep. 1996.
Schenker et al., "Lightweight rovers for Mars science exploration and sample return," Intelligent Robots and Computer Vision XVI, *SPIE* Proc. 3208, pp. 24-36, 1997.
Schlemmer, "Electrolux Trilobite Robotic Vacuum," Retrieved from the Internet: URL< www.hammacher.com/publish/71579.asp?promo=xsells>. 3 pages, Mar. 2005.
Schofield, "Neither Master Nor slave—A Practical Study in the Development and Employment of Cleaning Robots, Emerging Technologies and Factory Automation," 1999 Proceedings ETFA '99 1999 7th IEEE International Conference on Barcelona, Spain, pp. 1427-1434, Oct. 1999.
Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim et al, "Learning Visual Landmarks for Pose Estimation," IEEE International Conference on Robotics and Automation, vol. 3, Detroit, MI, pp. 1972-1978, May 1999.
Sobh et al., "Case Studies in Web-Controlled Devices and Remote Manipulation," Automation Congress, 2002 Proceedings of the 5th Biannual World, pp. 435-440, Dec. 2002.
Special Reports, "Vacuum Cleaner Robot Operated in Conjunction with 3G Celluar Phone," 59(9): 3 pages, Retrieved from the Internet: URL<http://www.toshiba.co.jp/tech/review/2004/09/59_0>. 2004.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.
Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
Svet Computers—New Technologies—Robot Vacuum Cleaner, Oct. 1999, available at http://www.sk.rs/1999/10/sknt01.html, 1 page, accessed Nov. 1, 2011.
Taipei Times, "Robotic vacuum by Matsuhita about to undergo testing," Retrieved from the Internet: URL<http://www.taipeitimes.com/News/worldbiz/archives/2002/03/26/0000129338>. accessed Mar. 2002, 2 pages.
Takio et al., "Real-Time Position and Pose Tracking Method of Moving Object Using Visual Servo System," 47th IEEE International Symposium on Circuits and Systems, pp. 167-170, 2004.
Tech-on!, Retrieved from the Internet: URL<http://techon.nikkeibp.co.jp/members/01db/200203/1006501/>. 4 pages, accessed Nov. 2011.
Teller, "Pervasive pose awareness for people, Objects and Robots," http://www.ai.mitedu/lab/dangerous-ideas/Spring2003/teller-pose.pdf, 6 pages, Apr. 2003.

(56) References Cited

OTHER PUBLICATIONS

Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.
The Sharper Image, eVac Robotic Vacuum—Product Details, www.sharperiamge.com/us/en/templates/products/pipmorework1printable.jhtml, 1 page, Accessed Mar. 2005.
TheRobotStore.com, "Friendly Robotics Robotic Vacuum RV400—The Robot Store," www.therobotstore.com/s.nl/sc.9/category.-109/it.A/id.43/.f, 1 page, Apr. 2005.
Thrun, Sebastian, "Learning Occupancy Grid Maps With Forward Sensor Models," Autonomous Robots 15, 28 pages, Sep. 1, 2003.
TotalVac.com, RC3000 RoboCleaner website, 2004, Accessed at http://ww.totalvac.com/robot_vacuum.htm (Mar. 2005), 3 pages.
Trebi-Ollennu et al., "Mars Rover Pair Cooperatively Transporting a Long Payload," Proceedings of the 2002 IEEE International Conference on Robotics & Automation, Washington, D.C. pp. 3136-3141, May 2002.
Tribelhorn et al., "Evaluating the Roomba: a low-cost, ubiquitous platform for robotics research and education," *IEEE*, pp. 1393-1399, 2007.
Tse et al., "Design of a Navigation System for a Household Mobile Robot Using Neural Networks," Department of Manufacturing Engg. & Engg. Management, City University of Hong Kong, pp. 2151-2156, 1998.
UAMA (Asia) Industrial Co., Ltd., "RobotFamily," 2005, 1 page.
UBOT, cleaning robot capable of wiping with a wet duster, Retrieved from the Internet: URL<http://us.aving.net/news/view.php?articleId=23031>. 4 pages, accessed Nov. 2011.
Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.
Watts, "Robot, boldly goes where no man can," The Times—pp. 20, Jan. 1985.
Wijk et al., "Triangulation-Based Fusion of Sonar Data with Application in Robot Pose Tracking," *IEEE Transactions on Robotics and Automation*, 16(6):740-752, Dec. 2000.
Wolf et al., "Robust Vision-Based Localization by Combining an Image-Retrieval System with Monte Carol Localization,", *IEEE Transactions on Robotics*, 21(2):208-216, Apr. 2005.
Wolf et al., "Robust Vision-based Localization for Mobile Robots Using an Image Retrieval System Based on Invariant Features," Proceedings of the 2002 IEEE International Conference on Robotics & Automation, Washington, D.C., pp. 359-365, May 2002.
Wong, "EIED Online>> Robot Business", ED Online ID# 13114, 17 pages, Jul. 2006.
Yamamoto et al., "Optical Sensing for Robot Perception and Localization," 2005 IEEE Workshop on Advanced Robotics and its Social Impacts, pp. 14-17, 2005.
Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.
Yujin Robotics,"An intelligent cleaning robot," Retrieved from the Internet: URL<http://us.aving.net/news/view.php?articleId=7257>. 8 pages, accessed Nov. 2011.
Yun et al., "Image-Based Absolute Positioning System for Mobile Robot Navigation," IAPR International Workshops SSPR, Hong Kong, pp. 261-269, Aug. 2006.
Yun et al., "Robust Positioning a Mobile Robot with Active Beacon Sensors," *Lecture Notes in Computer Science*, 2006, vol. 4251, pp. 890-897, 2006.
Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.
Zha et al., "Mobile Robot Localization Using Incomplete Maps for Change Detection in a Dynamic Environment," Advanced Intelligent Mechatronics '97. Final Program and Abstracts., IEEE/ASME International Conference, pp. 110, Jun. 1997.
Zhang et al., "A Novel Mobile Robot Localization Based on Vision," *SPIE* vol. 6279, 6 pages, Jan. 2007.
Zoombot Remote Controlled Vaccuum-RV-500 New Roomba 2, website: http://cgi.ebay.com/ws/eBayISAPI.dll?ViewItem&category=43526&item=4373497618&rd=1, accessed Apr. 20, 2005, 7 pages.
Written Opinion of the International Searching Authority, PCT/US2004/001504, dated Aug. 20, 2012, 9 pages.
International Search Report and Written Opinion, PCT/US2010/043922, dated Aug. 30, 2011.
International Preliminary Report on Patentability in International Application No. PCT/US2010/043922, dated Jan. 31, 2012, 10 pages.

DETECT LEFT AND RIGHT DEBRIS SIGNALS REPRESENTATIVE OF INSTANTANEOUS DEBRIS STRIKES/PRESENCE/QUANTITY/VOLUME/ DIRECTION OF/VECTOR TO DEBRIS OR DEBRIS FIELD, 802

SELECT OPERATIONAL MODE OR PATTERN OF MOVEMENT (e.g., SPOT MODE) BASED ON DEBRIS SIGNAL VALUES, 804

SELECT DIRECTION OF MOVEMENT BASED ON DIFFERENTIAL (LEFT/RIGHT) SIGNAL VALUES (e.g., STEERING TOWARD SIDE WITH MORE DEBRIS), 806

GENERATE USER PERCEPTIBLE SIGNAL (e.g., ILLUMINATE AN LED OR LIGHT), 808

VARY OR CONTROL OPERATIONAL CONDITION (POWER/OTHER), 810

CALCULATE DEBRIS GRADIENT AND CONTROL MOVEMENT, 812

FIG. 8

NAVIGATIONAL CONTROL SYSTEM FOR A ROBOTIC DEVICE

CROSS REFERENCE TO RELATED APPLICATIONS

This U.S. patent application is a continuation of, and claims priority under 35 U.S.C. § 120 from, U.S. patent application Ser. No. 12/512,114, filed on Jul. 30, 2009, which is a continuation-in-part of, and claims priority under 35 U.S.C. § 120 from, U.S. patent application Ser. No. 11/682,642, filed on Mar. 6, 2007, which is a continuation of U.S. patent application Ser. No. 11/341,111, filed on Jan. 27, 2006 (now U.S. Pat. No. 7,188,000), which is a continuation of U.S. patent application Ser. No. 10/661,835, filed Sep. 12, 2003 (now U.S. Pat. No. 7,024,278), which claims priority under 35 U.S.C. § 119(e) to U.S. Provisional Application 60/410,480, filed on Sep. 13, 2002.

U.S. patent application Ser. No. 12/512,114 is also a continuation-in-part of, and claims priority under 35 U.S.C. § 120 from, U.S. patent application Ser. No. 12/255,393, filed on Oct. 21, 2008, which is a continuation of U.S. patent application Ser. No. 11/860,272, filed on Sep. 24, 2007 (now U.S. Pat. No. 7,459,871), which is a continuation of U.S. patent application Ser. No. 11/533,294, filed on Sep. 19, 2006 (now U.S. Pat. No. 7,288,912), which is a continuation of U.S. patent application Ser. No. 11/109,832, filed on Apr. 19, 2005, which is a continuation of U.S. patent application Ser. No. 10/766,303, filed on Jan. 28, 2004.

The disclosures of these prior applications are considered part of the disclosure of this application and are hereby incorporated herein by reference in their entireties.

This U.S. patent application is related to commonly-owned U.S. patent application Ser. No. 10/056,804, filed on Jan. 24, 2002 entitled "Method and System for Robot Localization and Confinement", U.S. patent application Ser. No. 10/320,729, filed on Dec. 16 2002, entitled "Autonomous Floor-Cleaning Device", U.S. patent application Ser. No. 10/167,851, filed on Jun. 12, 2002, entitled "Method and System for Multi-Mode Coverage for an Autonomous Robot", and U.S. continuation-in-part patent application Ser. No. 10/453,202, filed on Jun. 3, 2003, entitled "Robot Obstacle Detection System", each of which is hereby incorporated herein by reference in its entirety.

TECHNICAL FIELD

This disclosure relates to relates to a navigational control system for a robotic device.

BACKGROUND

Robotic engineers have long worked on developing an effective method of autonomous cleaning. This has led to the development of two separate and distinct schemes for autonomous robotic devices: (1) deterministic cleaning; and (2) random cleaning.

In deterministic cleaning, where the cleaning rate equals the coverage rate and is, therefore, a more efficient cleaning method than random-motion cleaning, the autonomous robotic device follows a defined path, e.g., a boustrophedon path that is calculated to facilitate complete cleaning coverage of a given area while eliminating redundant cleaning Deterministic cleaning requires that the robotic device maintain precise position knowledge at all times, as well as its position history (where it has been), which, in turn, requires a sophisticated positioning system. A suitable positioning system—a positioning system suitably accurate for deterministic cleaning might rely on scanning laser ranging systems, ultrasonic transducers, a carrier phase differential GPS, or other sophisticated methods—is typically prohibitively expensive and labor intensive, requiring an involved pre-setup to accommodate the unique conditions of each area to be cleaned, e.g., room geometry, furniture locations. In addition, methods that rely on global positioning are typically incapacitated by failure of any part of the positioning system.

One illustrative example of a highly sophisticated (and relatively expensive) robotic device for deterministic cleaning is the RoboScrub device built by Denning Mobile Robotics and Windsor Industries. The RoboScrub device employs sonar and infrared detectors, bump sensors, and a high-precision laser navigation system to define the deterministic cleaning path. The navigation system employed with the RoboScrub device requires numerous large bar code targets to be set up in various strategic positions within the area to be cleaned, and effective operation of the navigation system requires that at least four of such targets be visible simultaneously. This target accessibility requirement effectively limits the use of the RoboScrub device to large uncluttered open areas.

Other representative deterministic robotic devices are described in U.S. Pat. No. 5,650,702 (Azumi), U.S. Pat. No. 5,548,511 (Bancroft), U.S. Pat. No. 5,537,017 (Feiten et al.), U.S. Pat. No. 5,353,224 (Lee et al.), U.S. Pat. No. 4,700,427 (Knepper), and U.S. Pat. No. 4,119,900 (Kreimnitz). These representative deterministic robotic devices are likewise relatively expensive, require labor intensive pre-setup, and/or are effectively limited to large, uncluttered areas of simple geometric configuration (square, rectangular rooms with minimal (or no) furniture).

Due to the limitations and difficulties inherent in purely deterministic cleaning systems, some robotic devices rely on pseudo-deterministic cleaning schemes such as dead reckoning. Dead reckoning consists of continually measuring the precise rotation of each drive wheel (e.g., using optical shaft encoders) to continually calculate the current position of the robotic device, based upon a known starting point and orientation. In addition to the disadvantages of having to start cleaning operations from a fixed position with the robotic device in a specified orientation, the drive wheels of dead reckoning robotic devices are almost always subject to some degree of slippage, which leads to errors in the calculation of current position. Accordingly, dead reckoning robotic devices are generally considered unreliable for cleaning operations of any great duration—resulting in intractable system neglect, i.e., areas of the surface to be cleaned are not cleaned. Other representative examples of pseudo-deterministic robotic devices are described in U.S. Pat. No. 6,255,793 (Peless et al.) and U.S. Pat. No. 5,109, 566 (Kobayashi et al.).

A robotic device operating in random motion, under the control of one or more random-motion algorithms stored in the robotic device, represents the other basic approach to cleaning operations using autonomous robotic devices. The robotic device autonomously implement such random-motion algorithm(s) in response to internal events, e.g., signals generated by a sensor system, elapse of a time period (random or predetermined). In a typical room without obstacles, a robotic device operating under the control of a random-motion algorithm will provide acceptable cleaning coverage given enough cleaning time. Compared to a robotic device operating in a deterministic cleaning mode, a robotic device utilizing a random-motion algorithm must operate for a longer period of time to achieve acceptable cleaning coverage. To have a high confidence that a random-motion robotic device has cleaned 98% of an obstacle-free room, the random-motion robotic device must run approximately five times longer than a deterministic robotic device having similarly sized cleaning mechanisms and moving at approximately the same speed.

However, an area to be cleaned that includes one or more randomly-situated obstacles causes a marked increase in the running time for a random-motion robotic device to effect 98% cleaning coverage. Therefore, while a random motion robotic device is a relatively inexpensive means of cleaning a defined working area as contrasted to a deterministic robotic device, the random-motion robotic device requires a significantly higher cleaning time.

A need exists to provide a deterministic component to a random-motion robotic device to enhance the cleaning efficiency thereof to reduce the running time for the random-motion robotic cleaning to achieve a 98% cleaning coverage.

SUMMARY

The present disclosure provides a debris sensor, and apparatus utilizing such a debris sensor, wherein the sensor is instantaneously responsive to debris strikes, and can be used to control, select or vary the operational mode of an autonomous or non-autonomous cleaning apparatus containing such a sensor.

In one aspect of the disclosure, an autonomous cleaning apparatus includes a chassis, a drive system disposed on the chassis and operable to enable movement of the cleaning apparatus, and a controller in communication with the drive system. The controller includes a processor operable to control the drive system to steer movement of the cleaning apparatus. The autonomous cleaning apparatus includes a cleaning head system disposed on the chassis and a sensor system in communication with the controller. The sensor system includes a debris sensor for generating a debris signal, a bump sensor for generating a bump signal, and an obstacle following sensor disposed on a side of the autonomous cleaning apparatus for generating an obstacle signal. The processor executes a prioritized arbitration scheme to identify and implement one or more dominant behavioral modes based upon at least one signal received from the sensor system.

Implementations of the disclosure may include one or more of the following features. In some implementations, the processor implements a spot cleaning mode in an area in which the cleaning apparatus was operating, substantially immediately in response to receiving a debris signal generated by the debris sensor. The spot cleaning mode may comprise maneuvering the autonomous cleaning apparatus according to a self-bounded area algorithm. The self-bounded area algorithm may include a spiraling algorithm at a reduced drive speed. In some implementations, the processor implements a high power cleaning mode in response to the debris signal. The high power mode includes elevating power delivery to the cleaning head system.

In some implementations, the debris sensor includes a piezoelectric sensor located proximate to a cleaning pathway and responsive to a debris impact thereon to generate a debris signal indicative of such impact. The debris sensor may include a plate, an elastomer pad supporting the plate, and a piezoelectric material and an electrode both secured to the plate. The electrode is in communication with the controller. In some examples, the debris sensor includes a piezoelectric film.

In some implementations, the sensor system includes right and left debris sensors in communication with the controller and disposed proximate a cleaning pathway of the cleaning head system for generating respective debris signals. The processor directs the drive system to turn right in response to the debris signal generated by the right debris sensor and to turn left in response to the debris signal generated by the left debris sensor. The right and left debris sensors may be disposed opposite each other and equidistantly from a center axis defined by the cleaning pathway.

The bump sensor may include a displaceable bumper attached to the chassis and at least one break-beam sensor disposed on the displaceable bumper. The break-beam sensor is activated upon displacement of the bumper toward the chassis.

The obstacle following sensor may include an emitter emitting an emission signal laterally and a detector configured to detect the emission reflected off an obstacle adjacent the cleaning apparatus. The emitter and the detector are configured to establish a focal point. The obstacle following sensor may be disposed on a dominant side of the autonomous cleaning apparatus.

In some implementations, the sensor system includes a cliff sensor for generating a cliff signal upon detection of a cliff. The cliff sensor includes an emitter emitting an emission signal downwardly and a detector configured to detect the emission reflected off a surface being traversed by the cleaning apparatus. The emitter and the detector are configured to establish a focal point below the cleaning apparatus. In some examples, the sensor system includes a wheel drop sensor and/or a stall sensor.

In another aspect of the disclosure, an autonomous cleaning apparatus includes a chassis a drive system disposed on the chassis and operable to enable movement of the cleaning apparatus, and a controller in communication with the drive system. The controller includes a processor operable to control the drive system to steer movement of the cleaning apparatus. The autonomous cleaning apparatus includes a cleaning head system disposed on the chassis and a sensor system in communication with the controller. The sensor system includes a debris sensor for generating a debris signal, a bump sensor for generating a bump signal, and an obstacle following sensor disposed on a side of the autonomous cleaning apparatus for generating an obstacle signal. The processor executes a prioritized arbitration scheme to identify and implement one or more dominant behavioral modes based upon at least one signal received from the sensor system. The processor controls one or more operational conditions of the autonomous cleaning apparatus based upon the debris signal. The processor controls the drive system to execute a pattern of movements to steer the autonomous cleaning apparatus toward a debris area corresponding to the debris signal generated by the debris sensor.

In yet another aspect of the disclosure, an autonomous cleaning apparatus includes a drive system operable to enable movement of the cleaning apparatus, a controller in communication with the drive system, and a debris sensor for generating a debris signal indicating that the cleaning apparatus has encountered debris. The controller includes a processor operable to control the drive system to provide at least one pattern of movement of the cleaning apparatus. The debris sensor is located along a cleaning passageway of the cleaning apparatus and responsive to debris passing through the cleaning passageway to generate a signal indicative of such passing. The processor is responsive to the debris signal to select a pattern of movement of the cleaning apparatus. The pattern of movement includes steering the cleaning apparatus toward an area containing debris. In some implementations, the pattern of movement includes spot coverage of an area containing debris.

One aspect of the disclosure is an autonomous cleaning apparatus including a drive system operable to enable movement of the cleaning apparatus, a controller in communication with the drive system, the controller including a processor operable to control the drive system to provide at least one pattern of movement of the cleaning apparatus; and a debris sensor for generating a debris signal indicating that the cleaning apparatus has encountered debris; wherein the processor is responsive to the debris signal to select an operative mode from among predetermined operative modes of the cleaning apparatus.

The selection of operative mode could include selecting a pattern of movement of the cleaning apparatus. The pattern of movement can include spot coverage of an area containing debris, or steering the cleaning apparatus toward an area containing debris. The debris sensor could include spaced-apart first and second debris sensing elements respectively operable to generate first and second debris signals; and the processor can be responsive to the respective first and second debris signals to select a pattern of movement, such as steering toward a side (e.g., left or right side) with more debris.

The debris sensor can include a piezoelectric sensor element located proximate to a cleaning pathway of the cleaning apparatus and responsive to a debris strike to generate a signal indicative of such strike.

The debris sensor can also be incorporated into a non-autonomous cleaning apparatus. This aspect of the invention can include a piezoelectric sensor located proximate to a cleaning pathway and responsive to a debris strike to generate a debris signal indicative of such strike; and a processor responsive to the debris signal to change an operative mode of the cleaning apparatus. The change in operative mode could include illuminating a user-perceptible indicator light, changing a power setting (e.g., higher power setting when more debris is encountered), or slowing or reducing a movement speed of the apparatus.

A further aspect of the disclosure is a debris sensor, including a piezoelectric element located proximate to or within a cleaning pathway of the cleaning apparatus and responsive to a debris strike to generate a first signal indicative of such strike, and a processor operable to process the first signal to generate a second signal representative of a characteristic of debris being encountered by the cleaning apparatus. That characteristic could be, for example, a quantity or volumetric parameter of the debris, or a vector from a present location of the cleaning apparatus to an area containing debris.

Another aspect of the disclosure takes advantage of the motion of an autonomous cleaning device across a floor or other surface, processing the debris signal in conjunction with knowledge of the cleaning device's movement to calculate a debris gradient. The debris gradient is representative of changes in debris strikes count as the autonomous cleaning apparatus moves along a surface. By examining the sign of the gradient (positive or negative, associated with increasing or decreasing debris), an autonomous cleaning device controller can continuously adjust the path or pattern of movement of the device to clean a debris field most effectively.

Another aspect of the disclosure includes a navigational control system that enhances the cleaning efficiency of a robotic device by adding a deterministic component (in the form of a conduct prescribed by a navigation control algorithm) to the random motion of the robotic device generated by predetermined behavioral modes stored in the robotic device.

Yet another aspect of the disclosure includes a navigational control unit operating under a navigation control algorithm that includes a predetermined triggering event that defines when the prescribed conduct will be implemented by the robotic device.

These and other aspects of the disclosure are achieved by means of a navigational control system for deterministically altering movement activity of a robotic device operating in a defined working area, comprising a transmitting subsystem integrated in combination with the robotic device, the transmitting subsystem comprising means for emitting a number of directed beams, each directed beam having a predetermined emission pattern, and a receiving subsystem functioning as a base station that includes a navigation control algorithm that defines a predetermined triggering event for the navigational control system and a set of detection units positioned within the defined working area, the detection units being positioned in a known aspectual relationship with respect to one another, the set of detection units being configured and operative to detect one or more of the directed beams emitted by the transmitting system; and wherein the receiving subsystem is configured and operative to process the one or more detected directed beams under the control of the navigational control algorithm to determine whether the predetermined triggering event has occurred, and, if the predetermined triggering event has occurred transmit a control signal to the robotic device, wherein reception of the control signal by the robotic device causes the robotic device to implement a prescribed conduct that deterministically alters the movement activity of the robotic device.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 6 and 6A-6C are schematic diagrams of signal processing circuitry for the debris sensor architecture of FIG. 5.

FIG. 8 is a flowchart of operating a debris sensor.

Like reference symbols in the various drawings indicate like elements.

DETAILED DESCRIPTION

While the debris sensor of the present disclosure can be incorporated into a wide range of autonomous cleaning devices (and indeed, into non-autonomous cleaning devices as shown by way of example in FIG. 7), it will first be described in the context of an exemplary autonomous cleaning device shown in FIGS. 1-3.

Figure 1:
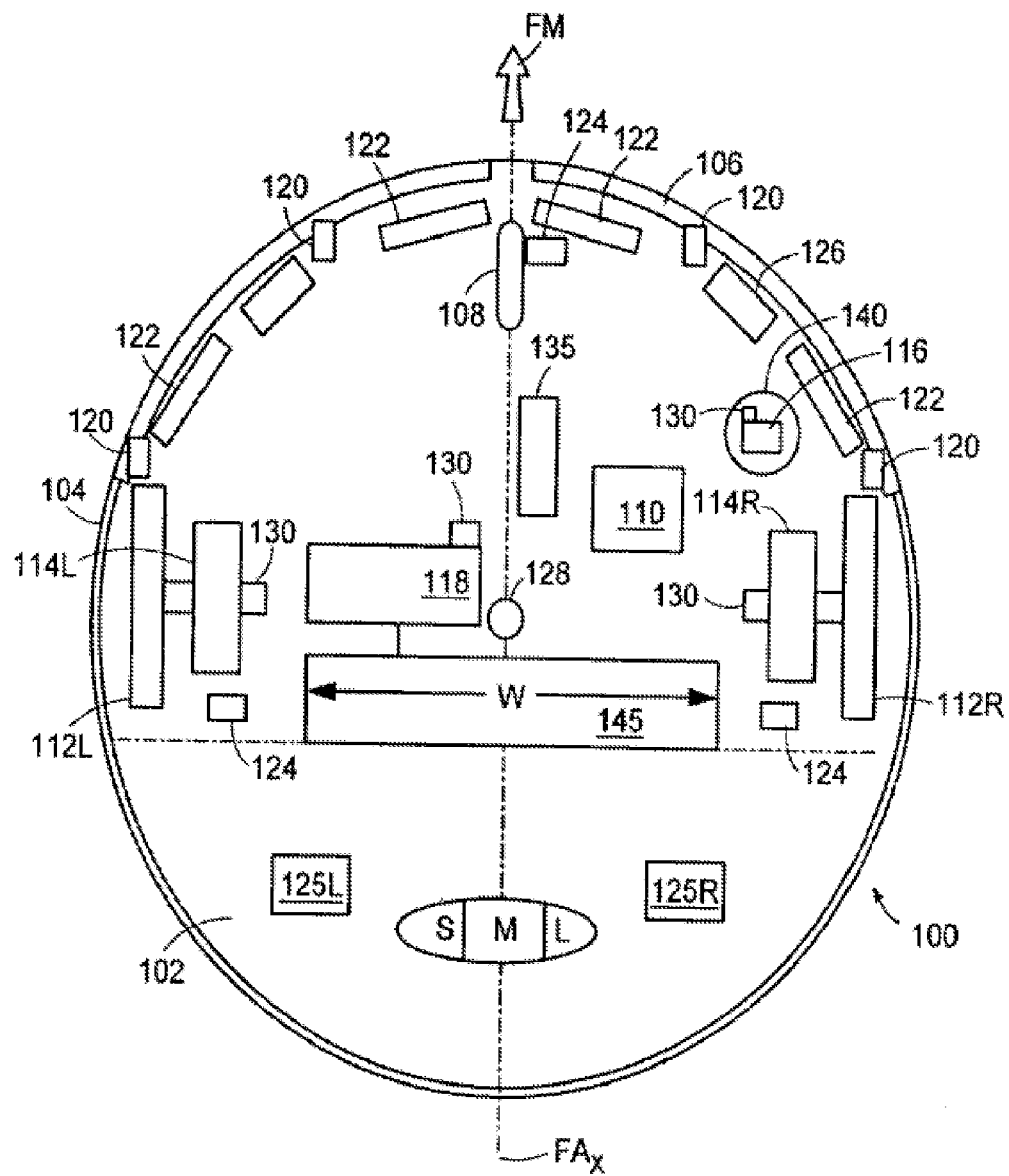
FIG. 1 is a top-view schematic of an exemplary robotic device having particular utility for use in the navigational control system.

FIG. 1 is a top-view schematic of an exemplary preferred embodiment of a robotic device 100 having particular utility in combination with a navigational control system 10 according to the present invention. FIG. 2 is a block diagram of the hardware of the robot device 100 of FIG. 1.

The hardware and behavioral modes (coverage behaviors for cleaning operations; escape behaviors for transitory movement patterns; and safety behaviors for emergency conditions) of the robotic device 100, which is manufactured, distributed, and/or marketed by the iRobot Corporation of Burlington, Mass. under the ROOMBA trademark, are briefly described in the following paragraphs to facilitate a more complete understanding of the navigational control system 10 of the present invention. Further details regarding the hardware and behavioral modes of the robotic device 100 can be found in commonly-owned, co-pending U.S. nonprovisional patent application Ser. No. 10/167,851, filed 12 Jun. 2002, entitled METHOD AND SYSTEM FOR MULTI-MODE COVERAGE FOR AN AUTONOMOUS ROBOT, and U.S. nonprovisional patent application Ser. No. 10/320,729, filed 16 Dec. 2002, entitled AUTONOMOUS FLOOR-CLEANING DEVICE.

In the following description of the robotic device 100, use of the terminology "forward"/"fore" refers to the primary direction of motion (forward) of the robotic device (see arrow identified by reference character "FM" in FIG. 1). The fore/aft axis $FA_X$ of the robotic device 100 coincides with the medial diameter of the robotic device 100 that divides the robotic device 100 into generally symmetrical right and left halves, which are defined as the dominant and non-dominant sides, respectively.

Robotic Device

The robotic device 100 has a generally cylindrical housing infrastructure that includes a chassis 102 and an outer shell 104 secured to the chassis 102 that define a structural envelope of minimal height (to facilitate movement under furniture). The hardware comprising the robotic device 100 can be generally categorized as the functional elements of a power system, a motive power system, a sensor system, a control module, a side brush assembly, or a self-adjusting cleaning head system, respectively, all of which are integrated in combination with the housing infrastructure. In addition to such categorized hardware, the robotic device 100 further includes a forward bumper 106 having a generally arcuate configuration and a nose-wheel assembly 108.

The forward bumper 106 (illustrated as a single component; alternatively, a two-segment component) is integrated in movable combination with the chassis 102 (by means of displaceable support members pairs) to extend outwardly therefrom. Whenever the robotic device 100 impacts an obstacle (e.g., wall, furniture) during movement thereof, the bumper 106 is displaced (compressed) towards the chassis 102 and returns to its extended (operating) position when contact with the obstacle is terminated.

The nose-wheel assembly 108 is mounted in biased combination with the chassis 102 so that the nose-wheel subassembly 108 is in a retracted position (due to the weight of the robotic device 100) during cleaning operations wherein it rotates freely over the surface being cleaned. When the nose-wheel subassembly 108 encounters a drop-off during operation (e.g., descending stairs, split-level floors), the nose-wheel assembly 108 is biased to an extended position.

The hardware of the power system, which provides the energy to power the electrically-operated hardware of the robotic device 100, comprises a rechargeable battery pack 110 (and associated conduction lines, not shown) that is integrated in combination with the chassis 102.

The motive power system provides the means that propels the robotic device 100 and operates the cleaning mechanisms, e.g., side brush assembly and the self-adjusting cleaning head system, during movement of the robotic device 100. The motive power system comprises left and right main drive wheel assemblies 112L, 112R, their associated independent electric motors 114L, 114R, and electric motors 116, 118 for operation of the side brush assembly and the self-adjusting cleaning head subsystem, respectively.

The main drive wheel assemblies 112L, 112R are independently mounted in biased combination with the chassis 102 (for pivotal motion with respect thereto) at opposed ends of the transverse diameter (with respect to the fore-aft axis $FA_X$) of the robotic device 100 and are in a retracted position (due to the weight of the robotic device 100) during operation thereof wherein the axes of rotation are approximately coplanar with the bottom of the chassis 102. If the robotic device 100 is removed from the surface being cleaned, the main wheel assemblies 112L, 112R are pivotally-biased to an extended position wherein their axes of rotation are below the bottom plane of the chassis 102 (in this extended position the rechargeable battery pack 110 is automatically turned off by the control module executing one of the safety behavioral modes).

The electric motors 114L, 114R are mechanically coupled to the main drive wheel assemblies 112L, 112R, respectively, and independently operated by control signals generated by the control module as a response to the implementation of a behavioral mode. Independent operation of the electric motors 114L, 114R allows the main wheel assemblies 112L, 112R to be: (1) rotated at the same speed in the same direction to propel the robotic device 100 in a straight line, forward or aft; (2) differentially rotated (including the condition wherein one wheel assembly is not rotated) to effect a variety of right and/or left turning patterns (over a spectrum of sharp to shallow turns) for the robotic device 100; and (3) rotated at the same speed in opposite directions to cause the robotic device 100 to turn in place, i.e., "spin on a dime", to provide an extensive repertoire of movement capability for the robotic device 100.

The sensor system comprises a variety of different sensor units that are operative to generate signals that control the behavioral mode operations of the robotic device 100. The described robotic device 100 includes obstacle detection units 120, cliff detection units 122, wheel drop sensors 124, an obstacle-following unit 126, a virtual wall omnidirectional detector 128, stall-sensor units 130, and main wheel encoder units 132, and left and right debris sensors 125L, 125R.

For the described embodiment, the obstacle ("bump") detection units 120 are IR break beam sensors mounted in combination with the displaceable support member pairs of the forward bumper 106. These detection units 120 are operative to generate one or more signals indicating relative displacement between one or more support member pairs whenever the robotic device 100 impacts an obstacle such that the forward bumper 106 is compressed. These signals are processed by the control module to determine an approximate point of contact with the obstacle relative to the fore-aft axis $FA_X$ of the robotic device 100 (and the behavioral mode(s) to be implemented).

The cliff detection units 122 are mounted in combination with the forward bumper 106. Each cliff detection unit 122 comprises an IR emitter—detector pair configured and operative to establish a focal point such that radiation emitted downwardly by the emitter is reflected from the surface being traversed and detected by the detector. If reflected radiation is not detected by the detector, i.e., a drop-off is encountered, the cliff detection unit 122 transmits a signal to the control module (which causes one or more behavioral modes to be implemented).

A wheel drop sensor 124 such as a contact switch is integrated in combination with each of the main drive wheel assemblies 112L, 112R and the nose wheel assembly 108 and is operative to generate a signal whenever any of the wheel assemblies is in an extended position, i.e., not in contact with the surface being traversed, (which causes the control module to implement one ore more behavioral modes).

The obstacle-following unit 126 for the described embodiment is an IR emitter-detector pair mounted on the 'dominant' side (right hand side of FIG. 1) of the robotic device 100. The emitter-detector pair is similar in configuration to the cliff detection units 112, but is positioned so that the emitter emits radiation laterally from the dominant side of the robotic device 100. The unit 126 is operative to transmit a signal to the control module whenever an obstacle is detected as a result of radiation reflected from the obstacle and detected by the detector. The control module, in response to this signal, causes one or more behavioral modes to be implemented.

A virtual wall detection system for use in conjunction with the described embodiment of the robotic device 100 comprises an omnidirectional detector 128 mounted atop the outer shell 104 and a stand-alone transmitting unit (not shown) that transmits an axially-directed confinement beam. The stand-alone transmitting unit is positioned so that the emitted confinement beam blocks an accessway to a defined working area, thereby restricting the robotic device 100 to operations within the defined working area (e.g., in a doorway to confine the robotic device 100 within a specific room to be cleaned). Upon detection of the confinement beam, the omnidirectional detector 128 transmits a signal to the control module (which causes one or more behavioral modes to be implemented to move the robotic device 100 away from the confinement beam generated by the stand-alone transmitting unit).

A stall sensor unit 130 is integrated in combination with each electric motor 114L, 114R, 116, 118 and operative to transmit a signal to the control module when a change in current is detected in the associated electric motor (which is indicative of a dysfunctional condition in the corresponding driven hardware). The control module is operative in response to such a signal to implement one or more behavioral modes.

An IR encoder unit 132 (see FIG. 2) is integrated in combination with each main wheel assembly 112L, 112R and operative to detect the rotation of the corresponding wheel and transmit signals corresponding thereto the control module (wheel rotation can be used to provide an estimate of distance traveled for the robotic device 100).

Figure 2:
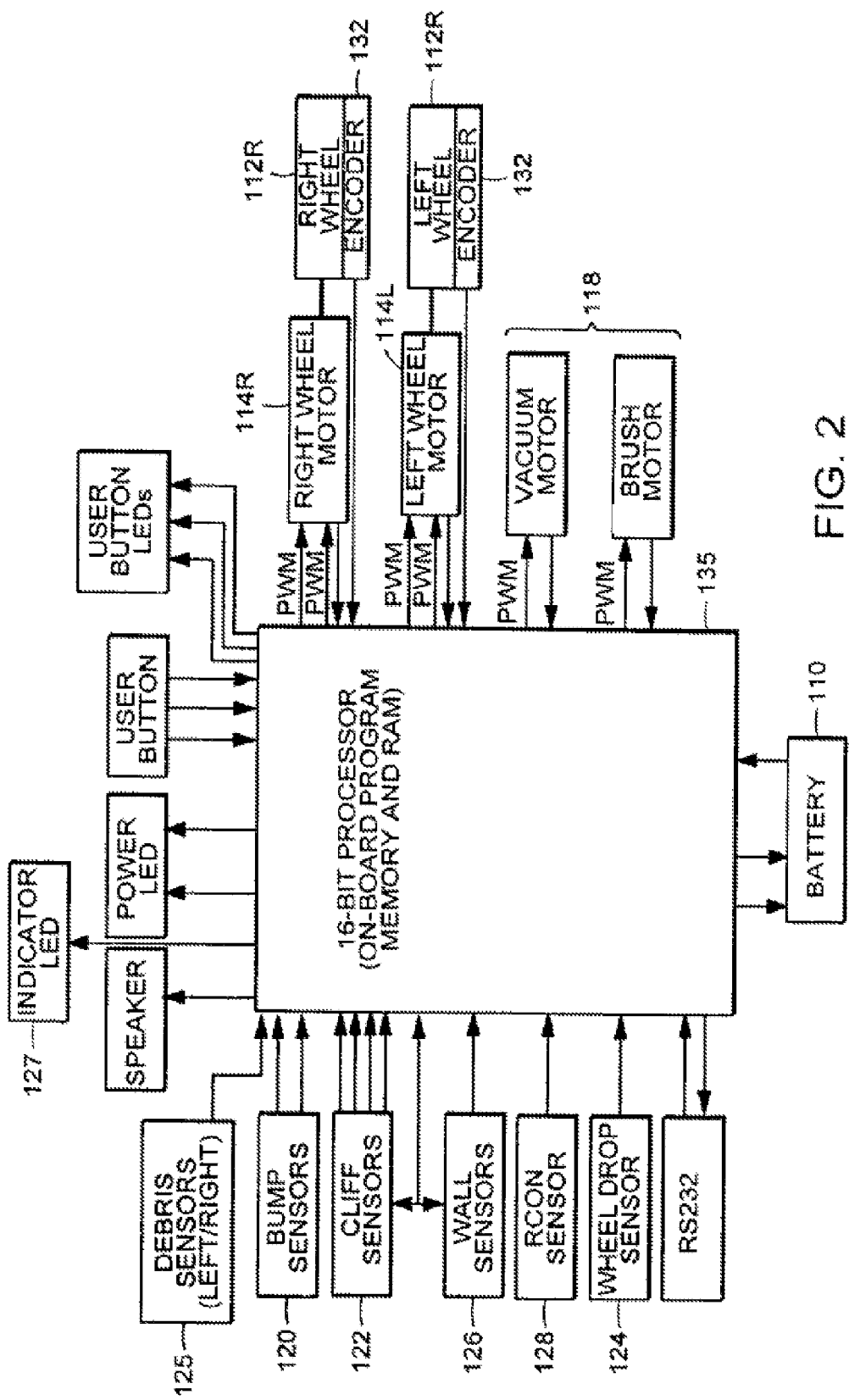
FIG. 2 is an exemplary hardware block diagram for the robotic device of FIG. 1.

The control module comprises the microprocessing unit 135 illustrated in FIG. 2 that includes I/O ports connected to the sensors and controllable hardware of the robotic device 100, a microcontroller, and ROM and RAM memory. The I/O ports function as the interface between the microcontroller and the sensor units and controllable hardware, transferring signals generated by the sensor units to the microcontroller and transferring control (instruction) signals generated by the microcontroller to the controllable hardware to implement a specific behavioral mode.

The microcontroller is operative to execute instruction sets for processing sensor signals, implementing specific behavioral modes based upon such processed signals, and generating control (instruction) signals for the controllable hardware based upon implemented behavioral modes for the robotic device 100. The cleaning coverage and control programs for the robotic device 100 are stored in the ROM of the microprocessing unit 135, which includes the behavioral modes, sensor processing algorithms, control signal generation algorithms and a prioritization algorithm for determining which behavioral mode or modes are to be given control of the robotic device 100. The RAM of the microprocessing unit 135 is used to store the active state of the robotic device 100, including the ID of the behavioral mode(s) under which the robotic device 100 is currently being operated and the hardware commands associated therewith.

Referring again to FIG. 1, the side brush assembly 140 is configured and operative to entrain particulates outside the periphery of the housing infrastructure and to direct such particulates towards the self-adjusting cleaning head system. The side brush assembly 140 provides the robotic device 100 with the capability of cleaning surfaces adjacent to base-boards when the robotic device is operated in an Obstacle-Following behavioral mode. As shown in FIG. 1, the side brush assembly 140 is preferably mounted in combination with the chassis 102 in the forward quadrant on the dominant side of the robotic device 100.

The self-adjusting cleaning head system 145 for the described robotic device 100 comprises a dual-stage brush assembly and a vacuum assembly, each of which is independently powered by an electric motor (reference numeral 118 in FIG. 1 actually identifies two independent electric motors—one for the brush assembly and one for the vacuum assembly). The cleaning capability of the robotic device 100 is commonly characterized in terms of the width of the cleaning head system 145 (see reference character W in FIG. 1).

The dual-stage brush assembly and the inlet of the vacuum assembly are integrated in combination with a deck structure, which is pivotally mounted in combination with the chassis 102 and operatively integrated with the motor of the dual-stage brush assembly. In response to a predetermined reduction in rotational speed of the brush assembly motor, the brush assembly motor provides the motive force to pivot the deck structure with respect to the chassis 102. The pivoting deck structure provides the self adjusting capability for the cleaning head assembly 145, which allows the robotic device 100 to readily transition between disparate surfaces during cleaning operations, e.g., carpeted surface to bare surface or vice versa, without hanging up.

The dual-stage brush assembly comprises asymmetric, counter-rotating brushes that are positioned (forward of the inlet of the vacuum assembly), configured and operative to direct particulate debris into a removable dust cartridge (not shown). The positioning, configuration, and operation of the brush assembly concomitantly directs particulate debris towards the inlet of the vacuum assembly such that particulates that are not swept up by the dual-stage brush assembly can be subsequently ingested by the vacuum assembly as a result of movement of the robotic device 100.

Operation of the vacuum assembly independently of the self-adjustable brush assembly allows the vacuum assembly to generate and maintain a higher vacuum force using a battery-power source than would be possible if the vacuum assembly were operated in dependence with the brush assembly.

Figure 3:
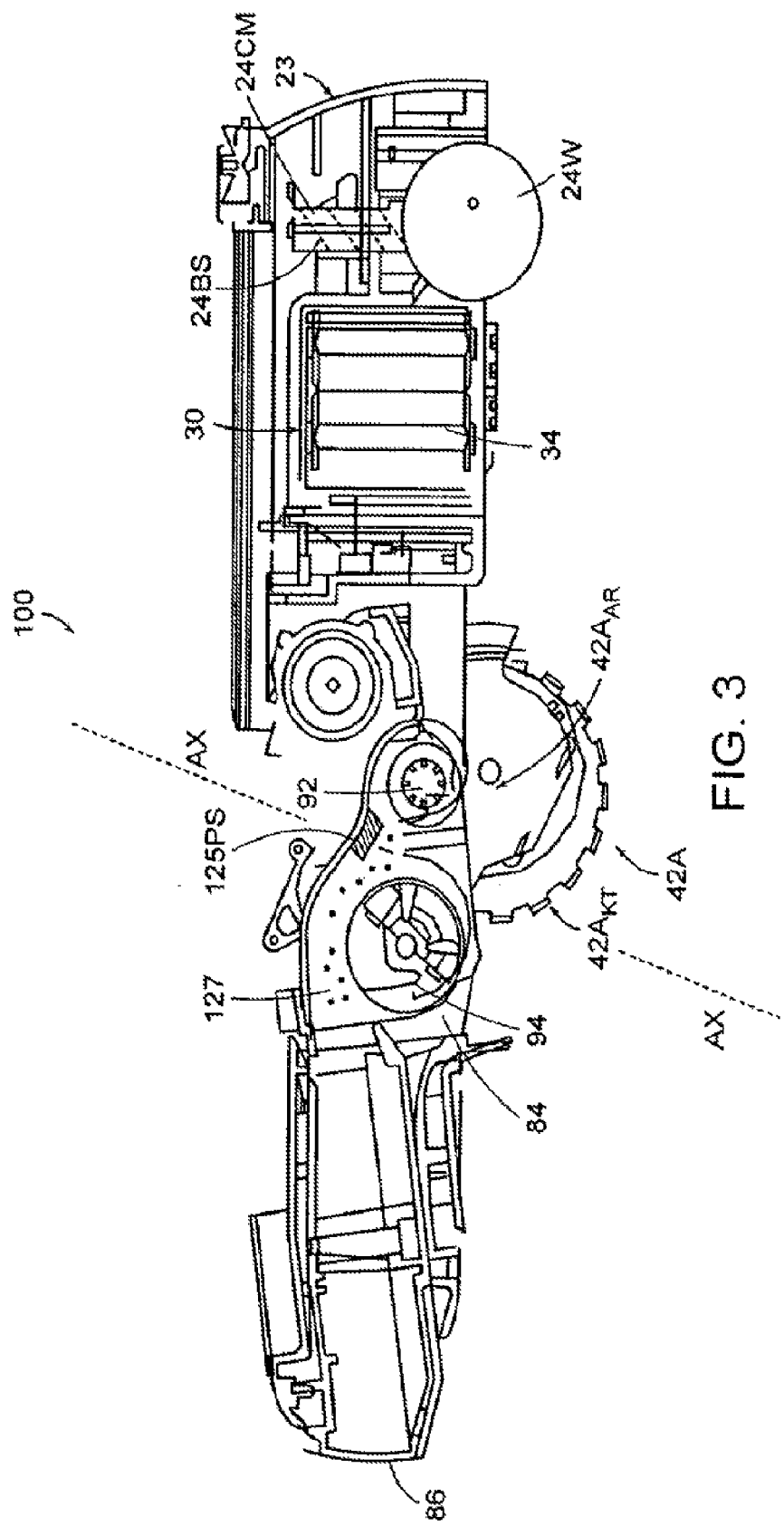
FIG. 3 is a side view of the robotic device of FIG. 1, showing a debris sensor situated in a cleaning or vacuum pathway, where it will be struck by debris upswept by the main cleaning brush element.

Referring now to FIG. 3, in some implementations of a robotic cleaning device, the cleaning brush assembly includes asymmetric, counter-rotating flapper and main brush elements 92 and 94, respectively, that are positioned forward of the vacuum assembly inlet 84, and operative to direct particulate debris 127 into a removable dust cartridge 86. As shown in FIG. 3, the autonomous cleaning apparatus can also include left and right debris sensor elements 125PS, which can be piezoelectric sensor elements, as described in detail below. The piezoelectric debris sensor elements 125PS can be situated in a cleaning pathway of the cleaning device, mounted, for example, in the roof of the cleaning head, so that when struck by particles 127 swept up by the brush elements and/or pulled up by vacuum, the debris sensor elements 125PS generate electrical pulses representative of debris impacts and thus, of the presence of debris in an area in which the autonomous cleaning device is operating.

More particularly, in the arrangement shown in FIG. 3, the sensor elements 125PS are located substantially at an axis AX along which main and flapper brushes 94, 92 meet, so that particles strike the sensor elements 125 PS with maximum force.

As shown in FIG. 1, and described in greater detail below, the robotic cleaning device can be fitted with left and right side piezoelectric debris sensors, to generate separate left and right side debris signals that can be processed to signal the robotic device to turn in the direction of a "dirty" area The operation of the piezoelectric debris sensors, as well as signal processing and selection of behavioral modes based on the debris signals they generate, will be discussed below following a brief discussion of general aspects of behavioral modes for the cleaning device.

Behavioral Modes

The robotic device 100 uses a variety of behavioral modes to effectively clean a defined working area where behavioral modes are layers of control systems that can be operated in parallel. The microprocessor unit 135 is operative to execute a prioritized arbitration scheme to identify and implement one or more dominant behavioral modes for any given scenario based upon inputs from the sensor system.

The behavioral modes for the described robotic device 100 can be characterized as: (1) coverage behavioral modes; (2) escape behavioral modes; and (3) safety behavioral modes. Coverage behavioral modes are primarily designed to allow the robotic device 100 to perform its cleaning operations in an efficient and effective manner and the escape and safety behavioral modes are priority behavioral modes implemented when a signal from the sensor system indicates that normal operation of the robotic device 100 is impaired, e.g., obstacle encountered, or is likely to be impaired, e.g., drop-off detected.

Representative and illustrative coverage behavioral (cleaning) modes for the robotic device 100 include: (1) a Spot Coverage pattern; (2) an Obstacle-Following (or Edge-Cleaning) Coverage pattern, and (3) a Room Coverage pattern. The Spot Coverage pattern causes the robotic device 100 to clean a limited area within the defined working area, e.g., a high-traffic area. In a preferred embodiment the Spot Coverage pattern is implemented by means of a spiral algorithm (but other types of self-bounded area algorithms, e.g., polygonal, can be used). The spiral algorithm, which causes outward spiraling (preferred) or inward spiraling movement of the robotic device 100, is implemented by control signals from the microprocessing unit 135 to the main wheel assemblies 112L, 112R to change the turn radius/radii thereof as a function of time (thereby increasing/decreasing the spiral movement pattern of the robotic device 100).

The robotic device 100 is operated in the Spot Coverage pattern for a predetermined or random period of time, for a predetermined or random distance (e.g., a maximum spiral distance) and/or until the occurrence of a specified event, e.g., activation of one or more of the obstacle detection units 120 (collectively a transition condition). Once a transition condition occurs, the robotic device 100 can implement or transition to a different behavioral mode, e.g., a Straight Line behavioral mode (in a preferred embodiment of the robotic device 100, the Straight Line behavioral mode is a low priority, default behavior that propels the robot in an approximately straight line at a preset velocity of approximately 0.306 m/s) or a Bounce behavioral mode in combination with a Straight Line behavioral mode.

If the transition condition is the result of the robotic device 100 encountering an obstacle, the robotic device 100 can take other actions in lieu of transitioning to a different behavioral mode. The robotic device 100 can momentarily implement a behavioral mode to avoid or escape the obstacle and resume operation under control of the spiral algorithm (i.e., continue spiraling in the same direction). Alternatively, the robotic device 100 can momentarily implement a behavioral mode to avoid or escape the obstacle and resume operation under control of the spiral algorithm (but in the opposite direction—reflective spiraling).

The Obstacle-Following Coverage pattern causes the robotic device 100 to clean the perimeter of the defined working area, e.g., a room bounded by walls, and/or the perimeter of an obstacle (e.g., furniture) within the defined working area. Preferably the robotic device 100 utilizes obstacle-following unit 126 to continuously maintain its position with respect to an obstacle, e.g., wall, furniture, so that the motion of the robotic device 100 causes it to travel adjacent to and concomitantly clean along the perimeter of the obstacle. Different embodiments of the obstacle-following unit 126 can be used to implement the Obstacle-Following behavioral pattern.

In a first embodiment, the obstacle-following unit 126 is operated to detect the presence or absence of the obstacle. In an alternative embodiment, the obstacle-following unit 126 is operated to detect an obstacle and then maintain a predetermined distance between the obstacle and the robotic device 100. In the first embodiment, the microprocessing unit 135 is operative, in response to signals from the obstacle-following unit, to implement small CW or CCW turns to maintain its position with respect to the obstacle. The robotic device 100 implements a small CW when the robotic device 100 transitions from obstacle detection to non-detection (reflection to non-reflection) or to implement a small CCW turn when the robotic device 100 transitions from non-detection to detection (non-reflection to reflection) . Similar turning behaviors are implemented by the robotic device 100 to maintain the predetermined distance from the obstacle.

The robotic device 100 is operated in the Obstacle-Following behavioral mode for a predetermined or random period of time, for a predetermined or random distance (e.g., a maximum or minimum distance) and/or until the occurrence of a specified event, e.g., activation of one or more of the obstacle detection units 120 a predetermined number of times (collectively a transition condition). In certain embodiments, the microprocessor 135 will cause the robotic device to implement an Align behavioral mode upon activation of the obstacle-detection units 120 in the Obstacle-Following behavioral mode wherein the implements a minimum angle CCW turn to align the robotic device 100 with the obstacle.

The Room Coverage pattern can be used by the robotic device 100 to clean any defined working area that is bounded by walls, stairs, obstacles or other barriers (e.g., a virtual wall unit). A preferred embodiment for the Room Coverage pattern comprises the Random-Bounce behavioral mode in combination with the Straight Line behavioral mode. Initially, the robotic device 100 travels under control of the Straight-Line behavioral mode, i.e., straight-line algorithm (main drive wheel assemblies 112L, 112R operating at the same rotational speed in the same direction) until an obstacle is encountered. Upon activation of one or more of the obstacle detection units 120, the microprocessing unit 135 is operative to compute an acceptable range of new directions based upon the obstacle detection unit(s) 126 activated. The microprocessing unit 135 selects a new heading from within the acceptable range and implements a CW or CCW turn to achieve the new heading with minimal movement. In some embodiments, the new turn heading may be followed by forward movement to increase the cleaning efficiency of the robotic device 100. The new heading may be randomly selected across the acceptable range of headings, or based upon some statistical selection scheme, e.g., Gaussian distribution. In other embodiments of the Room Coverage behavioral mode, the microprocessing unit 135 can be programmed to change headings randomly or at predetermined times, without input from the sensor system.

The robotic device 100 is operated in the Room Coverage behavioral mode for a predetermined or random period of time, for a predetermined or random distance (e.g., a maximum or minimum distance) and/or until the occurrence of a specified event, e.g., activation of the obstacle-detection units 120 a predetermined number of times (collectively a transition condition).

A preferred embodiment of the robotic device 100 includes four escape behavioral modes: a Turn behavioral mode, an Edge behavioral mode, a Wheel Drop behavioral mode, and a Slow behavioral mode. One skilled in the art will appreciate that other behavioral modes can be utilized by the robotic device 100. One or more of these behavioral modes may be implemented, for example, in response to a current rise in one of the electric motors 116, 118 of the side brush assembly 140 or dual-stage brush assembly above a low or high stall threshold, forward bumper 106 in compressed position for determined time period, detection of a wheel-drop event.

In the Turn behavioral mode, the robotic device 100 turns in place in a random direction, starting at higher velocity (e.g., twice normal turning velocity) and decreasing to a lower velocity (one-half normal turning velocity), i.e., small panic turns and large panic turns, respectively. Low panic turns are preferably in the range of 45° to 90°, large panic turns are preferably in the range of 90° to 270°. The Turn behavioral mode prevents the robotic device 100 from becoming stuck on room impediments, e.g., high spot in carpet, ramped lamp base, from becoming stuck under room impediments, e.g., under a sofa, or from becoming trapped in a confined area.

In the Edge behavioral mode follows the edge of an obstacle unit it has turned through a predetermined number of degrees, e.g., 60°, without activation of any of the obstacle detection units 120, or until the robotic device has turned through a predetermined number of degrees, e.g., 170°, since initiation of the Edge behavioral mode. The Edge behavioral mode allows the robotic device 100 to move through the smallest possible openings to escape from confined areas.

In the Wheel Drop behavioral mode, the microprocessor 135 reverses the direction of the main wheel drive assemblies 112L, 112R momentarily, then stops them. If the activated wheel drop sensor 124 deactivates within a predetermined time, the microprocessor 135 then reimplements the behavioral mode that was being executed prior to the activation of the wheel drop sensor 124.

In response to certain events, e.g., activation of a wheel drop sensor 124 or a cliff detector 122, the Slow behavioral mode is implemented to slowed down the robotic device 100 for a predetermined distance and then ramped back up to its normal operating speed.

When a safety condition is detected by the sensor subsystem, e.g., a series of brush or wheel stalls that cause the corresponding electric motors to be temporarily cycled off, wheel drop sensor 124 or a cliff detection sensor 122 activated for greater that a predetermined period of time, the robotic device 100 is generally cycled to an off state. In addition, an audible alarm may be generated.

The foregoing description of behavioral modes for the robotic device 100 are intended to be representative of the types of operating modes that can be implemented by the robotic device 100. One skilled in the art will appreciate that the behavioral modes described above can be implemented in other combinations and/or circumstances.

Debris Sensor

Figure 7:
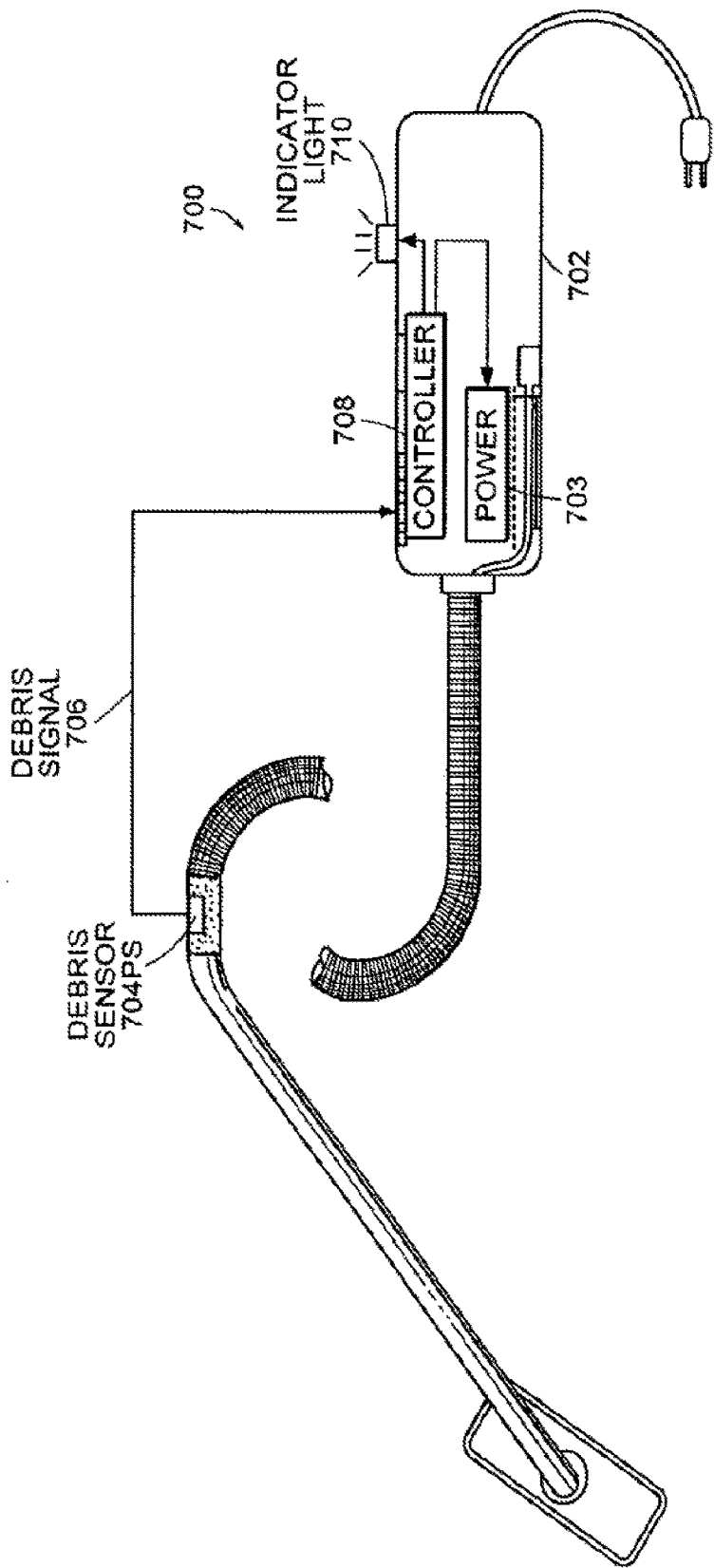
FIG. 7 is a schematic diagram showing the debris sensor in a non-autonomous cleaning apparatus.

As shown in FIGS. 1-3, in accordance with the present invention, an autonomous cleaning device (and similarly, a non-autonomous cleaning device as shown by way of example in FIG. 7) can be improved by incorporation of a debris sensor. In the embodiment illustrated in FIGS. 1 and 3, the debris sensor subsystem comprises left and right piezoelectric sensing elements 125L, 125R situated proximate to or within a cleaning pathway of a cleaning device, and electronics for processing the debris signal from the sensor for forwarding to a microprocessor 135 or other controller.

When employed in an autonomous, robot cleaning device, the debris signal from the debris sensor can be used to select a behavioral mode (such as entering into a spot cleaning mode), change an operational condition (such as speed, power or other), steer in the direction of debris (particularly when spaced-apart left and right debris sensors are used to create a differential signal), or take other actions.

A debris sensor according to the present invention can also be incorporated into a non-autonomous cleaning device. When employed in a non-autonomous cleaning device such as, for example, an otherwise relatively conventional vacuum cleaner 700 like that shown in FIG. 7, the debris signal 706 generated by a piezoelectric debris sensor 704 PS situated within a cleaning or vacuum pathway of the device can be employed by a controlling microprocessor 708 in the body of the vacuum cleaner 702 to generate a user-perceptible signal (such as by lighting a light 710), to increase power from the power system 703, or take some combination of actions (such as lighting a "high power" light and simultaneously increasing power).

The algorithmic aspects of the operation of the debris sensor subsystem are summarized in FIG. 8. As shown therein, a method according to the invention can include detecting left and right debris signals representative of debris strikes, and thus, of the presence, quantity or volume, and direction of debris (802); selecting an operational mode or pattern of movement (such as Spot Coverage) based on the debris signal values (804); selecting a direction of movement based on differential left/right debris signals (e.g., steering toward the side with more debris) (806); generating a user-perceptible signal representative of the presence of debris or other characteristic (e.g., by illuminating a user-perceptible LED) (808); or otherwise varying or controlling an operational condition, such as power (810).

A further practice of the invention takes advantage of the motion of an autonomous cleaning device across a floor or other surface, processing the debris signal in conjunction with knowledge of the cleaning device's movement to calculate a debris gradient (812 in FIG. 8). The debris gradient is representative of changes in debris strikes count as the autonomous cleaning apparatus moves along a surface. By examining the sign of the gradient (positive or negative, associated with increasing or decreasing debris), an autonomous cleaning device controller can continuously adjust the path or pattern of movement of the device to clean a debris field most effectively (812).

Piezoelectric Sensor: As noted above, a piezoelectric transducer element can be used in the debris sensor subsystem of the invention. Piezoelectric sensors provide instantaneous response to debris strikes and are relatively immune to accretion that would degrade the performance of an optical debris sensor typical of the prior art.

Figure 4A:
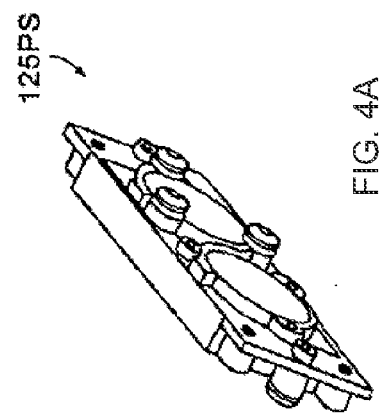
FIG. 4A is a diagram of a piezoelectric debris sensor and FIG. 4B is an exploded diagram of a piezoelectric debris sensor.
Figure 4B:
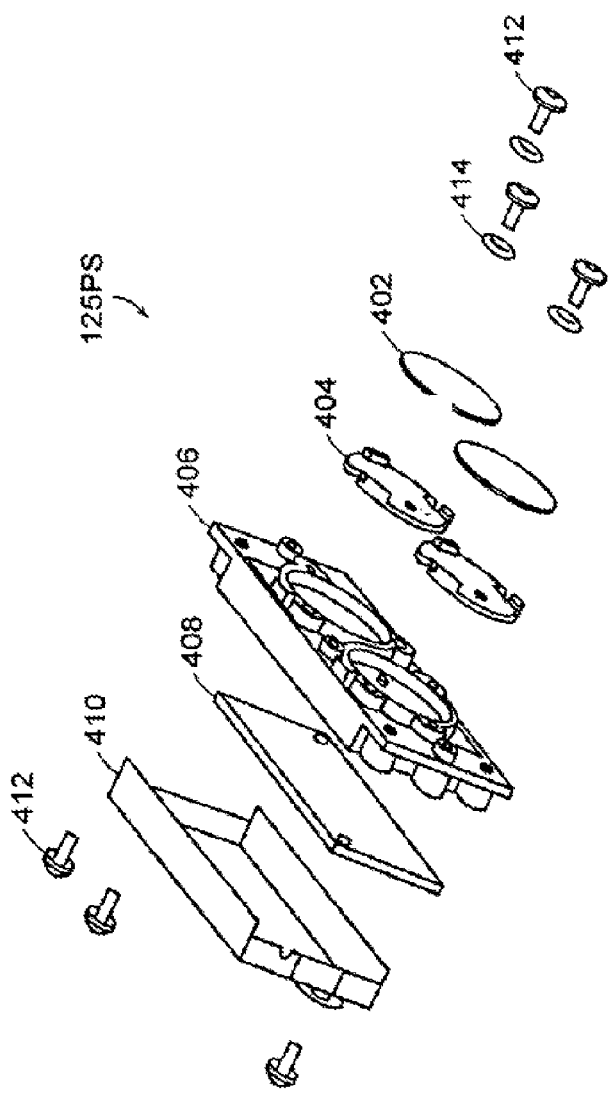

An example of a piezoelectric transducer 125PS is shown in FIG. 4A-4B. Referring now to FIG. 4A-4B, the piezoelectric sensor element 125PS can include one or more 0.20 millimeter thick, 20 millimeter diameter brass disks 402 with the piezoelectric material and electrodes bonded to the topside (with a total thickness of 0.51 mm), mounted to an elastomer pad 404, a plastic dirt sensor cap 406, a debris sensor PC board with associated electronics 408, grounded metal shield 410, and retained by mounting screws (or bolts or the like) 412 and elastomer grommets 414. The elastomer grommets provide a degree of vibration dampening or isolation between the piezoelectric sensor element 125PS and the cleaning device.

In the example shown in FIG. 4A-4B, a rigid piezoelectric disk, of the type typically used as inexpensive sounders, can be used. However, flexible piezoelectric film can also be advantageously employed. Since the film can be produced in arbitrary shapes, its use affords the possibility of sensitivity to debris across the entire cleaning width of the cleaning device, rather than sensitivity in selected areas where, for example, the disks may be located. Conversely, however, film is at present substantially more expensive and is subject to degradation over time. In contrast, brass disks have proven to be extremely robust.

The exemplary mounting configuration shown in FIG. 4A-4B is substantially optimized for use within a platform that is mechanically quite noisy, such as an autonomous vacuum cleaner like that shown in FIG. 3. In such a device, vibration dampening or isolation of the sensor is extremely useful. However, in an application involving a non-autonomous cleaning device such as a canister-type vacuum cleaner like that shown in FIG. 7, the dampening aspects of the mounting system of FIG. 4A-4B may not be necessary. In a non-autonomous cleaning apparatus, an alternative mounting system may involve heat sing the piezoelectric element directly to its housing. In either case, a key consideration for achieving enhanced performance is the reduction of the surface area required to clamp, bolt, or otherwise maintain the piezoelectric element in place. The smaller the footprint of this clamped "dead zone", the more sensitive the piezoelectric element will be.

In operation, debris thrown up by the cleaning brush assembly (e.g., brush 94 of FIG. 3), or otherwise flowing through a cleaning pathway within the cleaning device (e.g., vacuum compartment 104 of FIG. 3) can strike the bottom, all-brass side of the sensor 125 PS (see FIG. 3). In an autonomous cleaning device, as shown in FIG. 3, the debris sensor 125 PS can be located substantially at an axis AX along which main brush 94 and flapper brush 92 meet, so that the particles 127 are thrown up and strike the sensor 125 PS with maximum force.

As is well known, a piezoelectric sensor converts mechanical energy (e.g., the kinetic energy of a debris strike and vibration of the brass disk) into electrical energy—in this case, generating an electrical pulse each time it is struck by debris—and it is this electrical pulse that can be processed and transmitted to a system controller (e.g., controller 135 of FIGS. 1 and 2 or 708 of FIG. 8) to control or cause a change in operational mode, in accordance with the invention. Piezoelectric elements are typically designed for use as audio transducers, for example, to generate beep tones. When an AC voltage is applied, they vibrate mechanically in step with the AC waveform, and generate an audible output. Conversely, if they are mechanically vibrated, they produce an AC voltage output. This is the manner in which they are employed in the present invention. In particular, when an object first strikes the brass face of the sensor, it causes the disk to flex inward, which produces a voltage pulse.

Filtering: However; since the sensor element 125PS is in direct or indirect contact with the cleaning device chassis or body through its mounting system (see FIGS. 3 and 4), it is subject to the mechanical vibrations normally produced by motors, brushes, fans and other moving parts when the cleaning device is functioning. This mechanical vibration can cause the sensor to output an undesirable noise signal that can be larger in amplitude than the signal created by small, low mass debris (such as crushed black pepper) striking the sensor. The end result is that the sensor would output a composite signal composed of lower frequency noise components (up to approximately 16 kHz) and higher frequency, possibly lower amplitude, debris-strike components (greater than 30 kHz, up to hundreds of kHz). Thus, it is useful to provide a way to filter out extraneous signals.

Accordingly, as described below, an electronic filter is used to greatly attenuate the lower frequency signal components to improve signal-to-noise performance. Examples of the architecture and circuitry of such filtering and signal processing elements will next be described in connection with FIGS. 5 and 6.

Signal Processing

Figure 5:
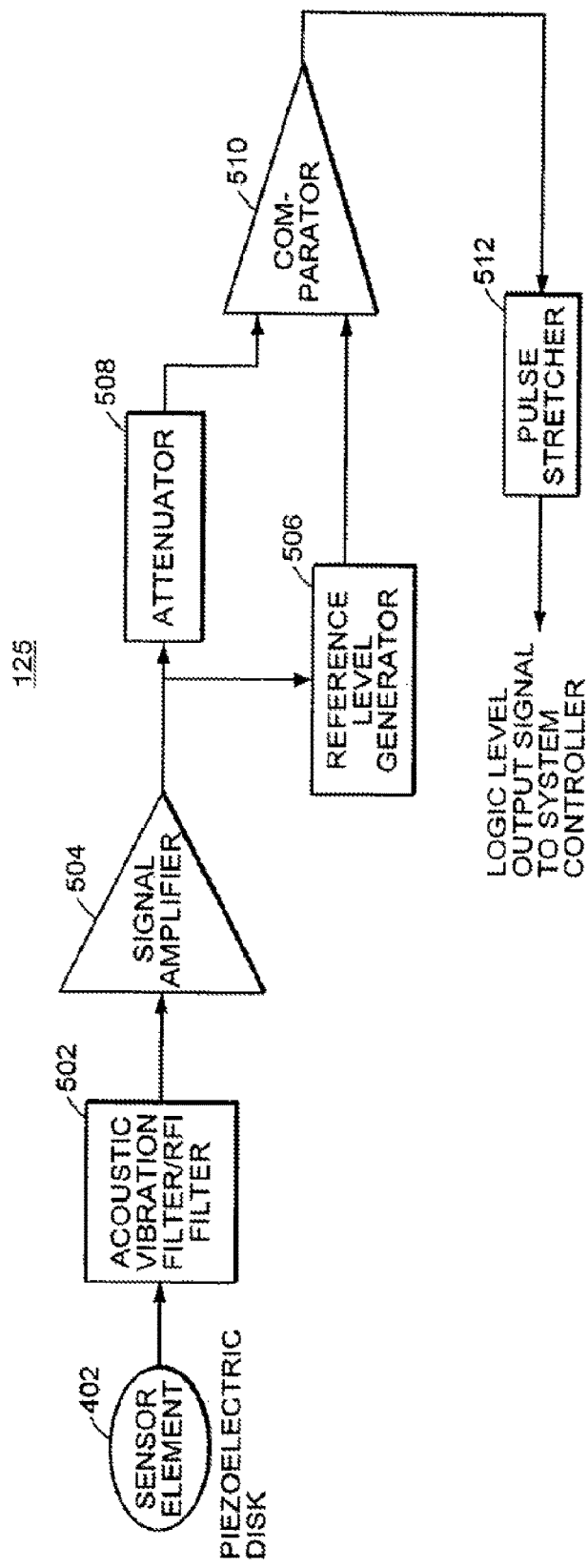
FIG. 5 is a schematic diagram of a debris sensor signal processing architecture.

FIG. 5 is an exemplary schematic diagram of the signal processing elements of a debris sensor subsystem. As noted above, one purpose of a debris sensor is to enable an autonomous cleaning apparatus to sense when it is picking up debris or otherwise encountering a debris field. This information can be used as an input to effect a change in the cleaning behavior or cause the apparatus to enter a selected operational or behavioral mode, such as, for example, the spot cleaning mode described above when debris is encountered. In an non-autonomous cleaning apparatus like that shown in FIG. 7, the debris signal 706 from the debris sensor 704 PS can be used to cause a user-perceptible light 710 to be illuminated (e.g., to signal to the user that debris is being encountered), to raise power output from the power until 703 to the cleaning systems, or to cause some other operational change or combination of changes (e.g., lighting a user-perceptible "high power" light and simultaneously raising power).

Moreover, as noted above, two debris sensor circuit modules (i.e., left and right channels like 125L and 125R of FIG. 1) can be used to enable an autonomous cleaning device to sense the difference between the amounts of debris picked up on the right and left sides of the cleaning head assembly. For example, if the robot encounters a field of dirt off to its left side, the left side debris sensor may indicate debris hits, while the right side sensor indicates no (or a low rate of) debris hits. This differential output could be used by the microprocessor controller of an autonomous cleaning device (such as controller 135 of FIGS. 1 and 2) to steer the device in the direction of the debris (e.g., to steer left if the left-side debris sensor is generating higher signal values than the right-side debris sensor); to otherwise choose a vector in the direction of the debris; or to otherwise select a pattern of movement or behavior pattern such as spot coverage or other.

Thus, FIG. 5 illustrates one channel (for example, the left-side channel) of a debris sensor subsystem that can contain both left and right side channels. The right side channel is substantially identical, and its structure and operation will therefore be understood from the following discussion.

As shown in FIG. 5, the left channel consists of a sensor element (piezoelectric disk) 402, an acoustic vibration filter/RFI filter module 502, a signal amplifier 504, a reference level generator 506, an attenuator 508, a comparator 510 for comparing the outputs of the attenuator and reference level generator, and a pulse stretcher 512. The output of the pulse stretcher is a logic level output signal to a system controller like the processor 135 shown in FIG. 2; i.e., a controller suitable for use in selecting an operational behavior.

The Acoustic Vibration Filter/RFI Filter block 502 can be designed to provide significant attenuation (in one embodiment, better than −45 dB Volts), and to block most of the lower frequency, slow rate of change mechanical vibration signals, while permitting higher frequency, fast rate of change debris-strike signals to pass. However, even though these higher frequency signals get through the filter, they are attenuated, and thus require amplification by the Signal Amplifier block 504.

In addition to amplifying the desired higher frequency debris strike signals, the very small residual mechanical noise signals that do pass through the filter also get amplified, along with electrical noise generated by the amplifier itself, and any radio frequency interference (RFI) components generated by the motors and radiated through the air, or picked up by the sensor and its conducting wires. The signal amplifier's high frequency response is designed to minimize the amplification of very high frequency RFI. This constant background noise signal, which has much lower frequency components than the desired debris strike signals, is fed into the Reference Level Generator block 506. The purpose of module 506 is to create a reference signal that follows the instantaneous peak value, or envelope, of the noise signal. It can be seen in FIG. 5 that the signal of interest, i.e., the signal that results when debris strikes the sensor, is also fed into this block. Thus, the Reference Level Generator block circuitry is designed so that it does not respond quickly enough to high frequency, fast rate of change debris-strike signals to be able to track the instantaneous peak value of these signals. The resulting reference signal will be used to make a comparison as described below.

Referring again to FIG. 5, it will be seen that the signal from amplifier 504 is also fed into the Attenuator block. This is the same signal that goes to the Reference Level Generator 506, so it is a composite signal containing both the high frequency signal of interest (i.e., when debris strikes the sensor) and the lower frequency noise. The Attenuator 508 reduces the amplitude of this signal so that it normally is below the amplitude of the signal from the Reference Level Generator 506 when no debris is striking the sensor element.

The Comparator 510 compares the instantaneous voltage amplitude value of the signal from the Attenuator 508 to the signal from the Reference Level Generator 506. Normally, when the cleaning device operating is running and debris are not striking the sensor element, the instantaneous voltage coming out of the Reference Level Generator 506 will be higher than the voltage coming out of the Attenuator block 508. This causes the Comparator block 510 to output a high logic level signal (logic one), which is then inverted by the Pulse Stretcher block 512 to create a low logic level (logic zero).

However, when debris strikes the sensor, the voltage from the Attenuator 508 exceeds the voltage from the Reference Level Generator 506 (since this circuit cannot track the high frequency, fast rate of change signal component from the Amplifier 504) and the signal produced by a debris strike is higher in voltage amplitude than the constant background mechanical noise signal which is more severely attenuated by the Acoustic Vibration Filter 502. This causes the comparator to momentarily change state to a logic level zero. The Pulse Stretcher block 512 extends this very brief (typically under 10-microsecond) event to a constant 1 millisecond (+0.3 mS, −0 mS) event, so as to provide the system controller (e.g., controller 135 of FIG. 2) sufficient time to sample the signal.

When the system controller "sees" this 1-millisecond logic zero pulse, it interprets the event as a debris strike.

Referring now to the RFI Filter portion of the Acoustic Vibration Filter/RFI Filter block 502, this filter serves to attenuate the very high frequency radiated electrical noise (RFI), which is generated by the motors and motor driver circuits.

In summary, the illustrated circuitry connected to the sensor element uses both amplitude and frequency information to discriminate a debris strike (representative of the cleaning device picking up debris) from the normal background mechanical noise also picked up by the sensor element, and the radiated radio frequency electrical noise produced by the motors and motor driver circuits. The normal, though undesirable, constant background noise is used to establish a dynamic reference that prevents false debris-strike indications while maintaining a good signal-to-noise ratio.

In practice, the mechanical mounting system for the sensor element (see FIG. 4) is also designed to help minimize the mechanical acoustic noise vibration coupling that affects the sensor element.

Figure 6A:
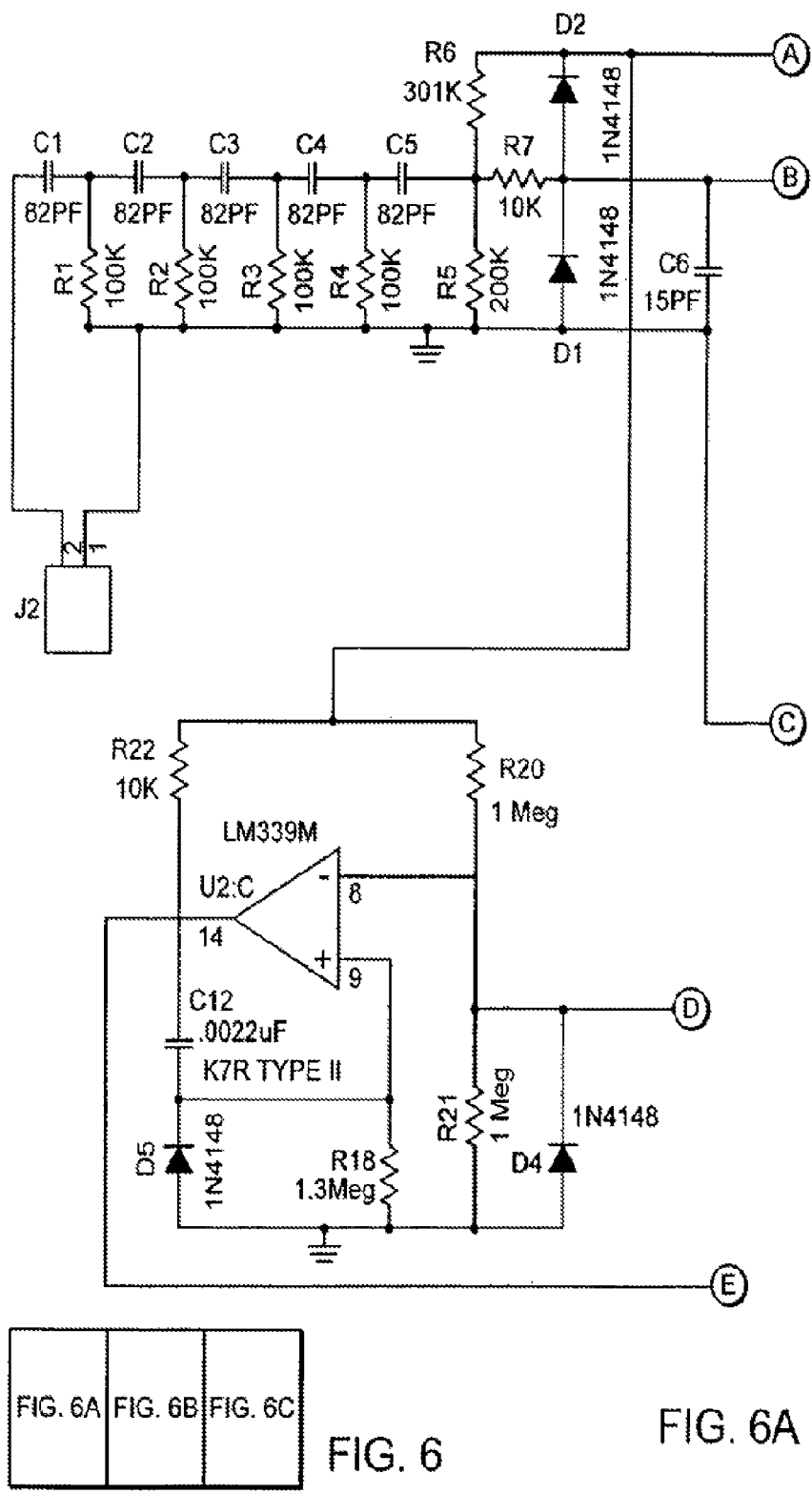
Figure 6B:
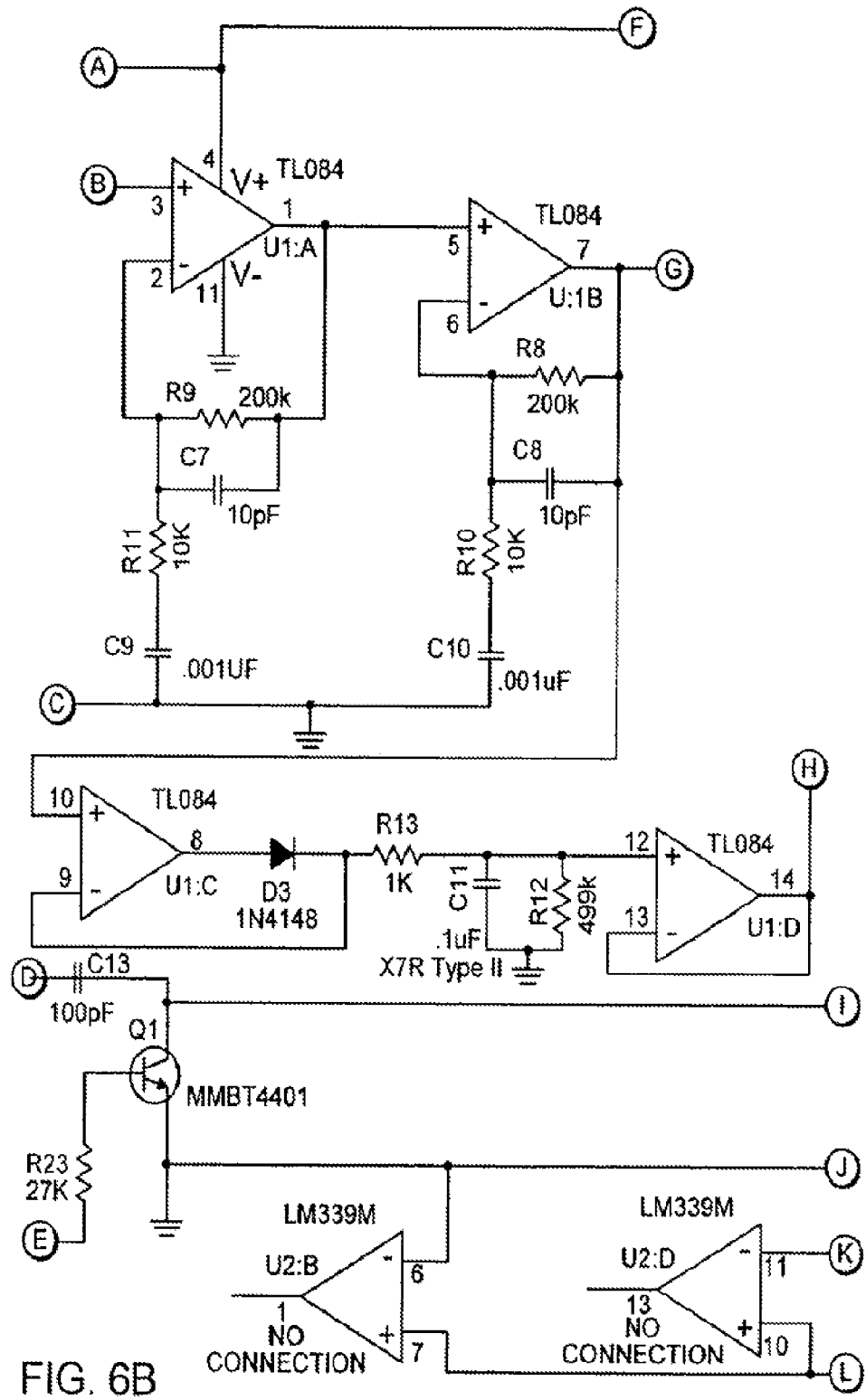
Figure 6C:
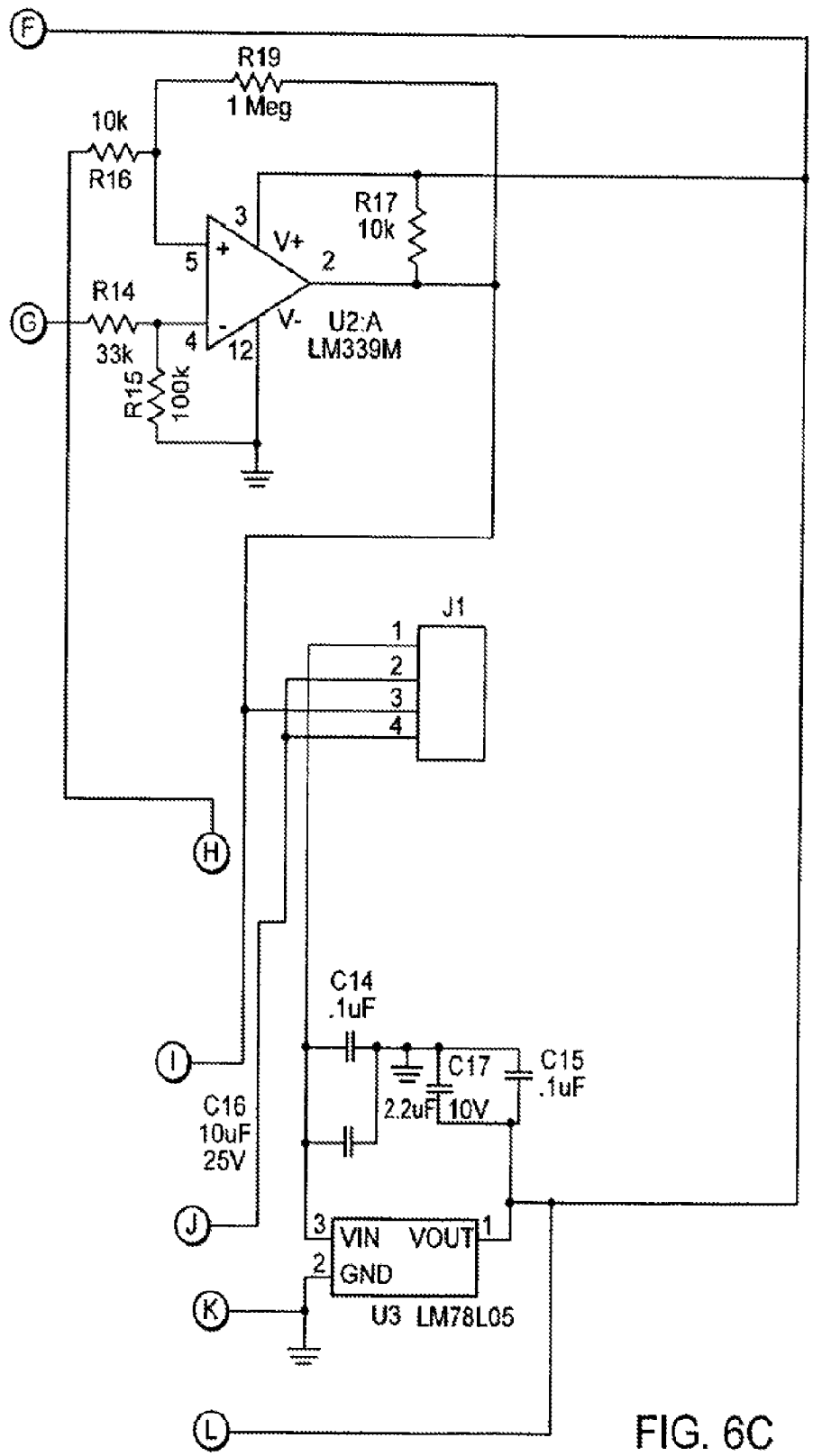

Signal Processing Circuitry: FIG. 6 is a detailed schematic diagram of exemplary debris sensor circuitry. Those skilled in the art will understand that in other embodiments, the signal processing can be partially or entirely contained and executed within the software of the microcontroller 135. With reference to FIG. 6, the illustrated example of suitable signal processing circuitry contains the following elements, operating in accordance with the following description:

The ground referenced, composite signal from the piezoelectric sensor disk (see piezoelectric disk 402 of FIG. 4) is fed into the capacitor C1, which is the input to the 5-pole, high pass, passive R-C filter designed to attenuate the low frequency, acoustic mechanical vibrations conducted into the sensor through the mounting system. This filter has a 21.5 kHz, −3 dB corner frequency rolling off at −100 dB/Decade. The output of this filter is fed to a signal pole, low pass, passive R-C filter designed to attenuate any very high frequency RFI. This filter has a 1.06 MHz, −3 dB corner frequency rolling off at −20 dB/Decade. The output of this filter is diode clamped by D1 and D2 in order to protect U1 from high voltage transients in the event the sensor element sustains a severe strike that generates a voltage pulse greater than the amplifier's supply rails. The DC biasing required for signal-supply operation for the amplifier chain and subsequent comparator circuitry is created by R5 and R6. These two resistor values are selected such that their thevenin impedance works with C5 to maintain the filter's fifth pole frequency response correctly.

U1A, U1B and their associated components form a two stage, ac-coupled, non-inverting amplifier with a theoretical AC gain of 441. C9 and C10 serve to minimize gain at low frequencies while C7 and C8 work to roll the gain off at RFI frequencies. The net theoretical frequency response from the filter input to the amplifier output is a single pole high pass response with −3 dB at 32.5 kHz, −100 dB/Decade, and a 2-pole low pass response with break frequencies at 100 kHz, −32 dB/Decade, and 5.4 MHz, −100 dB/Decade, together forming a band-pass filter.

The output from the amplifier is split, with one output going into R14, and the other to the non-inverting input of U1C. The signal going into R14 is attenuated by the R14-R15 voltage divider, and then fed into the inverting input of comparator U2A. The other signal branch from the output of U1B is fed into the non-inverting input of amplifier U1C. U1C along with U1D and the components therebetween (as shown in FIG. 2) form a half-wave, positive peak detector. The attack and decay times are set by R13 and R12, respectively. The output from this circuit is fed to the non-inverting input of U2A through R16. R16 along with R19 provide hysteresis to improve switching time and noise immunity. U2A functions to compare the instantaneous value between the output of the peak detector to the output of the R14-R15 attenuator.

Normally, when debris is not striking the sensor, the output of the peak detector will be greater in amplitude than the output of the attenuator network. When debris strikes the sensor, a high frequency pulse is created that has a higher amplitude coming out of the front-end high pass filter going into U1A than the lower frequency mechanical noise signal component. This signal will be larger in amplitude, even after coming out of the R14-R15 attenuator network, than the signal coming out of the peak detector, because the peak detector cannot track high-speed pulses due to the component values in the R13, C11, R12 network. The comparator then changes state from high to low for as long as the amplitude of the debris-strike pulse stays above the dynamic, noise generated, reference-level signal coming out of the peak detector. Since this comparator output pulse can be too short for the system controller to see, a pulse stretcher is used.

The pulse stretcher is a one-shot monostable design with a lockout mechanism to prevent re-triggering until the end of the timeout period. The output from U2A is fed into the junction of C13 and Q1. C13 couples the signal into the monostable formed by U2C and its associated components. Q1 functions as the lockout by holding the output of U2A low until the monostable times out. The timeout period is set by the time constant formed by R22, C12 and R18, and the reference level set by the R20-R21 voltage divider. This time can adjusted for 1 mS, +0.3 mS, −0.00 mS as dictated by the requirements of the software used by the controller/processor.

Power for the debris sensor circuit is provided by U3 and associated components. U3 is a low power linear regulator that provides a 5-volt output. The unregulated voltage from the robot's onboard battery provides the power input When required, circuit adjustments can be set by R14 and R12. These adjustments will allow the circuit response to be tuned in a short period of time In a production device of this kind, it is expected that power into, and signal out of the debris sensor circuit printed circuit board (PCB) will be transferred to the main board via shielded cable. Alternatively, noise filters may be substituted for the use of shielded cable, reducing the cost of wiring. The cable shield drain wire can be grounded at the sensor circuit PCB side only. The shield is not to carry any ground current. A separate conductor inside the cable will carry power ground. To reduce noise, the production sensor PCB should have all components on the topside with solid ground plane on the bottom side. The sensor PCB should be housed in a mounting assembly that has a grounded metal shield that covers the topside of the board to shield the components from radiated noise pick up from the robot's motors. The piezoelectric sensor disk can be mounted under the sensor circuit PCB on a suitable mechanical mounting system, such as that shown in FIG. 4, in order to keep the connecting leads as short as possible for noise immunity.

The debris sensor is not subject to degradation by accretion of debris, but is capable of instantaneously sensing and responding to debris strikes, and thus immediately responsive to debris on a floor or other surface to be cleaned, with reduced sensitivity to variations in airflow, instantaneous power, or other operational conditions of the cleaning device.

When employed as described herein, the debris sensor and/or control system enables an autonomous cleaning device to control its operation or select from among operational modes, patterns of movement or behaviors responsive to detected debris, for example, by steering the device toward "dirtier" areas based on signals generated by the debris sensor.

The debris sensor can also be employed in non-autonomous cleaning devices to control, select or vary operational modes of either an autonomous or non-autonomous cleaning apparatus.

In addition, the disclosed signal processing architecture and circuitry is particularly useful in conjunction with a piezoelectric debris sensor to provide high signal to noise ratios.

A wide range of modifications and variations of the present invention are possible and within the scope of the disclosure. The debris sensor can also be employed for purposes, and in devices, other than those described herein.

Navigational Control System

Figure 9:
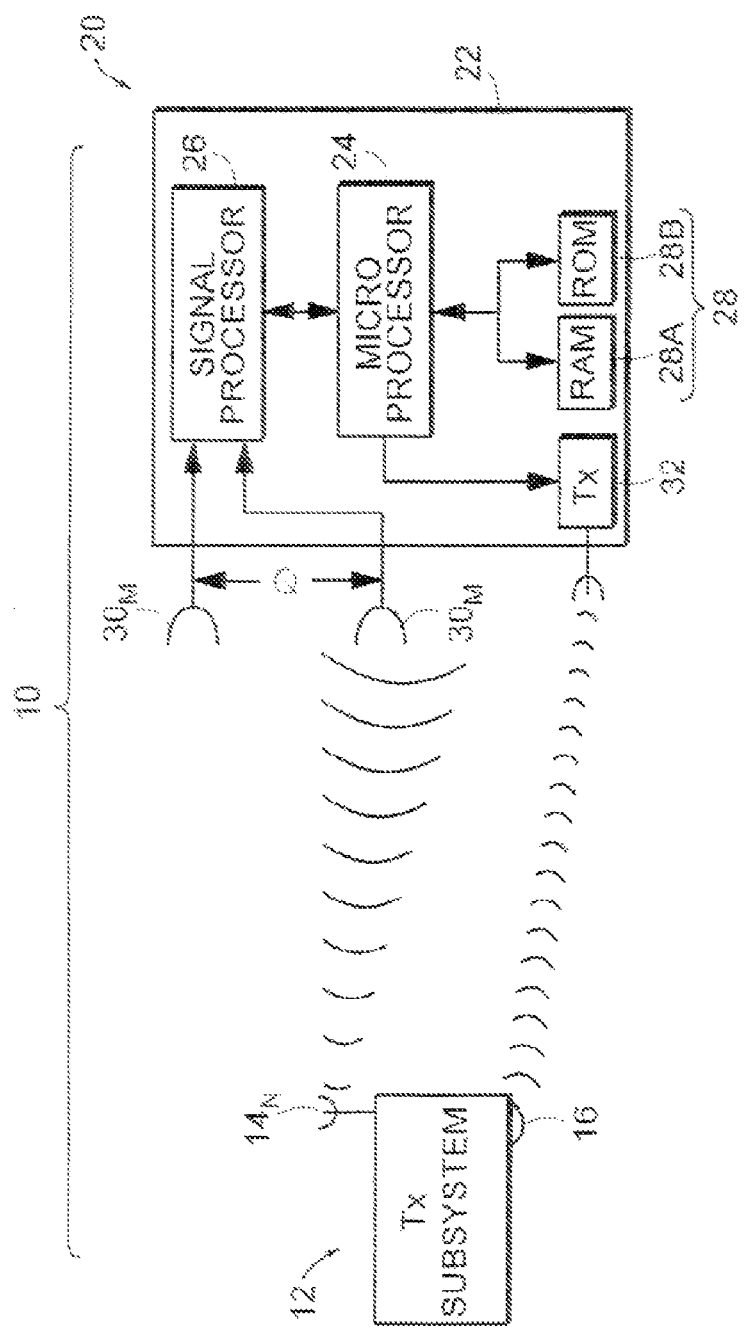
FIG. 9 is a schematic depiction of a navigational control system that comprises a transmitting subsystem and a receiving subsystem.

FIG. 9 is a schematic representation of a navigational control system 10 according to the present invention for use in combination with a robotic device 100 to enhance the cleaning efficiency thereof by adding a deterministic component (in the form of a control signal that remotely controls the movement of the robotic device 100) to the motion algorithms, including random motion, autonomously implemented by the robotic device 100. The navigational control system 10 comprises a transmitting subsystem 12 and a receiving subsystem 20 operating under the direction of a navigation control algorithm. The navigation control algorithm includes a definition of a predetermined triggering event. The specific features and characteristics of the transmitting subsystem 12 and the receiving subsystem 20 depend upon whether the particular subsystem is integrated in combination with the robotic device 100 or functions as a "base station" for the navigational control system 10.

Broadly described, the navigational control system 10 according to the present invention is operative, under the direction of the navigation control algorithm, to monitor the movement activity of the robotic device 100 within the defined working area. In one preferred embodiment, the monitored movement activity is defined in terms of the "position history" of the robotic device 100 as described in further detail below. In another preferred embodiment, the monitored movement activity is defined in terms of the "instantaneous position" of the robotic device 100 as defined in further detail below.

The predetermined triggering event is a specific occurrence or condition in the movement activity of the robotic device 100. Upon the realization of the predetermined triggering event, the navigational control system 10 is operative to generate and communicate a control signal to the robotic device 100. In response to the control signal, the robotic device 100 is operative to implement or execute a conduct prescribed by the control signal, i.e., the prescribed conduct. This prescribed conduct represents a deterministic component of the movement activity of the robotic device 100.

In the preferred embodiment of the navigational control system 10 based upon position history, the system 10 is configured and operative to create a "tessellation" of any defined working area where the robotic device 100 is to be operated, e.g., a room to be cleaned. Tessellate is used herein in the sense that the defined working area is segmented into a set of individual cells, which may or may not be of equal size. For example, FIG. 10 exemplarily illustrates the polar tessellation of a defined working area into a set of individual cells C (reference characters BST identify the "base station") of unequal size. The position of each cell C (in terms of its center) is identified in terms of polar coordinates $(r, \theta)$ referenced to the base station BST as the origin (0, 0). A grid map of the cells C comprising the defined working area is stored in memory of the navigation control system 10. One skilled in the art will appreciate that other coordinate systems, e.g., a planar Cartesian coordinate system, can be used by the navigational control system 10 to define the position of individual cells C within the predetermined working area.

Preferably, the navigational control system 10 is operative to define the size the individual cells C so that the length and width dimensions of an individual cell C are no larger than one-half the width (W) of the cleaning head system 145 of the robotic device 100 (see FIG. 1 and corresponding discussion above).

The navigational control system 10 is operative to generate a position history of the robotic device 100 within the defined working area in terms of such individual cells C (to minimize the memory requirements for storage of position history). The position history comprises a set of discrete, instantaneous positions (in terms of individual cells C) of the robotic device 100 over a time interval where the time interval is a variable that depends upon the "triggering condition" of the navigation control algorithm implemented by the navigational control system 10.

Each discrete instantaneous position of the robotic device 100 is determined by operating the transmitting subsystem 12 to emit a set of directional beams and operating the receiving subsystem 20 to detect one or more of such directional beams and process a signal parameter of the detected beam(s) to determine an absolute bearing parameter and a distance parameter between the transmitting subsystem 12 and the receiving subsystem 20 at a point in time. Each pair of bearing, distance parameters establishes a discrete instantaneous position for the robotic device 100. For the preferred 'position history' embodiment, the navigational control system 10 is operative to correlate each discrete instantaneous position to one individual cell C of the grid map. A set of bearing and position pairs, i.e., a set of instantaneous positions, over a time interval defines a set of cells C, which are identified in the receiving subsystem 20 as the position history of the robotic device 100 for the time interval.

In the preferred embodiment of the navigational control system 10 based upon the instantaneous position, the system 10 processes each discrete instantaneous position as it is established, under the control of the navigation control algorithm, to determine whether such discrete instantaneous position is the predetermined triggering event defined by the navigation control algorithm.

In an advanced embodiment of the navigational control system 10, the system 10 is additionally configured and operative to determine a travel vector (indicating the direction of motion of the robotic device 100 within an individual cell C or at the discrete instantaneous position) at each point in time. These travel vectors may be stored in memory in conjunction with the corresponding cells C as a component of the position history of the robotic device 100.

The navigational control system 10 according to the present invention is further operative, under direction of the navigational control algorithm, to generate and communicate a control signal to the robotic device 100 whenever the navigational control system 100 realizes the predetermined triggering event. In response to any such control signal, the robotic device 100 is configured and operative to initiate a prescribed conduct. The prescribed conduct comprises the deterministic component added to the random motion movement activity of the robotic device 100 by means of the navigational control system 10 according to the present invention.

In one preferred embodiment of the invention, the prescribed conduct of the robotic device 100 comprises one or more basic maneuvers such as CW and CCW turns, forward or aft (straight line) movement, slow down, speed up, and stop. The CW and/or CCW turns can be implemented using the turning techniques of the robotic device 100 described above, and the turn angles can be, for example, over a 360° spectrum at predetermined intervals, e.g., 5° or 10°. Alternatively, or in addition to, the CW and/or CCW turns can be to a specified azimuthal heading (referenced to the base station as the origin) where the navigational control system 10 is configured and operative so that the travel vector is a determinable variable. Of these basic maneuvers, forward (straight line) movement is typically the default maneuver that the robotic device 100 automatically reverts to (implements) once one or more of the other basic maneuvers has been completed.

In another preferred embodiment of the invention, the prescribed conduct of the robotic device 100 comprises one or more of the behavioral modes described herein. In yet a further preferred embodiment of the invention, the prescribed conduct of the robotic device 100 comprises a combination of the basic maneuvers and the behavioral modes described herein.

The transmitting subsystem 12 is operative to transmit a number of directed beams having a predetermined emission pattern along a specific propagation axis. Preferably, the directed beams are planar, i.e., substantially parallel to the surface of the defined working area.

In preferred embodiments of the navigational control system 10 according to the present invention, the transmitting subsystem 12 is integrated in combination with the robotic device 100. The transmitting subsystem 12 is configured and operative to functionally emulate an omnidirectional transmission source with respect to the defined working area, i.e., by emitting a plurality of directed beams that cover the defined working area. For these preferred embodiments, the robotic device 100 further includes a receiver unit 16 (see FIG. 9) configured and operative to receive control signals from the receiving subsystem 20 (see discussion below regarding the transmitting unit 32 of the receiving subsystem 20). While the receiver unit 16 is depicted as a dedicated receiving unit for the control signals, it is preferable that the omnidirectional detector 128 (of the virtual wall detection system) described above be adapted to detect and process such control signals.

In one preferred embodiment, the transmitting subsystem 12 comprises a conventional mechanical sweeping transmitter, e.g., a laser, that is integrated in combination with a high point of the housing infrastructure of the robotic device 100 so that none of the structural features of the robotic device 100 interfere with the operation thereof. The mechanical sweeping transmitter is configured and operative to emit the plurality of directed beams while concomitantly redirecting (mechanically sweeping) the transmitting element so that each directed beam has a different propagation axis. Other features and characteristics of the mechanical sweeping transmitter are described below in terms of individual transmitting units $14_N$ for ease of description.

Another preferred embodiment of the transmitting subsystem 12 comprises a set of transmitting units $14_N$, where N is an integer defining the number of individual transmitting units comprising the set for the navigational control system 10, that are integrated in combination with the robotic device 100 about the periphery of its housing infrastructure. Each transmitting unit $14_N$ is configured and operative to emit a directed beam having a predetermined emission pattern along a specific propagation axis. Preferably, the transmitting subsystem 12 is configured and operative so that the emitted directed beams are planar.

In a basic embodiment of the transmitting subsystem 12, the transmitting units $14_N$ are fungible/interchangeable, each operating to emit a directed beam at a common operating frequency. Preferably, the common operating frequency for the transmitting units $14_N$ lies in the infrared range, i.e., about 750 nm to about $1.4 \times 10^4$ nm, preferably about 880 nm to about 980 nm, although one skilled in the art will appreciate that other wavelengths, e.g., in the radio frequency range, microwave frequency range, can be used in the practice of the navigational control system 10 of the present invention.

Preferably, the common operating frequency directed beams emitted by the transmitting units $14_N$ are periodically modulated, e.g., at 10 KHz for 50 msec, off for 300 msec. Modulation of the directed beams facilitates detection thereof by the receiving subsystem 20, i.e., the receiving subsystem 20 is able to readily discriminate between modulated directed beams emitted by the transmitting subsystem 12 and any other electromagnetic radiation sources that may be active in the defined working area, e.g., television remote control units, wireless computer keyboards, microwaves, ambient radiation such as sunlight. For the basic embodiment, it is also preferable that the transmitting units $14_N$ be sequentially operated so that any transmitting unit $14_N$ is cycled on for a predetermined period of time and then cycled off, the next (adjacent) transmitting unit $14_N$ is then cycled on for the predetermined period of time and cycled off, and so forth. Operating the transmitting subsystem 12 in the foregoing manner, i.e., modulation of the directed beam, cycling transmitting units $14_N$ on/off sequentially, minimizes the power requirements of the transmitting subsystem 12 and reduces spurious noise/collateral energy that could adversely impact the functioning of the navigational control system 10.

Ordinarily, a navigational control system 10 employing the basic embodiment of the transmitting subsystem 12, i.e., all transmitting units $14_N$ are interchangeable-emitting directed beams at a common operating frequency, cannot be used to determine travel vectors for the robotic device 100 because the receiving subsystem 20 cannot differentiate between directed beams emitted by the transmitting units $14_N$ and therefore cannot identify any particular transmitting unit $14_N$. However, the inventors have developed two innovative ways of transmitting and processing directed beams emitted by a transmitting subsystem 12 comprised of interchangeable transmitting units $14_N$ so that the receiving subsystem 20 can individually identify a specific interchangeable transmitting unit $14_N$, and, based upon such identification, establish a travel vector for the robotic device 100.

Accordingly, in one enhanced version of the basic embodiment of the transmitting subsystem 12, interchangeable transmitting units $14_N$ are operated in a predetermined manner that allows the receiving subsystem 20 to process detected directed beams to identify the directed beam having the highest signal strength, which, in turn, allows the receiving subsystem 20 to identify the interchangeable transmitting unit $14_N$ that emitted such directed beam. This, in turn, allows the receiving subsystem 20 to determine the orientation and, hence the travel vector, of the robotic device 100.

Figure 11A:
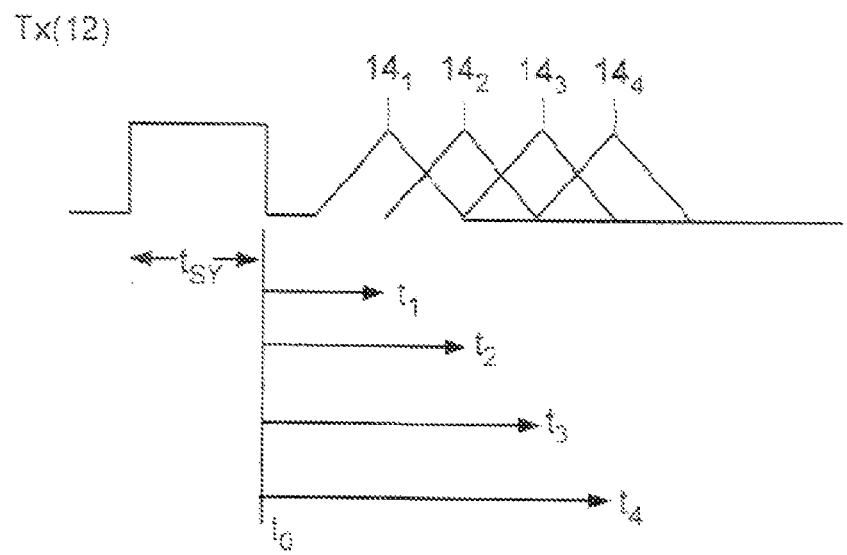
FIG. 11A illustrates the operation of a transmitting subsystem in synchronized operation with the receiving subsystem of a navigational control system.

Referring to FIG. 11A, the transmitting subsystem 12 is first cycled on so that all transmitting units $14_N$ emit directed beams for a predetermined synchronization period, as identified by reference character $t_{SY}$, and then cycled off. The receiver subsystem 20 is operative to detect and process one or more of the directed beams emitted by the transmitting units $14_N$ and identify the predetermined synchronization period $t_{SY}$ of the transmitting subsystem 12. This identification allows the receiving subsystem 20 to synchronize operations between the transmitting subsystem 12 and the receiving subsystem 20 by initializing a timing sequence at the end of the predetermined synchronization period $t_{SY}$ (reference character $t_0$ identifies the initialization of the timing sequence in FIG. 11A).

The transmitting subsystem 12 is further operative so that individual transmitting unit $14_N$ are sequentially cycled on and off at predetermined times with respect to the timing sequence initialization $t_0$ established by the receiving subsystem 20. For example, with respect to FIG. 11A, which illustrates a transmitting subsystem 12 comprising four transmitting units $14_N$ (arbitrarily identified as the first transmitting unit $14_1$, the second transmitting unit $14_2$, the third transmitting unit $14_3$, and the fourth transmitting unit $14_4$), the transmitting subsystem 12 is configured and operative so that each of the transmitting units $14_1$, $14_2$, $14_3$, $14_4$ is sequentially cycled on to emit a directed beam that transitions from a zero (0) signal strength to a peak signal strength to a zero (0) signal strength and then cycled off (a saw-tooth transition pattern is exemplarily illustrated in FIG. 11A—one skilled in the art will appreciate that other types of signal strength transition patterns can be used in the practice of the invention described herein, e.g., a ramped signal strength).

That is, the first transmitting unit $14_1$ is cycled on and transitions to a peak signal strength at time $t_1$. The second transmitting unit $14_2$ is cycled on as the directed beam from the first transmitting unit $14_1$ achieves its peak signal strength at time $t_1$. The second transmitting unit $14_2$ transitions to a peak signal strength at time $t_2$, at which point the first transmitting unit $14_1$ has transitioned to a zero (0) signal strength and is cycled off. The third transmitting unit $14_3$ is cycled on as the directed beam from the second transmitting unit $14_2$ achieves its peak signal strength at time $t_2$. The foregoing operating pattern is repeated for the second, third, and fourth transmitting units $14_2$, $14_3$, $14_4$, as applicable, so that at time $t_3$ the second transmitting unit $14_2$ is cycled off, the directed beam emitted by the third transmitting unit $14_3$ has achieved its peak signal strength, and the fourth transmitting unit $14_4$ is cycled on; and at time $t_4$ the third transmitting unit $14_3$ is cycled off and the directed beam emitted by the fourth transmitting unit $14_4$ has achieved its peak strength. The transmitting subsystem 12 is operative to repeat the above-described synchronization—sequential transmission procedure during operation of the navigational control system 12 according to the present invention.

In another enhanced version of the basic embodiment of the transmitting subsystem 12, interchangeable transmitting units $14_N$ are operated in a different predetermined manner that allows the receiving subsystem 20 to process detected directed beams to identify the directed beam having the highest signal strength, which, in turn, allows the receiving subsystem 20 to identify the interchangeable transmitting unit $14_N$ that emitted such directed beam. This, in turn, allows the receiving subsystem 20 to determine the orientation and, hence the travel vector, of the robotic device 100.

Figure 11B:
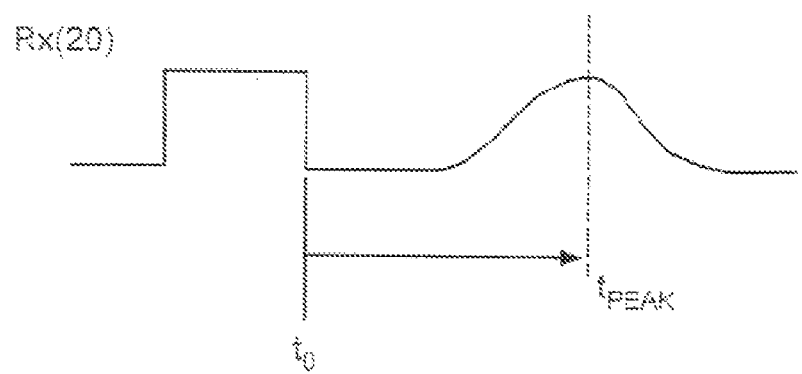
FIG. 11B illustrates the operation of the receiving subsystem in synchronized operation with the transmitting subsystem of FIG. 5A.
Figure 11C:
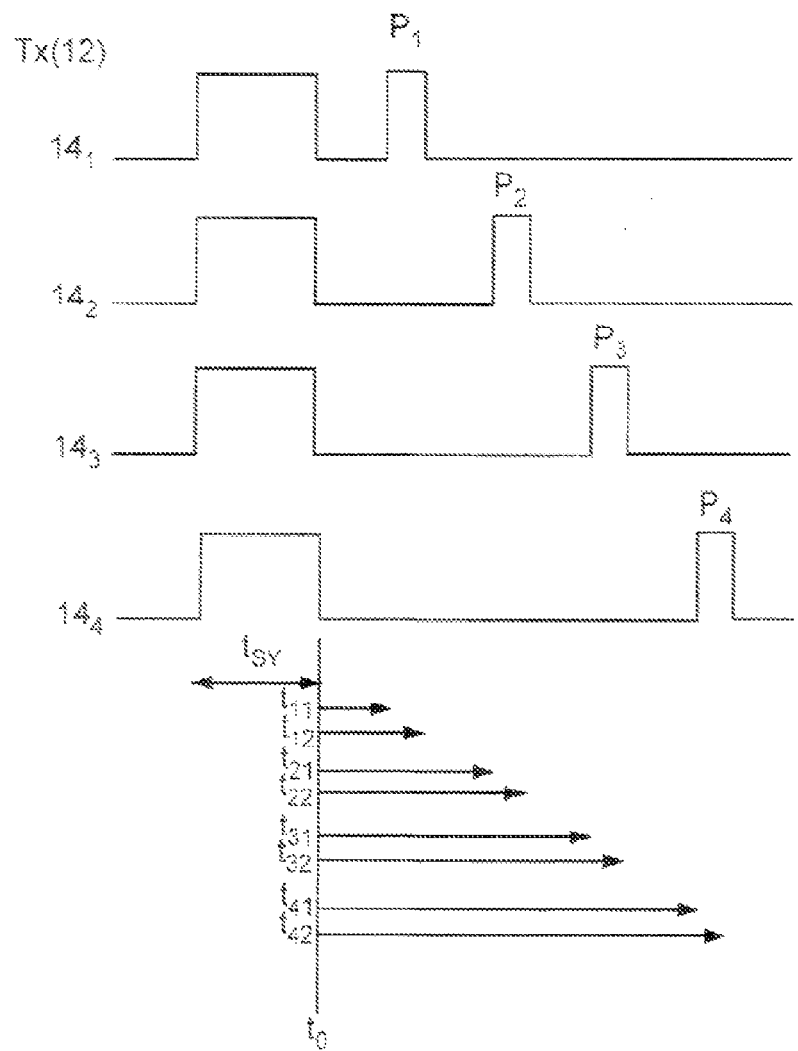
FIG. 11C illustrates the operation of a transmitting subsystem in synchronized operation with the receiving subsystem of a navigational control system.

Referring to FIG. 11C, the transmitting subsystem 12 is first cycled on so that all transmitting units $14_N$ emit directed beams for a predetermined synchronization period, as identified by reference character $t_{12}$, and then cycled off. The receiver subsystem 20 is operative to detect and process one or more of the directed beams emitted by the transmitting units $14_N$ and identify the predetermined synchronization period t 12 of the transmitting subsystem 12. This identification allows the receiving subsystem 20 to synchronize operations between the transmitting subsystem 12 and the receiving subsystem 20 by initializing a timing sequence at the end of the predetermined synchronization period $t_{SY}$ (reference character $t_0$ identifies the initialization of the timing sequence in FIG. 11A).

The transmitting subsystem 12 is further operative so that individual transmitting unit $14_N$ are sequentially cycled on and off at predetermined times with respect to the timing sequence initialization $t_0$ established by the receiving subsystem 20. For example, with respect to FIG. 11C, which illustrates a transmitting subsystem 12 comprising four transmitting units $14_N$ (arbitrarily identified as the first transmitting unit $14_1$, the second transmitting unit $14_2$, the third transmitting unit $14_3$, and the fourth transmitting unit $14_4$), the transmitting subsystem 12 is configured and operative so that each of the transmitting units $14_1$, $14_2$, $14_3$, $14_4$ is sequentially cycled on to emit a pulsed directed beam have a predetermined pulse width $P_1$, $P_2$, $P_3$, $P_4$, respectively, at a predetermined signal strength, and then cycled off.

That is, the first transmitting unit $14_1$ is cycled on at $t_{11}$ (where the first "1" identifies the transmitting unit number and the second "1" indicates that the transmitting unit is cycled on) and cycled off at $t_{12}$ (where the "2" indicates that the transmitting unit is cycled off). In a similar manner, the second transmitting unit $14_2$ is cycled on at $t_{21}$ and cycled off at $t_{22}$, the third transmitting unit $14_3$ is cycled on at $t_{31}$ and cycled off at $t_{32}$, and fourth transmitting units $14_4$ is cycled on at $t_{41}$ and cycled off at $t_{42}$. The transmitting subsystem 12 is operative to repeat the above-described synchronization-sequential transmission procedure during operation of the navigational control system 12 according to the present invention.

In a more sophisticated embodiment of the transmitting subsystem 12, the transmitting units $14_N$ are discrete and identifiable, each transmitting unit $14_N$ operating at a unique operating frequency to emit a directed beam (which is preferably planar with respect to the surface of the defined working area) having a predetermined emission pattern along a specific propagation axis. These operating frequencies are also preferably modulated to facilitate detection thereof by the receiving subsystem 20 in an environment where other electromagnetic radiation sources are operating. Since each directed beam is readily and uniquely identifiable, the receiving subsystem 20 can process detected directed beams in a conventional manner to derive not only the absolute bearing and to the robotic device 100, but also the travel vector for the robotic device 10 at any particular time.

The receiving subsystem 20 of the navigational control system 10 according to the present invention comprises a processing unit 22 that includes a microprocessor 24, a signal processing unit 26, a memory module 28, and a set of detection units 30$_M$. Additionally, the receiving subsystem 20 can also include a transmitting unit 32 for those preferred embodiments of the navigational control system 10 wherein the receiving subsystem 20 is operated or functions as the base station for the navigational control system 10.

The memory module 28 comprises RAM 28A and ROM 28B. Data relating to the current operation of the robotic device 100 within the defined working area is stored in the RAM 28A. Such current operational data can include the grid map of cells C defining the defined working area and the position history of the robotic device 100 within the defined working area for the 'position history' embodiment of the navigational control system 10. Stored in the ROM 28B are one or more navigation control algorithms for the navigational control system 10, a set of one or more control signals associated with each navigation control algorithm, and a signal processing algorithm for converting signals generated by the signal processing unit 26 to one or more sets of instantaneous position parameters, i.e., a bearing, distance pair (and travel vector, if applicable). For the 'position history' embodiment of the system 10, a set of instantaneous position parameters that define the position history of the robotic device 100, which are correlated with the grid map to identify the cells C comprising the position history.

The terminology "navigation control algorithm" as used herein encompasses a set of instructions that: (a) define how the position history or instantaneous position is used by the navigational control system 10 (e.g., counting and comparing cells visited, a true-false determination for cells visited, true-false determination whether the predetermined triggering event has occurred); (b) defines the triggering event or events associated with the use of the position history or the instantaneous position; and (c) identifies the control signal(s) to be implemented when the triggering event is realized. For example, in one representative navigation control algorithm for the 'position history' embodiment of the navigational control system 10 according to the present invention, the microprocessor 24 is operative to count and store the number of visits to each cell and to compute the total number of visits to cells contiguous to (neighboring) each such visited cell (cell counting). The microprocessor 24 is further operative to compare the total number of neighboring-cell visits as each cell is visited to a threshold value (see, e.g., FIG. 10 wherein "$C_V$" identifies a visited cell and "$C_C$" identifies the eight (8) cells contiguous to the visited cell $C_V$). If the total number of neighboring-visits (e.g., fifteen (15) in the example of FIG. 10) for any visited cell is below the threshold number (the triggering event), the microprocessor 24 is operative to cause a control signal to be communicated to the robotic device 100. The control signal causes the robotic device 100 to implement one or more behavioral modes specified by the control signal, e.g., a Spot Coverage pattern as described above.

In another representative navigation control algorithm for the 'position history' embodiment of the navigational control system 10 of the present invention, one or more cells in the stored grid map are pre-identified (i.e., prior to operating the robotic device 100) as "hot spots" in the defined working area. As the robotic device 100 visits any particular cell C, the microprocessor 24 is operative to determine whether the visited cell has been identified as a "hot spot" (true-false determination). If the microprocessor 24 determines that the visited cell C is a "hot spot" (triggering event), the microprocessor 24 is operative to cause a control signal to be communicated to the robotic device 100 via the control signal transmitting unit 32. Reception of the control signal causes the robotic device 100 to implement the prescribed conduct specified by the control signal, e.g., one or more of the basic maneuvers described above and/or a Spot Coverage pattern or Obstacle-Following behavioral mode as described above.

The foregoing representative examples of navigation control algorithms for the 'position history' embodiment of the navigational control system 10 according to the present invention are implemented without knowledge of the travel vector of the robotic device 100, i.e., based solely upon the identification of visited cells by means of the bearing, distance parameters derived by the receiving subsystem 20. Another representative example of a navigation control algorithm for the 'position history' embodiment of the navigation control system 10 of the present invention utilizes the travel vector as an element of the position history in issuing a control signal.

The microprocessor 24 is operative to count and store the number of times a cell has been visited (cell counting) and further operative to compare this number to the number of times each contiguous (or neighboring) cell has been visited. For this navigation control algorithm, the triggering event is a numerical differential between the number of visits to the currently-visited cell number and the number of visits to each of the neighboring-cells that identifies the neighboring cell or cells that have been least-visited as compared to the currently-visited cell. The triggering event would cause the receiving system 20 to issue a control signal to the robotic device 100 that causes the robotic device 100 to move from the currently-visited cell to the neighboring cell that has been visited least, e.g., by implementing one or more basic maneuvers as described herein. If two or more neighboring cells have been visited least, the control signal would cause the robotic device to move from the currently-visited cell to the least visited neighboring cell that is most compatible with the current travel vector of the robotic device 100, e.g., minimum travel distance.

Figure 10:
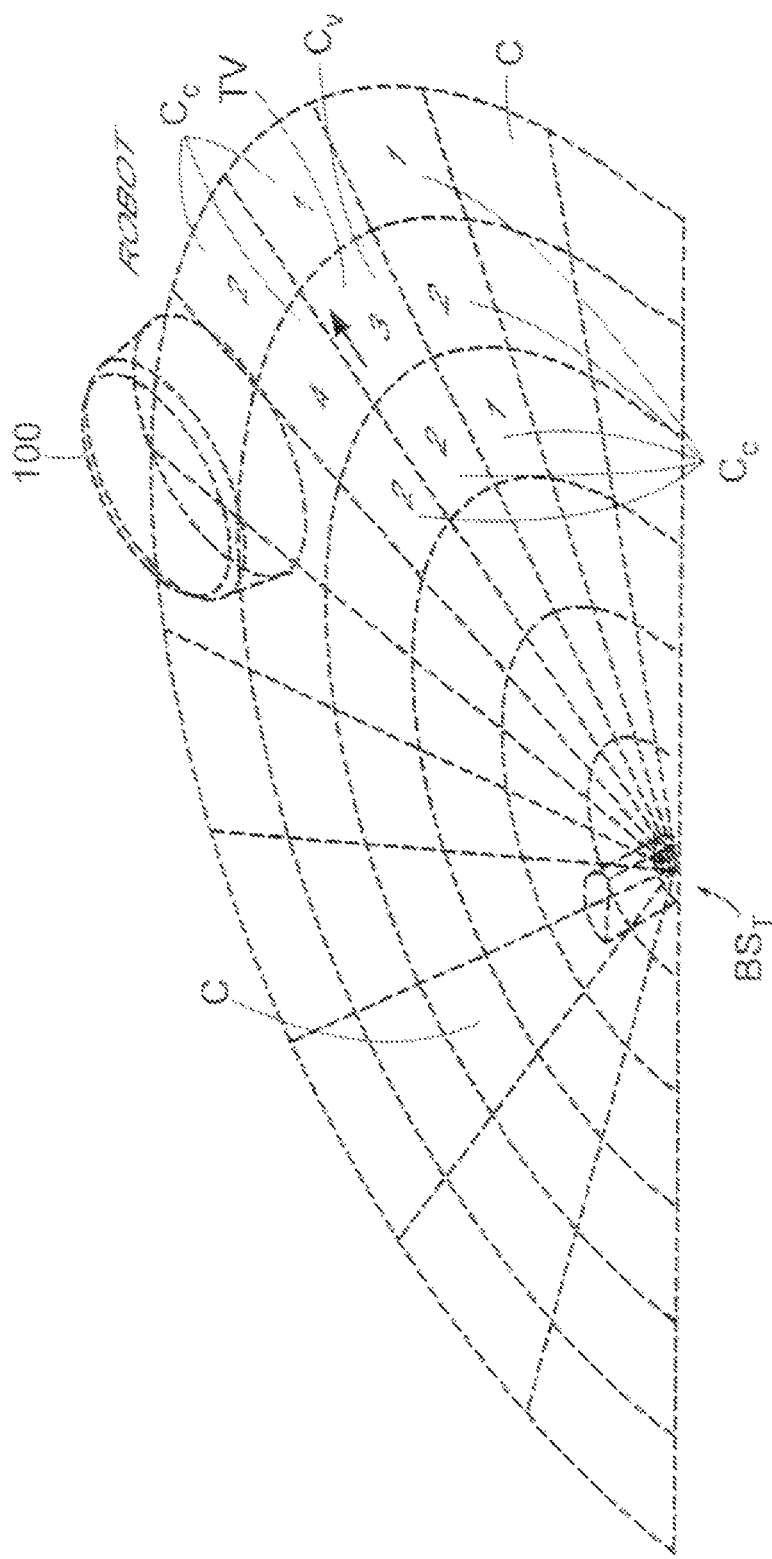
FIG. 10 illustrates a polar tessellation of a defined working area in which a robotic device is operating.

Using FIG. 10 as an example wherein "$C_V$" identifies the currently-visited cell and "$C_C$" identifies the eight (8) cells contiguous to or neighboring the currently-visited cell $C_V$, the neighboring cells $C_C$ that have been visited a single time are the least-visited neighboring cells $C_C$. If the current travel vector for the robotic device 100 is indicated by the reference characters TV, the control signal would cause the robotic device 100 to continue moving in a straight line, i.e., the move forward basic maneuver (or the Straight-Line behavioral mode) would be executed by the robotic device 100 (if the robotic device 100 was currently operating in some other behavioral mode).

One representative navigation control algorithm for the 'instantaneous position' of the navigational control system 10 uses elapsed time (either random or predetermined) as the predetermined triggering event to cause the robotic device 10 to move to a predetermined position B in the defined working environment. The microprocessor 24 is operative, upon expiration of the elapsed time (the predetermined triggering event), to determine the instantaneous position (hereinafter identified as "position A") of the robotic device 100 as described herein. Since position A is an unknown variable until the predetermined triggering event is realized, the prescribed conduct, i.e., the basic maneuvers, necessary to move the robotic device 100 from position A to position B are also unknown. Once position A has been determined by the navigational control system 10, the basic maneuvers necessary to move the robotic device 100 from position A to position B are determinable since both position A and position B are known variables (in terms of their known bearing, distance parameter pairs with respect to the receiving subsystem 20). A determination of the basic maneuvers that will be implemented by the robotic device 100 can be accomplished by any conventional computational technique.

Another exemplary navigation control algorithm for the 'instantaneous position' embodiment of the navigational control system 10 is a variation of the "hot spot" navigation control algorithm for the 'position history' embodiment of the navigational control system 10. In this illustrative embodiment, both position A and position B are known variables and accordingly, the basic maneuver(s) to move the robotic device 100 from position A to position B are known. In this example, the predetermined triggering event is a TRUE determination that the instantaneous position of the robotic device 100 is equal to position A (position A may be stored in memory 28 as a "zone"—defining some arbitrary area centered about position A—rather than a single point position to increase the probability that the instantaneous position of the robotic device 100 at some time will equal position A).

The receiving subsystem 20 comprises a set of detection units $30_M$ where M is an integer defining the number of individual detection units comprising the set for the navigational control system 10. The number and positioning of the set of detection units $30_M$ should be such that as much of the defined working area as possible is within the field-of-view of the receiving subsystem 20 and that the fields-of-view of at least two (but preferably more) detection units $30_M$ cover the same area within the defined working area.

In preferred embodiments of the navigational control system 10 according to the present invention, the receiving subsystem 20 functions as a "base station" for the system 10. In this functional role, the receiving subsystem 20 is a portable, standalone unit that is stationarily positioned within the defined working area, preferably abutting a wall bounding the defined working area (the 'wall unit' configuration). Alternatively, the receiving subsystem 20 can be positioned within the defined working area distally of the walls bounding the defined working area (the 'free-standing' configuration). The receiving subsystem 20 as the base station establishes and, for the 'position history' embodiment of the navigational control system 10, stores the grid map of cells representing the defined working area and represents the origin (0, 0) of the grid map of cells described above.

For those embodiments where the receiving subsystem 20 is operated as a wall unit configuration, the individual detection units $30_M$ have a known spaced-apart relationship and configured and operative to have a 180° field-of-view. For example, FIG. 2 illustrates an embodiment of the receiving subsystem 20 comprising two detection units $30_M$ (M=2) spaced apart by a known angular distance "φ". FIG. 12C illustrates another embodiment of the receiving subsystem 20 comprising three detection units $30_M$ (M=3), i.e., $30_{12}$, $30_{23}$, $30_{13}$, having known angular separations identified by "$φ_{12}$", "$φ_{23}$", and "$φ_{13}$", respectively. Preferred embodiments of the wall unit configuration for the navigational control system 10 include three detection units $30_M$ to provide absolute bearing data to the robotic device 100. A minimum of two detection units $30_M$ are required to provide the necessary signal information for the receiving subsystem 20. More than three detection units $30_M$ can be employed to increase the resolution of the receiving subsystem 20, but at an added cost for each additional detection unit $30_M$ and associated signal processing circuitry (see FIG. 12C which illustrates the representative signal processing circuitry associated with a detection unit $30_M$).

For those embodiments where the receiving subsystem 20 is operated as a free-standing configuration, the individual detection units $30_M$ likewise spaced apart by known angular distances and configured and operative have a field-of-view greater than 180°. A representative embodiment of the receiving subsystem 20 operated as a free-standing base station would comprise four detection units $30_M$.

The detection units $30_M$ are configured and operative to detect a parameter of one or more of the directed beams emitted by the transmitting units $14_N$, e.g., voltages V representing the relative signal strengths of the detected directed beam(s). In a preferred embodiment, each detection unit $30_M$ is configured and operative to average the detected signal strength parameter (e.g., voltage) when the detection unit $30_M$ detects two directed beams simultaneously. The receiving subsystem 20 executes a signal processing algorithm that processes the detected parameters provided by the detection units $30_M$, i.e., relative signal strengths of the detected beams, utilizing a conventional technique to determine the absolute bearing between the robotic device 100 and the receiving subsystem 20.

To provide the distance determination capability for the receiving subsystem 20, the receiving subsystem 20 is preferably calibrated prior to use. This involves positioning the robotic device 100 at a predetermined distance from the receiving subsystem 20 and operating one (or more) of the transmitting units $14_N$ to emit a directed beam at the receiving subsystem 20. The parameter of the directed beam detected by the detection units $30_M$, e.g., a voltage representing the signal strength of the directed beam as detected, is correlated to the predetermined distance and used to generate a look-up table of signal strength versus distance for the defined working area. This look-up table is stored in the memory module 28 of the receiving subsystem 20. As the signal strengths of directed beams are detected during operation of the navigational control system 10, the receiving subsystem 20 uses the detected signal strengths as pointers to the stored look-up table to determine the corresponding distances (between the receiving subsystem 20 and the robotic device 100).

Alternatively, the receiving subsystem 20 could be configured and operative to implement a signal processing algorithm that utilizes the known attenuation characteristics, i.e., signal strength versus distance, of the operating frequency of the directed beams emitted by the transmitting units $14_N$. This embodiment presupposes that the transmitting units $14_N$ are rated and emitting directed beams of known signal strength.

For the sophisticated embodiment of the navigational control system 10 according to the present invention described above wherein the individual transmitting units $14_N$ of the transmitting subsystem 12 are operated at a unique operating frequency, the detection units $30_M$ of the receiving subsystem 20 are configured to scan the set of unique operating frequencies utilized by the transmitting units $14_N$. The receiving subsystem 20 is configured and operative to cause the detection units $30_M$ to sequentially scan through these frequencies during operation of the navigational control system 10.

For the innovative embodiment of the transmitting subsystem 12 described above in connection with FIG. 11A, FIG. 11B illustrates the operating characteristics of the complementary receiving subsystem 20. The receiving subsystem 20 is configured and operative to detect the directed beams emitted during the predetermined synchronization period $t_{SY}$. At the end of the predetermined synchronization period $t_{SY}$, the receiving subsystem 20 is operative to initiate the timing sequence $t_0$. The receiving subsystem 20 is operative to detect the directed beams as described herein. However, the receiving subsystem 20 is further operative to determine the time at which the peak signal strength is detected, see reference character t peak in FIG. 11B. The receiving subsystem 20 is further operative to correlate the peak signal strength detection time t peak with the known times at which the signal strength of the directed beam emitted by each transmitting unit $14_N$ reached its peak to identify the specific transmitting unit $14_N$ that transmitted the directed beam detected as having the peak signal strength (for the descriptive example presented in FIGS. 11A, 11B, the third transmitting unit $14_3$).

For the innovative embodiment of the transmitting subsystem 12 described above in connection with FIG. 11C, FIG. 11D illustrates the operating characteristics of the complementary receiving subsystem 20. The receiving subsystem 20 is configured and operative to detect the directed beams emitted during the predetermined synchronization period $t_{SY}$. At the end of the predetermined synchronization period $t_{SY}$, the receiving subsystem 20 is operative to initiate the timing sequence $t_0$. The receiving subsystem 20 is operative to detect the directed beams as described herein (as exemplarily illustrated by the detected signal pulses $DP_1$, $DP_2$, $DP_3$, $DP_4$ in FIG. 5D). However, the receiving subsystem 20 is further operative to determine the two highest peak signal strengths of the detected directed beams, see reference characters $DP_3$ and $DP_2$ in FIG. 11D, which depict the highest and next highest detected signal pulses, and the times at which the two highest strength signals were detected ($t_{21}$ and $t_{31}$ in FIG. 11D).

Figure 11D:
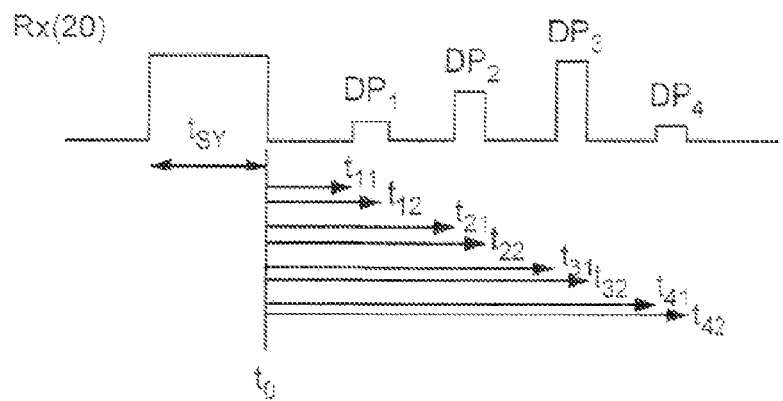
FIG. 11D illustrates the operation of the receiving subsystem in synchronized operation with the transmitting subsystem of FIG. 5C.

The signal strength detection times allows the particular transmitting units $14_N$ on the robotic device 100 to be identified, i.e., transmitting units $14_3$ and $14_2$ in the example of FIG. 11D. The receiving subsystem 20 is then further operative to compute the amplitude ratio of these signal pulses, e.g., $DP_3/DP_2$, and to use such computed amplitude ratio as a pointer to a look-up table that identifies the angular orientation of the identified transmitting units $14_3$, $14_2$, which in turn establishes the travel vector for the robotic device 100.

Even though the transmitting units $14_N$ mounted in combination with the robotic device 100 are interchangeable, the specific location of each individual transmitting unit $14_N$ on the robotic device 100 is a known quantity. Based upon the identification of the transmitting unit $14_N$ that emitted the directed beam detected by the receiving subsystem 20, the receiving subsystem 20 can execute rather straightforward geometric calculations, based upon the location of the identified transmitting unit $14_N$, to determine the travel vector of the robotic device 100.

When the receiving subsystem 20 functions as the base station, a means is required to communicate the control signal to the robotic device. Accordingly, embodiments of the receiving subsystem 20 that operate as a base station further include a transmitting unit 32 (see FIG. 9). Once the navigation control algorithm implemented by the microprocessor 24 has determined the prescribed conduct to be implemented by the robotic device 10, the microprocessor 24 is operative to select the appropriate control signal to implement such prescribed conduct from the memory module 28. The microprocessor 24 is then operative to activate the transmitting unit 32 to communicate (by transmitting) the control signal to the receiver unit 16 of the robotic device 100 where the prescribed conduct defined by the control signal is implemented by means of the microprocessing unit 135.

While the robotic device 100 is described (and depicted in FIG. 9) as being configured to include a dedicated receiver unit 16 for receiving control signals transmitted by the transmitting unit 32 of the receiving unit 20, it is preferable that the omnidirectional detector 128 (of the virtual wall detection system) be adapted to detect and process such control signals. For those embodiments of the navigational control system 10 according to the present invention wherein the receiving unit 20 is integrated in combination with the robotic device 10, the transmitting unit 32 is not required. Rather, the receiving unit 20 of the navigation control system 100 is electrically coupled to the microprocessing unit 135 (via an I/O port) of the robotic device 100 so that the receiving unit 20 can communicate control signals directly to the microprocessing unit 135.

As disclosed above, in preferred embodiments of the navigational control system 10 according to the present invention, the receiving subsystem 20 functions as the base station, i.e., the wall unit configuration, and the transmitting subsystem 12 is integrated in combination with the robotic device 100. One preferred embodiment that is illustrative of the features and functionality of the navigational control system 10 according to the present invention is exemplarily illustrated in FIGS. 12A-12C.

Figure 12A:
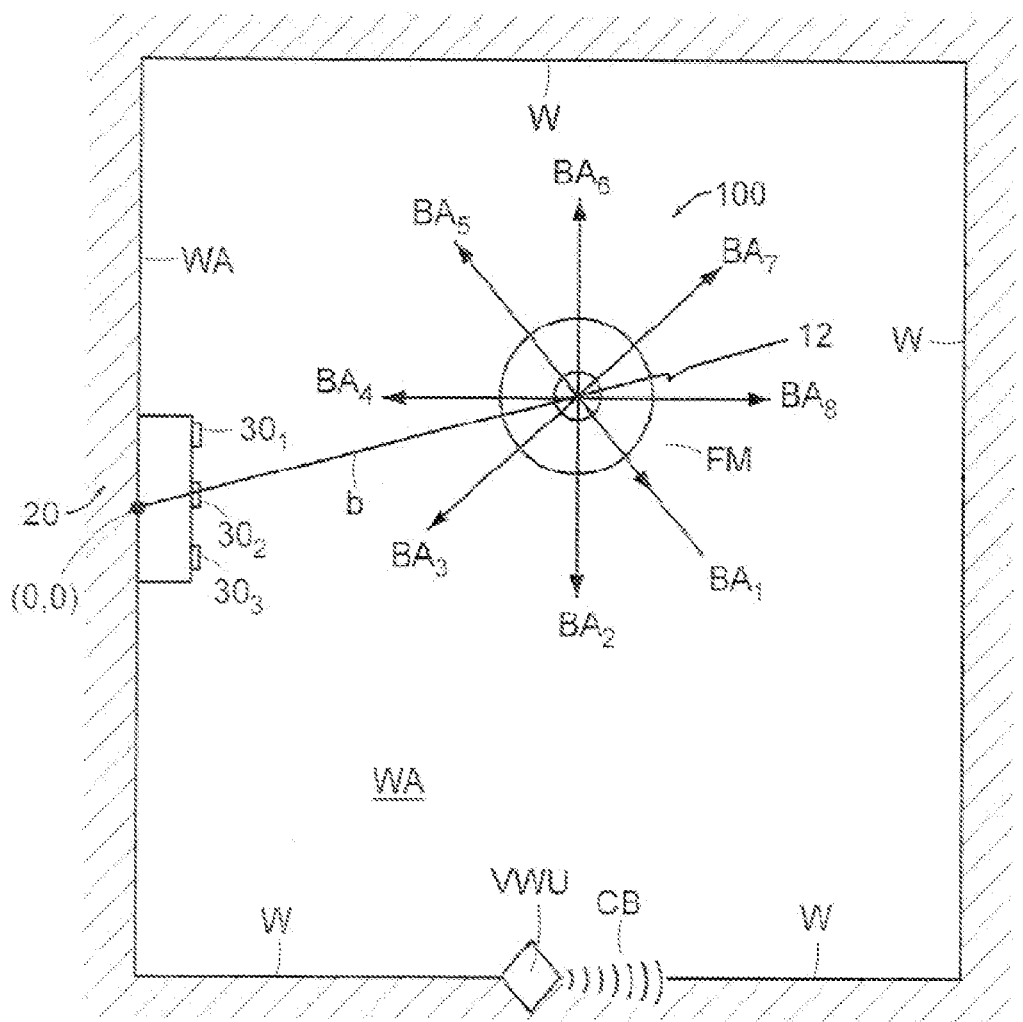
FIG. 12A illustrates a navigational control system wherein the transmitting subsystem is integrated in combination with the robotic device and the receiving system functions as a base station mounted against one wall of a defined working area.

FIG. 12A depicts a robotic device 100 operating in a defined working area WA bounded by walls W. A virtual wall unit VWU is positioned in the only entryway to the working area WA and operative to emit a confinement beam CB that confines the robotic device 100 to operations within the working area WA.

The transmitting subsystem 12 of the illustrated embodiment of the navigational control system 10 is integrated in combination with the robotic device 100 and comprises a set of transmitting units $14_N$ (eight (8) for the described embodiment such that N equals the integers 1-8) that are operative to generate a corresponding set of directed beams $DB_N$ (where N equals the integers 1-8) as illustrated in FIG. 11B (only two directed beams $DB_3$, $DB_4$ are illustrated in FIG. 11B). Reference characters $BA_1$-$BA_8$ identify the propagation axes of the directed beams $DB_N$ emitted by the transmitting units $14_1$-$14_8$, respectively. Each transmitting unit $14_N$ is configured and operative to emit a directed beam $DB_N$ having a predetermined emission pattern $\theta_N$ centered about the corresponding beam axis $BA_N$. For the illustrated embodiment, the emission pattern $\theta_N$ of each directed beam $DB_N$ is approximately 100°.

Preferably, the predetermined emission pattern $\theta_N$ of the directed beams $DB_N$ is correlated with the number of transmitting units $14_N$ so that the transmitting subsystem 12 of the navigational control system 10 emulates an omnidirectional transmitting source. An omnidirectional transmitting source is necessary to ensure that one or more of the directed beams $DB_N$ are detected by the receiving subsystem 20 since the position and orientation of the robotic device 100 in the defined working area (e.g., in terms of its forward motion FM), with respect to the receiving station 20, is an unknown variable at any particular moment in time. Preferably the emission patterns $\theta_N$ of the directed beams $DB_N$ overlap.

Figure 12B:
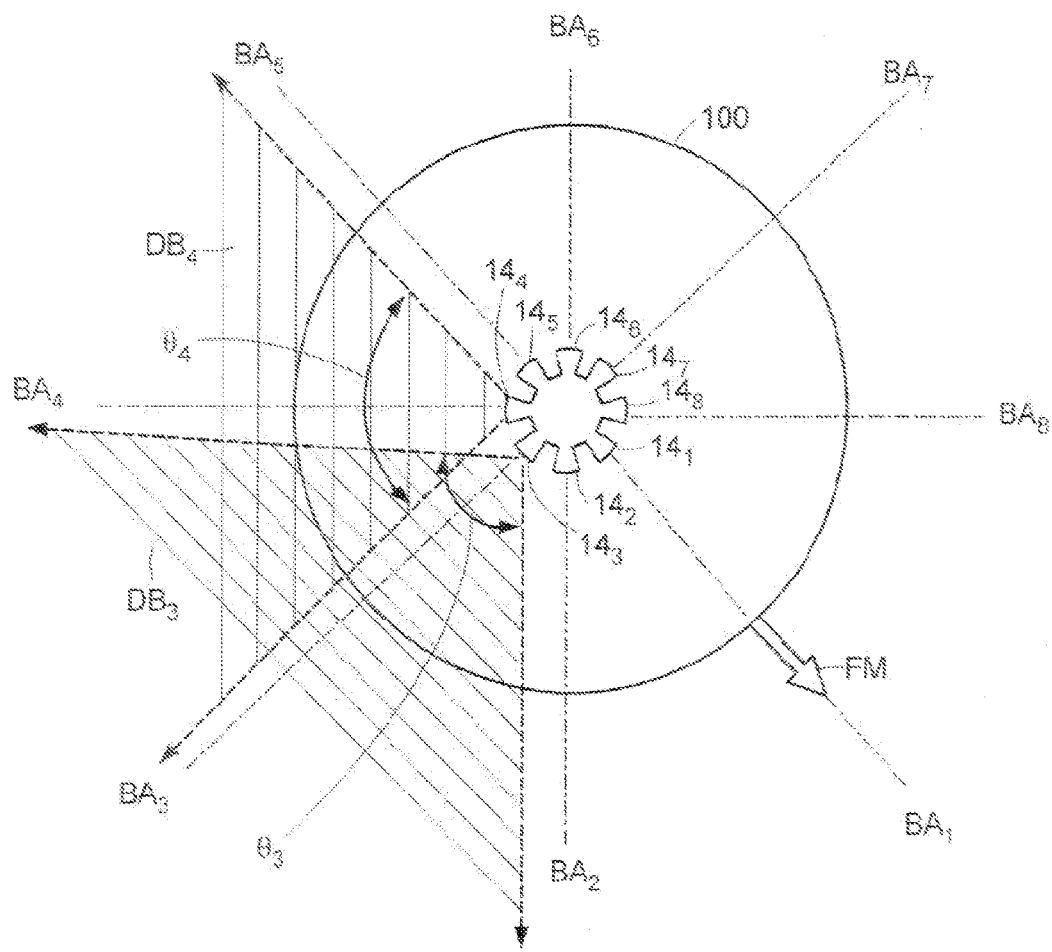
FIG. 12B illustrates the set of transmitting units comprising the transmitting subsystem of the robotic device of FIG. 12A and representative directed beams having a predetermined emission patterns.
Figure 12C:
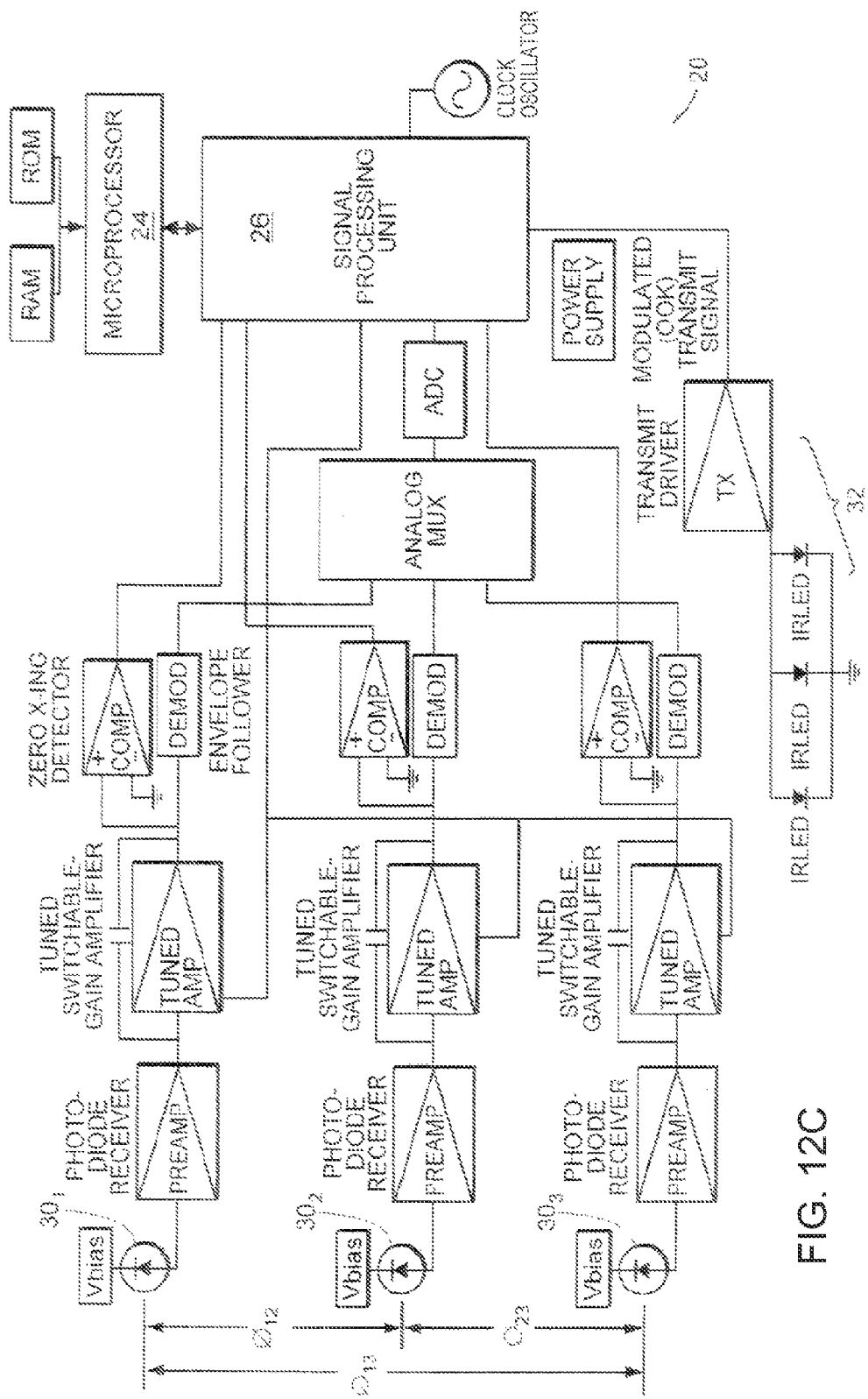
FIG. 12C is a schematic illustration of the receiving subsystem of FIG. 12A.

As an examination of FIG. 12A, 12 (and in particular FIG. 12B) shows, the directed beams $DB_3$, $DB_4$ emitted by transmitting units $14_3$, $14_4$, respectively, will be detected by the detection units $30_1$, $30_2$, $30_3$ of the receiving subsystem 20. The detection units $30_1$, $30_2$, $30_3$ are operative to detect a parameter representative of the relative signal strengths of the detected beams $DB_3$, $DB_4$, e.g., $V_1$, $V_2$, $V_3$, respectively (as disclosed above each detection unit $30_N$ is operative to average the signal strengths when two directed beams are detected simultaneously).

The receiving subsystem 20 is operative to implement the signal processing algorithm to compute the absolute bearing and distance between the receiving subsystem 20 and the robotic device 100. The receiving subsystem 20 then implements the navigation control algorithm to correlate the computed bearing and distance with one of the cells comprising the grid map of the defined working area WA stored in the memory module 28, and adds such cell to the position history of the robotic device 100 to update the position history. The receiving subsystem 20 is then operative under the navigation control algorithm to determine if there is a predetermined triggering event associated with this updated position history. If so, the receiving subsystem 20 is operative to select the appropriate control signal, as determined by the navigation control algorithm, and transmit such control signal to the receiver unit 16 of the robotic device 100 using the transmitting system 32 (see FIG. 9). The microprocessing unit 135 of the robotic device 100, is operative in response to the reception of the control signal by means of the omnidirectional detector 128, to implement prescribed conduct, e.g., one or more of the basic maneuvers and/or behavioral modes exemplarily described herein, specified by the control signal.

Figure 13:
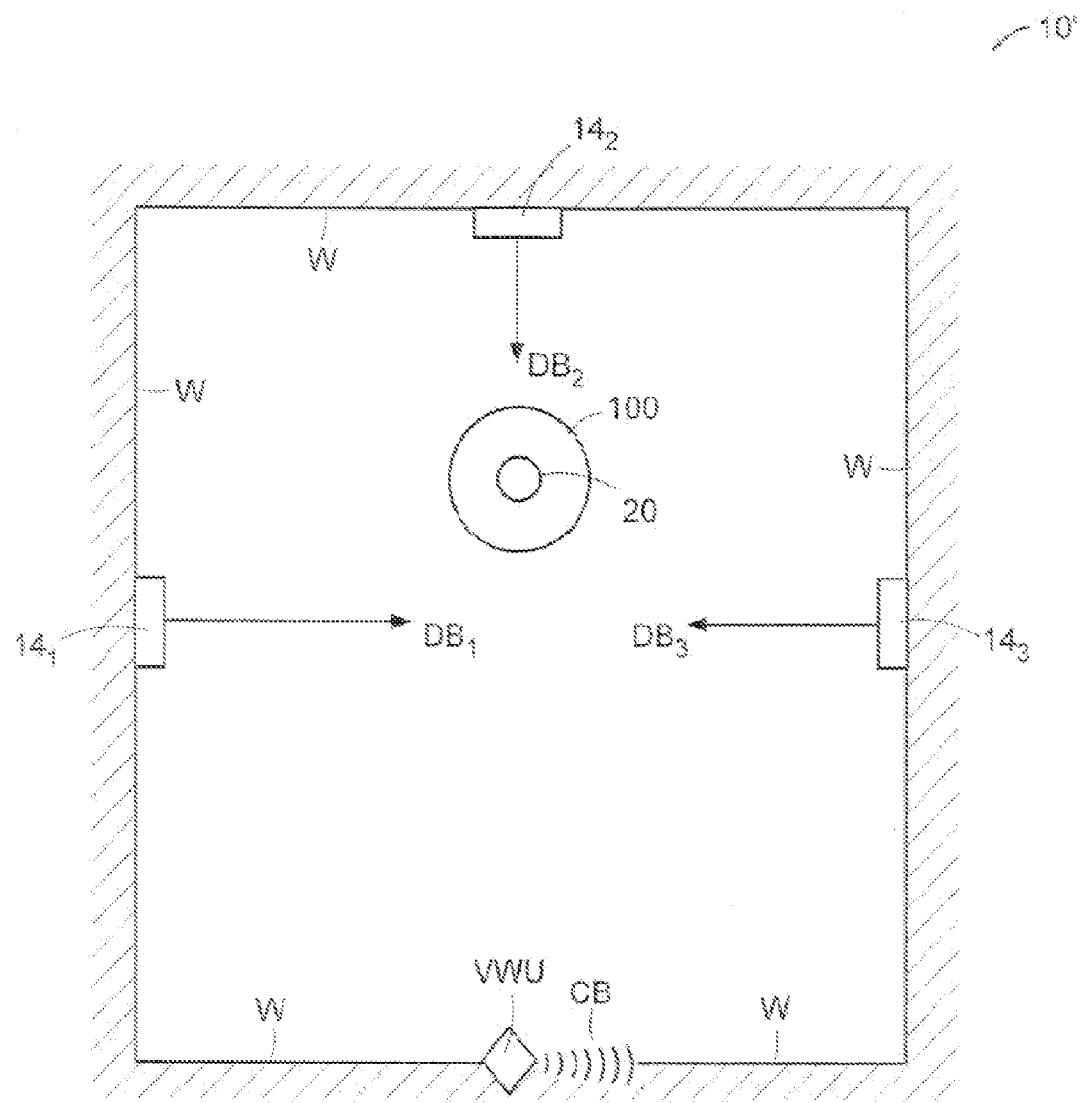
FIG. 13 illustrates a navigational control system wherein the receiving subsystem is integrated in combination with the robotic device and the transmitting subsystem has a distributed configuration.

An exemplary embodiment of a navigational control system 10' according to the present invention wherein the transmitting subsystem 12 functions as a base station and the receiving subsystem 20 is integrated in combination with the robotic device 100 is illustrated in FIG. 13. The transmitting subsystem 12 comprises a distributed set of transmitting units $14_N$ positioned to abut the walls W of the defined working area. As illustrated in FIG. 13, the transmitting subsystem 12 comprises a first transmitting unit $14_1$, a second transmitting unit $14_2$, and a third transmitting unit $14_3$ positioned in abutting engagement with adjacent walls W, respectively.

Each transmitting unit $14_N$ comprising this distributed set is configured and operative to emit a directed beam having a predetermined emission pattern $\theta_N$ along a predetermined beam axis $DB_N$ ($DB_1$, $DB_2$, and $DB_3$ in FIG. 13 define the predetermined beam axes for the distributed transmitting units $14_1$, $14_2$, $14_3$, respectively) at a unique operating frequency, preferably in the infrared frequency range and preferably modulated as disclosed herein. Preferably, each transmitting unit $14_1$, $14_2$, $14_3$ is configured and operative to generate a predetermined beam emission pattern $\theta$ N that effectively covers the defined working area WA, i.e., $\theta_N$ is approximately 180° for the distributed transmission subsystem 12 depicted in FIG. 13.

The receiving subsystem 20 for the navigational control system 10' preferably comprises a single omnidirectional detection unit 30 which may be of the type described in commonly-owned, U.S. patent application Ser. No. 10/056,804, filed 24 Jan. 2002, entitled METHOD AND SYSTEM FOR ROBOT LOCALIZATION AND CONFINEMENT (the virtual wall system summarily described herein). The omnidirectional detection unit 30 is configured and operative to scan through the unique operating frequencies utilized by the distributed transmitting units $14_1$, $14_2$, $14_3$.

The omnidirectional detection unit 30 is operative to detect the directed beams $DB_1$, $DB_2$, $DB_3$ emitted by the distributed transmitting units $14_1$, $14_2$, $14_3$. The receiving subsystem is configured and operative to process the signals of the detected directed beam to determine the absolute position of the robotic device 100 within the defined working area WA. This absolute position is defined in terms of a cell of the grid map of the defined working area WA. A sequence of absolute positions, determined as described above, identifies a sequence of cells that defines the position history of the robotic device 100.

The receiver subsystem 20 is operative as described above to utilize a navigation control algorithm to determine whether a triggering event has occurred in the position history, and if a trigger event has occurred, the receiver subsystem 20 is operative to communicate the control signal associated with the triggering event/navigation control algorithm to the robotic device 100. The robotic device 100 is operative, in response to the communicated control signal, to implement the prescribed conduct specified by the control signal.

A variety of modifications and variations of the present invention are possible in light of the above teachings. The navigational control system 10 according to the present invention has been described above as determining and using the instantaneous position (or a sequence of instantaneous positions) of a robotic device as a control parameter for directly altering the movement activity of the robotic device. One skilled in the art will appreciate that the navigational control system according to the present invention can be used for other purposes. For example, the navigational control system of the present invention can be used for correcting errors in movement activity of robotic devices relying upon dead reckoning. It is therefore to be understood that, within the scope of the appended claims, the present invention may be practiced other than as specifically described herein.

What is claimed is:

1. An autonomous cleaning apparatus comprising:
a chassis;
a drive system disposed on the chassis and operable to enable movement of the cleaning apparatus;
a controller in communication with the drive system, the controller including a processor operable to control the drive system to steer movement of the cleaning apparatus;
a cleaning head system disposed on the chassis having a cleaning pathway providing pneumatic communication with a debris bin, the cleaning head system comprising an agitating brush configured to throw debris into the debris bin;
an indicator light; and
a debris sensor in communication with the controller, the debris sensor responsive to the debris to generate a signal indicative of passing of the debris;
wherein the controller is configured to
change an operational condition of the cleaning apparatus in response to receiving the signal generated by the debris sensor, the operational condition selected from the group consisting of a speed of the movement of the cleaning apparatus and an amount of power drawn by the cleaning apparatus, and to illuminate the indicator light in response to the signal generated by the debris sensor.

2. The autonomous cleaning apparatus of claim 1, wherein the controller is configured to change the operational condition by changing a speed of the movement of the cleaning apparatus in response to the signal generated by the debris sensor.

3. The autonomous cleaning apparatus of claim 1, wherein the controller is configured to change the operational condition by changing an amount of power drawn by the cleaning apparatus in response to the signal generated by the debris sensor.

4. The autonomous cleaning apparatus of claim 1, wherein in addition to the controller being configured to change the operational condition, the processor is configured to implement a spot cleaning mode in an area in which the cleaning apparatus was operating, substantially immediately in response to receiving the signal generated by the debris sensor.

5. The autonomous cleaning apparatus of claim 4, wherein the processor is configured to, in the spot cleaning mode, maneuver the autonomous cleaning apparatus according to a self-bounded area algorithm.

6. The autonomous cleaning apparatus of claim 5, wherein the self-bounded area algorithm comprises a spiraling algorithm at a reduced drive speed.

7. The autonomous cleaning apparatus of claim 1, wherein the processor is configured to implement a high power cleaning mode in response to the debris signal, the high power mode comprising elevating power delivery to the cleaning head system.

8. The autonomous cleaning apparatus of claim 1, wherein the processor is configured to execute a prioritized arbitration scheme to identify and implement one or more dominant behavioral modes based upon the signal.

9. The autonomous cleaning apparatus of claim 1, wherein the processor is configured to control one or more operational conditions of the autonomous cleaning apparatus based upon the signal.

10. The autonomous cleaning apparatus of claim 1, wherein the debris sensor is disposed along a wall of the cleaning pathway in a location to receive debris thrown by the agitating brush of the cleaning head system for generating the signal.

11. The autonomous cleaning apparatus of claim 1, wherein the debris sensor comprises right and left debris sensors in communication with the controller and disposed along a wall of the cleaning pathway in a location to receive debris thrown by the agitating brush of the cleaning head system for generating respective debris signals; and
wherein the processor is configured to direct the drive system to turn the cleaning apparatus to the right in response to the debris signal generated by the right debris sensor and to turn the cleaning apparatus to the left in response to the debris signal generated by the left debris sensor.

12. The autonomous cleaning apparatus of claim 11, wherein the right and left debris sensors are disposed opposite each other and equidistantly from a center axis defined by the cleaning pathway.

13. The autonomous cleaning apparatus of claim 1, wherein the controller is configured to determine a debris gradient using the signal, the debris gradient being representative of changes in debris strikes counted as the cleaning apparatus moves over a surface.

14. The autonomous cleaning apparatus of claim 13, wherein the controller is configured to examine the debris gradient and continuously adjust a path or a pattern of movement of the cleaning apparatus to clean the surface.

15. The autonomous cleaning apparatus of claim 1, wherein the controller is configured to illuminate the indicator light in response to the signal generated by the debris sensor and, at the same time, to increase an amount of power drawn by the cleaning apparatus for cleaning.

16. The autonomous cleaning apparatus of claim 1, wherein the controller is configured to select a behavioral mode in response to the signal generated by the debris sensor.

17. The autonomous cleaning apparatus of claim 1, wherein the controller is configured to steer the cleaning apparatus in a forward direction, turning to cover a location of the debris, in response to the debris signal generated by the debris sensor.

18. The autonomous cleaning apparatus of claim 1, wherein the controller is configured to control the drive system to execute a pattern of movements to steer the cleaning apparatus toward a debris area corresponding to the signal generated by the debris sensor.

19. An autonomous cleaning apparatus comprising:
a chassis;
a drive system disposed on the chassis and operable to enable movement of the cleaning apparatus;
a controller in communication with the drive system, the controller including a processor operable to control the drive system to steer movement of the cleaning apparatus;
a cleaning head system disposed on the chassis having a cleaning pathway providing pneumatic communication with a debris bin, the cleaning head system comprising an agitating brush configured to throw debris into the debris bin;
an indicator light; and
a debris sensor in communication with the controller, the debris sensor responsive to the debris to generate a signal indicative of passing of the debris;
wherein the controller is configured to
change an amount of power drawn by the cleaning apparatus in response to receiving the signal generated by the debris sensor to implement a high power cleaning mode in response to the signal, and to
illuminate the indicator light in response to the high power cleaning mode.

20. The autonomous cleaning apparatus of claim 19, wherein the controller is configured to illuminate the indicator light in response to changing the operational condition.

21. The autonomous cleaning apparatus of claim 19, wherein the controller is configured to illuminate the indicator light in response to the signal.

* * * * *

UNITED STATES PATENT AND TRADEMARK OFFICE
CERTIFICATE OF CORRECTION

| | |
|---|---|
| PATENT NO. | : 9,949,608 B2 |
| APPLICATION NO. | : 14/291682 |
| DATED | : April 24, 2018 |
| INVENTOR(S) | : Gregg W. Landry et al. |

It is certified that error appears in the above-identified patent and that said Letters Patent is hereby corrected as shown below:

On the Title Page

Page 2, Column 1, Line 19, delete "and" and insert -- which is --, therefor.

In the Claims

Column 32, Line 22, in Claim 7, after "the" delete "debris".

Column 36, Line 19, in Claim 17, after "to the" delete "debris".

Signed and Sealed this
Twenty-sixth Day of June, 2018

Andrei Iancu
*Director of the United States Patent and Trademark Office*